United States Patent
Stamenov

(10) Patent No.: US 11,454,783 B2
(45) Date of Patent: Sep. 27, 2022

(54) TILED TRIPLET LENSES PROVIDING A WIDE FIELD OF VIEW

(71) Applicant: Samsung Electronics Co., Ltd., Gyeonggi-do (KR)

(72) Inventor: Igor Stamenov, Manteca, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 823 days.

(21) Appl. No.: 15/962,160

(22) Filed: Apr. 25, 2018

(65) Prior Publication Data
US 2019/0331879 A1    Oct. 31, 2019

(51) Int. Cl.
*G02B 13/00* (2006.01)
*G02B 27/01* (2006.01)
*G06T 19/00* (2011.01)

(52) U.S. Cl.
CPC ....... *G02B 13/004* (2013.01); *G02B 27/0172* (2013.01); *G06T 19/006* (2013.01); *G02B 2027/0123* (2013.01); *G02B 2027/0134* (2013.01)

(58) Field of Classification Search
CPC .............. G02B 13/004; G02B 27/0172; G02B 2027/0178; G02B 2027/0123; H04N 5/7491; G06T 19/006
See application file for complete search history.

(56) References Cited

U.S. PATENT DOCUMENTS

| | | | |
|---|---|---|---|
| 4,406,532 A | 9/1983 | Howlett | |
| 4,623,224 A | 11/1986 | Clarke | |
| 5,347,400 A | 9/1994 | Hunter | |
| 5,633,757 A | 5/1997 | Park | |
| 5,774,096 A | 6/1998 | Usuki et al. | |
| 6,542,316 B2 | 4/2003 | Yoneyama | |
| 6,563,648 B2 | 5/2003 | Gleckman et al. | |
| 7,667,901 B2 | 2/2010 | Baba | |
| 8,994,614 B2 | 3/2015 | Bickerstaff et al. | |
| 9,123,158 B2 | 9/2015 | Nishimaki et al. | |
| 9,151,934 B2 | 10/2015 | Saito et al. | |
| 9,152,226 B2 | 10/2015 | Forutanpour et al. | |
| 9,176,304 B2 | 11/2015 | Asami et al. | |

(Continued)

FOREIGN PATENT DOCUMENTS

| CN | 1161087 A | 8/1995 |
|---|---|---|
| CN | 104317055 A | 1/2015 |

(Continued)

OTHER PUBLICATIONS

Kiyoshi Kiyokawa, "A Wide Field of view Head Mounted Projective Display using Hyperbolic Half-silvered Mirrors"; 2007, IEEE Xplore; pp. 207-210. (Year: 2007).*

(Continued)

*Primary Examiner* — Alicia M Harrington
(74) *Attorney, Agent, or Firm* — Cuenot, Forsythe & Kim, LLC

(57) ABSTRACT

A near eye display system can include a first triplet lens arranged in a tile fashion and configured to be associated with a left eye. The near eye display system also can include a second triplet lens arranged in the tile fashion and configured to be associated with a right eye. A multiple display system can be paired with the first triplet lens and the second triplet lens.

26 Claims, 26 Drawing Sheets

(56) References Cited

U.S. PATENT DOCUMENTS

| | | |
|---|---|---|
| 9,182,569 B2 | 11/2015 | Jung et al. |
| 9,195,029 B2 | 11/2015 | Kim et al. |
| 9,229,227 B2 | 1/2016 | Border et al. |
| 9,323,040 B2 | 4/2016 | Ishizuka |
| 10,422,976 B2 | 9/2019 | Stamenov |
| 2002/0181115 A1* | 12/2002 | Massof ............... G02B 27/017 359/630 |
| 2010/0128355 A1 | 5/2010 | Janeczko et al. |
| 2011/0241976 A1* | 10/2011 | Boger ............... G02B 27/0176 345/8 |
| 2012/0212839 A1 | 8/2012 | Hsu et al. |
| 2014/0218806 A1 | 8/2014 | Kenichi |
| 2014/0266990 A1 | 9/2014 | Makino et al. |
| 2014/0268354 A1 | 9/2014 | Choi et al. |
| 2015/0193983 A1 | 7/2015 | Katz et al. |
| 2015/0234455 A1 | 8/2015 | Lavalle et al. |
| 2015/0293330 A1 | 10/2015 | Gutierrez |
| 2015/0302651 A1 | 10/2015 | Shpigelman |
| 2015/0312468 A1 | 10/2015 | Taylor et al. |
| 2015/0348327 A1 | 12/2015 | Zalewski |
| 2015/0355467 A1 | 12/2015 | Mukawa et al. |
| 2016/0011422 A1 | 1/2016 | Thurber et al. |
| 2016/0011424 A1 | 1/2016 | Thurber et al. |
| 2016/0019727 A1 | 1/2016 | Norton et al. |
| 2016/0198949 A1 | 7/2016 | Spitzer |
| 2017/0039904 A1* | 2/2017 | Jepsen ............... G02B 27/0093 |
| 2017/0039905 A1 | 2/2017 | Jepsen et al. |
| 2017/0109562 A1 | 4/2017 | Shroff et al. |
| 2017/0115432 A1 | 4/2017 | Schmidtlin |
| 2017/0115489 A1 | 4/2017 | Xinda et al. |
| 2017/0184877 A1 | 4/2017 | Wang et al. |
| 2017/0139213 A1 | 5/2017 | Schmidtlin |
| 2017/0177937 A1 | 6/2017 | Harmsen et al. |
| 2017/0180800 A1 | 6/2017 | Mayrand |
| 2017/0205627 A1 | 7/2017 | Fukuyama |
| 2017/0236249 A1 | 8/2017 | Roulet et al. |
| 2017/0248769 A1 | 8/2017 | Stamenov |
| 2017/0287215 A1 | 10/2017 | Lalonde et al. |

FOREIGN PATENT DOCUMENTS

| | | |
|---|---|---|
| CN | 106802482 A | 6/2017 |
| CN | 107209381 A | 9/2017 |
| EP | 0679919 A2 | 11/1995 |
| EP | 1906399 A1 | 4/2008 |
| JP | 2000105349 A | 4/2000 |
| JP | 2011145488 A | 7/2011 |
| JP | 2012510077 A | 4/2012 |
| JP | 2013045020 A | 3/2013 |
| KR | 100141805 B1 | 8/1998 |
| KR | 20100000757 A | 1/2010 |
| KR | 101118910 B1 | 3/2012 |
| KR | 101421199 B1 | 7/2014 |
| KR | 101590825 B1 | 2/2016 |
| KR | 20170104604 A | 9/2017 |
| KR | 20180039734 A | 4/2018 |
| WO | 2013027855 A1 | 2/2013 |
| WO | 2015021322 A1 | 2/2015 |
| WO | 2015057994 A1 | 4/2015 |
| WO | 2016014878 A1 | 1/2016 |
| WO | 2016118648 A1 | 7/2016 |
| WO | 2017146510 A2 | 8/2017 |
| WO | 2019208881 A1 | 10/2019 |

OTHER PUBLICATIONS

EP Appln. 17756858.2, European Extended Search Report, dated Jan. 24, 2019, 7 pg.

WIPO Appln. PCT/KR2018/011686, International Search Report and Written Opinion, dated Jan. 31, 2019, 10 pg.

U.S. Appl. No. 15/420,389, Final Office Action, dated Dec. 26, 2018, 12 Pg.

U.S. Appl. No. 15/420,389, Non-Final Office Action, dated Jul. 17, 2018, 20 Pg.

KR Appln. 10-2018-7027080, Office Action, dated Aug. 19, 2019, 13 pg.

U.S. Appl. No. 15/420,389, Notice of Allowance, dated May 15, 2019, 10 pg.

WIPO Appln. PCT/KR2017/002034,Int'l. Search Report and Written Opinion, dated May 15, 2017, 13 pg.

Clark, "Mobile platform optical design," In International Optical Design Conference, pp. 92931M-92931M, International Society for Optics and Photonics, Dec. 17, 2014, 7 pg.

"LeepVR," [online] LeepVR .com, retrieved Jan. 31, 2018, retrieved from the Internet: <http://www.leepvr.com/about.php>, 4 pg.

"Pimax announces world's first 8K VR headset," VRWorld.com, 2017, 3 pg.

Global Tactical, "L-3 GPNVG ANVIS Mount brochure," 2017, 3 pg.

Heinrich, E., "The Virtual Reality headset that's more Immersive than Oculus Rift," [online] Fortune, Time, Inc. © 2018, Mar. 3, 2015, 4 pg.

Boxall, A., "Infinitus puts the Rift and Vive to shame with its new, high-resolution prime TVR headset," [online] Digital Trends, Designtechnica Corporation © May 6, 2018, 2016, 9 pg.

"StarVR," [online] StarVR Corporation [retrieved Oct. 9, 2017], retrieved from the Internet: <https://www.starvr.com>, 6 pg.

EP Appln. No. 18916977.4, Extended EP Search Report, dated Jan. 29, 2021, 8 pg.

Cheng, D. et al., "Design of a wide-angle, lightweight head-mounted display using free-form optics tiling," Optics letters, Optical Society of America, US, Jun. 1, 2011, vol. 36, No. 11, pp. 2098-2100.

CN Appln . 201880091228.2, Office Action, dated Oct. 11, 2021, with translation, 21 pg.

CN Application No. 201880091228.2, Notice of Allowance, dated Mar. 25, 2022, 5 pg.

Zheng, L. "Design and Analysis of Optical Components for Virtual Reality Glasses," Optical Instruments, vol. 4, 2015, pp. 324-329 (abstract).

\* cited by examiner

Astigmatic Field Curves

1800

Locating a first lens having a positive refractive power in a position at an image side of an optical path
1805

↓

Providing a second lens having a positive refractive power
1810

↓

Locating a third lens having a negative refractive power in a position at an object side of the optical path
1815

Configuring, in a near eye display system, a first triplet lens in a tile fashion to be associated with a left eye
1905

↓

Configuring, in the near eye display system, a second triplet lens in the tile fashion to be associated with a right eye
1910

↓

Configuring, in the near eye display system, a third triplet lens in the tile fashion to be associated with the left eye
1915

↓

Configuring, in the near eye display system, a fourth triplet lens in the tile fashion to be associated with the right eye
1920

↓

Pairing a multiple display system with the lenses
1925

FIG. 19

TILED TRIPLET LENSES PROVIDING A WIDE FIELD OF VIEW

TECHNICAL FIELD

This disclosure relates to near eye display systems.

BACKGROUND

Virtual Reality, or "VR," refers to computer-based technologies that seek to generate realistic images, sounds, and sensations in an attempt to replicate an environment. A user is immersed into the environment by being subjected to the images, sounds, and sensations as if the user had a physical presence in the environment. The user is also able to interact with the computer-generated environment and interact with depictions of objects located within the computer-generated environment.

In order to create an immersive and realistic experience for the user, a VR headset may be used. Typically, the VR headset includes a stereoscopic, head-mounted display, lenses, and head motion tracking sensors. The lenses are arranged to act as a stereoscope for viewing the stereoscopic display. Due to various concerns relating to weight, size, wearability, and cost of the VR headset, compromises in lenses have become commonplace.

In consequence, the lenses used in VR headsets typically generate images with multiple aberrations. These aberrations may include field curvature, astigmatism, lateral color, etc. As such, the VR user experience tends to be acceptable only when the user watches content straight ahead at the center of the field of view (FOV) of the stereoscopic display. Imagery positioned toward the periphery of the FOV is blurred with high field and color aberration causing eye strain, nausea, and user discomfort. Blurring of imagery at the periphery also causes eye accommodation difficulty and further contributes to VR sickness.

SUMMARY

One or more arrangements described herein are directed to a near eye display system. The near eye display system can include a first triplet lens arranged in a tile fashion and configured to be associated with a left eye and a second triplet lens arranged in the tile fashion and configured to be associated with a right eye. The near eye display system also can include a multiple display system paired with the first triplet lens and the second triplet lens.

One or more arrangements described herein are directed to a virtual reality headset. The virtual reality headset can include a near eye display system. The near eye display system can include a first triplet lens arranged in a tile fashion and configured to be associated with a left eye and a second triplet lens arranged in the tile fashion and configured to be associated with a right eye. The near eye display system also can include a multiple display system paired with the first triplet lens and the second triplet lens.

One or more arrangements described herein are directed to a method of providing a near eye display system. The method can include configuring, in the near eye display system, a first triplet lens in a tile fashion to be associated with a left eye. The method also can include configuring, in the near eye display system, a second triplet lens in the tile fashion to be associated with a right eye. The method also can include paring a multiple display system with the first triplet lens and the second triplet lens.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 18 illustrates an example method of implementing an optical system in accordance with the example embodiments described herein.

FIG. 19 illustrates an example method of implementing a near eye display system in accordance with the example embodiments described herein.

DETAILED DESCRIPTION

Figure 1A:
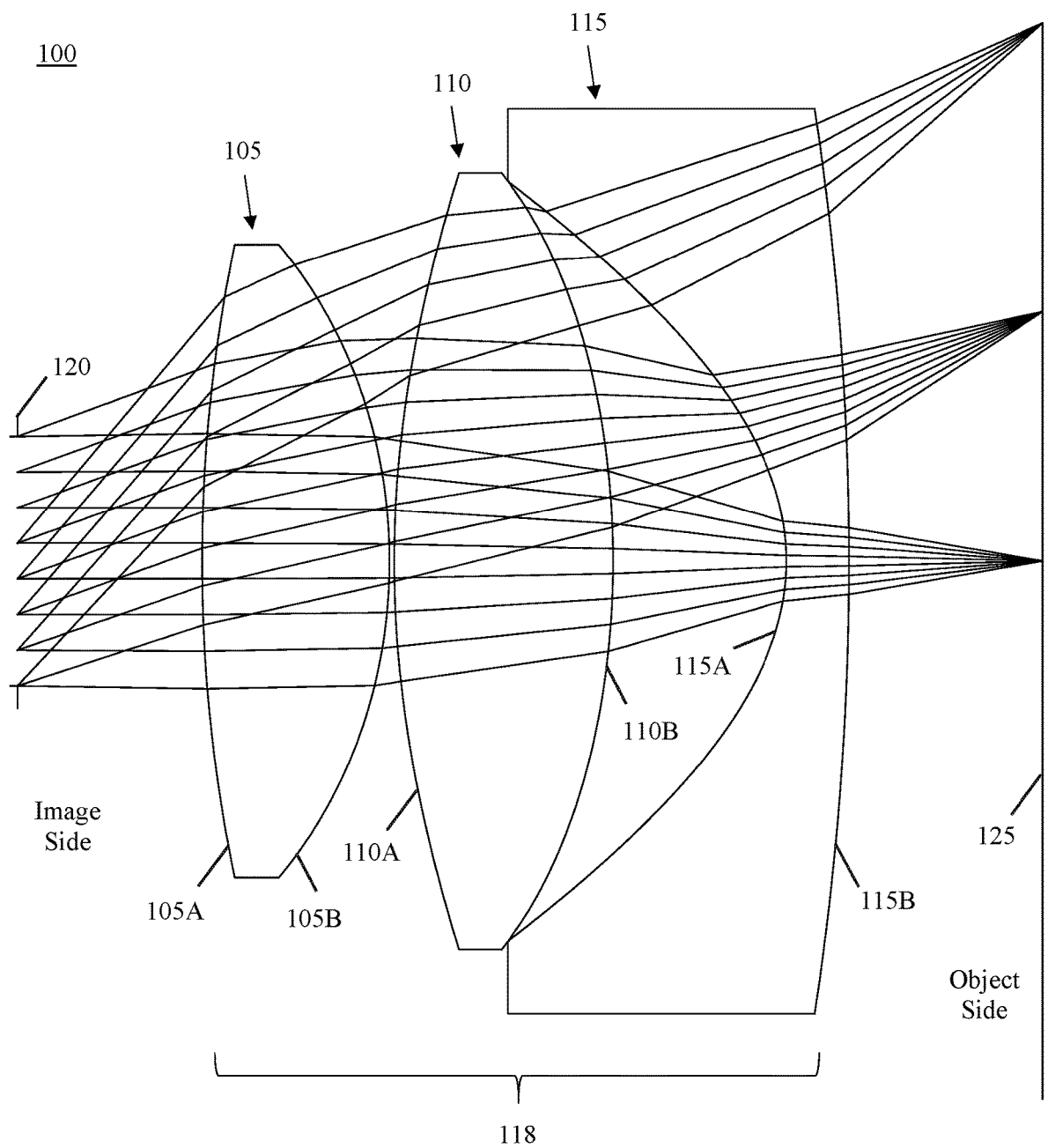
FIG. 1A illustrates an example optical system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to near eye display systems and, more particularly, to near eye display systems with multiple triplet lenses. One or more arrangements described within this disclosure are directed to use of tiled lenses to provide a wide field of view in a multiple display near eye display system. In illustration, a plurality of optical systems, also referred to herein as triplet lenses, can be arranged in a tiled fashion. A first triplet lens can be positioned to face a first display and can be configured to be associated with a left eye of a user. A second triplet lens can be positioned to face the first display, or a second display, and can be configured to be associated with a right eye of a user. A third lens, or a third triplet lens, can be positioned to face another display and can be configured to be associated with the left eye of the user. The third lens, or the third triplet lens, can be positioned to form a tile angle of at least 40° with respect to the first triplet lens. A fourth lens, or a fourth triplet lens, can be positioned to face yet another display and can be configured to be associated with the right eye of the user. The fourth lens, or the fourth triplet lens, can be positioned to form a tile angle of at least 40° with respect to the second triplet lens.

In one or more embodiments, example optical systems described herein may be implemented to satisfy one or more or any combination of expressions 1-18 below.

$$0.8 < f1/f < 2.2 \tag{1}$$

$$0.8 < f2/f < 1.9 \tag{2}$$

$$-1.0 < f3/f < -0.4 \tag{3}$$

$$0.4 < f1/f2 < 2.0 \tag{4}$$

$$-3.0 < f2/f3 < -0.8 \tag{5}$$

$$|Vd2 - Vd3| > 24 \tag{6}$$

$$1.0 < OAL/f < 1.8 \tag{7}$$

$$0.0 < D1/f < 0.2 \tag{8}$$

$$0.0 < D2/f < 0.4 \tag{9}$$

$$0.2 < BFL/f < 0.9 \tag{10}$$

$$-1.0 < r2/f < -0.2 \quad (11)$$

$$0.5 < r3/f < 2.5 \quad (12)$$

$$-5.0 < r4/f < -0.5 \quad (13)$$

$$-20 < r5/f < -0.5 \quad (14)$$

Within this specification, "f" is the overall focal length of the optical system, "f1" is the focal length of the lens most proximal to the placement of the user's eye (also referred to as the first lens), "f2" is the focal length of the middle lens (also referred to as the second lens), "f3" is the focal length of the most distal lens from the placement of the user's eye (also referred to as the third lens). "OAL" is the distance from the image side surface (e.g., the left or "A" surface) of the first lens to a surface of a screen, "BFL" is the distance from the object side surface (e.g., the right or "B" surface) of the third lens to the surface of the screen. Further, Vd1 is the Abbe number of the optical material of the first lens, Vd2 is the Abbe number of the optical material of the second lens, and Vd3 is the Abbe number of the optical material of the third lens. D1 is the air space thickness between the center of the first lens and the center of the second lens. D2 is the air space thickness between the center of the second lens and the center of the third lens. Finally, "r2" is the radius of curvature of the object side surface of the first lens, "r3" is the radius of curvature of the image side surface of the second lens, "r4" is the radius of curvature of the object side surface of the second lens, and "r5" is the radius of curvature of the image side surface of the third lens.

Further aspects of the inventive arrangements are described in greater detail below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1A illustrates an example optical system 100. Optical system 100 includes a first lens 105, a second lens 110, and a third lens 115, which together can form a triplet lens 118. Each of lenses 105, 110, and 115 has an image side surface labeled "A" and an object side surface labeled "B." Surface 120 represents a location or position of the eye box. Surface 125 represents a surface of one or more screens (e.g., where the screens are aligned in a plane represented by surface 125). In this regard, the triplet lens 118 can include the first lens 105, the second lens 110 and the third lens 115, wherein the first lens 105, the second lens 110 and the third lens 115 form an optical path with the side 115B of the third lens 115 facing the surface 125 of one or more screens and adapted to provide an image from the screen to a user. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 100 provides an optical path formed by lenses 105, 110, and 115 of the triplet lens 118.

In the example of FIG. 1A, lens 105 is the lens that is the most proximal lens of optical system 100 to the placement of the user's eye (e.g., the image side). The left side of lens 105 may be referred to as the image side. Lens 105 can have positive refractive power. In an embodiment, lens 105 may be a positive biconvex lens.

Lens 110 is disposed between lens 105 and lens 115 in the optical path. Lens 110 may be implemented with positive refractive power. In an embodiment, lens 110 may be implemented as a positive biconvex lens.

Lens 115 is the most distal lens from the placement of the user's eye. As such, lens 115 is on the object side of the optical path and is the most proximal lens of optical system 100 to the object side. Lens 115 is implemented with negative refractive power. In an embodiment, lens 115 is implemented as a negative meniscus lens. In one or more other embodiments, lens 115 has a center portion that has a negative meniscus shape and an outer portion that has a different shape.

As used herein, a positive (or negative) lens refers to a lens that is positive (or negative) in terms of refractive power for a center portion of the lens. As such, a positive (or negative) lens can have an outer portion that becomes negative (or positive).

In one example implementation, lens 115 is an aspherical optical element that may use up to $16^{th}$ order even aspherical terms to describe the surface shape. Rotationally symmetric polynomial aspheric surfaces are described by a polynomial expansion of the deviation from spherical (or aspheric described by a conic) surface. The even aspherical surface model uses the base radius of curvature and the conic constant. The surface sag "z" is given by Expression 15 below:

$$|z = \frac{cr^2}{1 + \sqrt{1-(1+k)c^2r^2}} + \alpha_1 r^2 + \\ \alpha_2 r^4 + \alpha_3 r^6 + \alpha_4 r^8 + \alpha_5 r^{10} + \alpha_6 r^{12} + \alpha_7 r^{14} + \alpha_8 r^{16} \quad (15)$$

Within Expression 15, the term "r" represents the radial coordinate of the lens.

In one or more embodiments, lens 105 and lens 110 each have $10^{th}$ order even aspheric surfaces. Lens 105 and lens 110 each may have up to $16^{th}$ order even aspheric terms in alternative embodiments. Optical system 100 is capable of providing a diagonal field of view (DFOV) of ±50.5° (101°) and a ±34.8 mm (69.6 mm) maximum screen object size. In one or more embodiments, optical system 100 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 100 may be scaled larger (or smaller) thereby resulting in a scaling of the screen image size larger (or smaller).

Optical system 100 is capable of providing an eye relief of 11.8 mm and an eye box diameter of 16 mm for the user pupil. In general, the eye relief of an optical instrument such as optical system 100 can correspond to the distance from the last surface of an eyepiece at which the user's eye can obtain the full viewing angle. A human eye pupil diameter may vary between approximately 2 mm under bright light conditions up to approximately 8 mm when fully dilated in darkness. A common size of the human eye pupil is 4-5 mm. In this example, the 16 mm eye box size is used to account for eye pupil movement with gaze change. Eye relief of 11.8 mm allows a VR headset using optical system 100 for each eyepiece to be used with eyeglasses and/or spectacles.

Table 1 provides an example of an optical prescription for optical system 100.

TABLE 1

| | Description | Surface Type | Radius [mm] | Thickness [mm] | Semi-Diameter [mm] | Conic |
|---|---|---|---|---|---|---|
| 0 | — | Standard | Infinity | Infinity | Infinity | 0.0000 |
| 1 | Eye pupil (surface 120) | Standard | Infinity | 11.8000 | 8.000 | 0.0000 |
| 2 | Lens 105, surface 105A | Standard | 100.0000 | 12.0100 | 21.5000 | 0.0000 |
| 3 | Lens 105, surface 105B | Standard | −33.9621 | 0.3000 | 21.5000 | 0.3704 |
| 4 | Lens 110, surface 110A | Standard | 69.0280 | 14.010 | 24.9000 | −3.8894 |
| 5 | Lens 110, surface 110B | Standard | −56.3858 | 11.1100 | 24.9000 | 2.6436 |
| 6 | Lens 115, surface 115A | Standard | −14.5535 | 4.0000 | 24.4000 | −1.2361 |
| 7 | Lens 115, surface 115B | Standard | −193.2856 | 12.4000 | 29.0000 | 0.0000 |
| 8 | Screen (surface 125) | Standard | Infinity | — | 35.0000 | 0.0000 |

Table 2 illustrates a variety of additional characteristics of optical system 100. For example, Table 2 shows the overall focal length of optical system 100 (f); the focal length of each of lenses 105, 110, and 115 (f-105, f-110, f-115); the refractive index (n) of each of lenses 105, 110, and 115 (n-105, n-110, and n-115); and the Abbe number (Vd) of each of lenses 105, 110, and 115 (Vd-105, Vd-110, and Vd-115).

TABLE 2

| | |
|---|---|
| f | 47.1 mm |
| f-105 (corresponding to f1) | 49.6 mm |
| f-110 (corresponding to f2) | 61.2 mm |
| f-115 (corresponding to f3) | −25.9 mm |
| n-105 | 1.525 |
| n-110 | 1.525 |
| n-115 | 1.608 |
| Vd-105 (corresponding to Vd1) | 55.95 |
| Vd-110 (corresponding to Vd2) | 55.95 |
| Vd-115 (corresponding to Vd3) | 26.90 |

Optical system 100 may use a variety of different lens materials to implement lenses 105, 110, and 115. In one example, each of lenses 105, 110, and 115 may be implemented using a same material, e.g., optical plastic or optical glass. In another example, two of lenses 105, 110, and 115 are implemented using optical plastic (optical glass), while the other one of lenses 105, 110, and 115 is implemented using optical glass (optical plastic). It should be appreciated that the particular optical plastic and/or particular optical glass used may differ between lenses.

In one or more embodiments, one or more or all of lenses 105, 110, and 115 are implemented using an optical plastic. In an example embodiment, lens 105 is implemented using 480R; lens 110 is implemented using 480R; and lens 115 is implemented using Osaka Gas Chemicals polyester (OKP optical plastic) 4 (OKP4). In this example, the weight of optical system 100 is approximately 74.9 grams.

An optical system 100 as described in connection with FIG. 1A may be implemented to satisfy the expressions illustrated in Table 3 to provide improved optical performance.

TABLE 3

| Expression | Value |
|---|---|
| OAL [mm] | 53.83 |
| BFL [mm] | 12.40 |
| D1 [mm] | 0.30 |
| D2 [mm] | 11.11 |
| f1/f | 10.54 |
| f2/f | 1.30 |
| f3/f | −0.55 |
| f1/f2 | 0.81 |

TABLE 3-continued

| Expression | Value |
|---|---|
| f2/f3 | −2.36 |
| V2 − V3 | 29.05 |
| OAL/f | 1.14 |
| BFL/f | 0.26 |
| r2/f | −0.72 |
| r3/f | 1.47 |
| r4/f | −1.20 |
| r5/f | −0.31 |
| D1/f | 0.006 |
| D2/f | 0.236 |

Figure 1B:
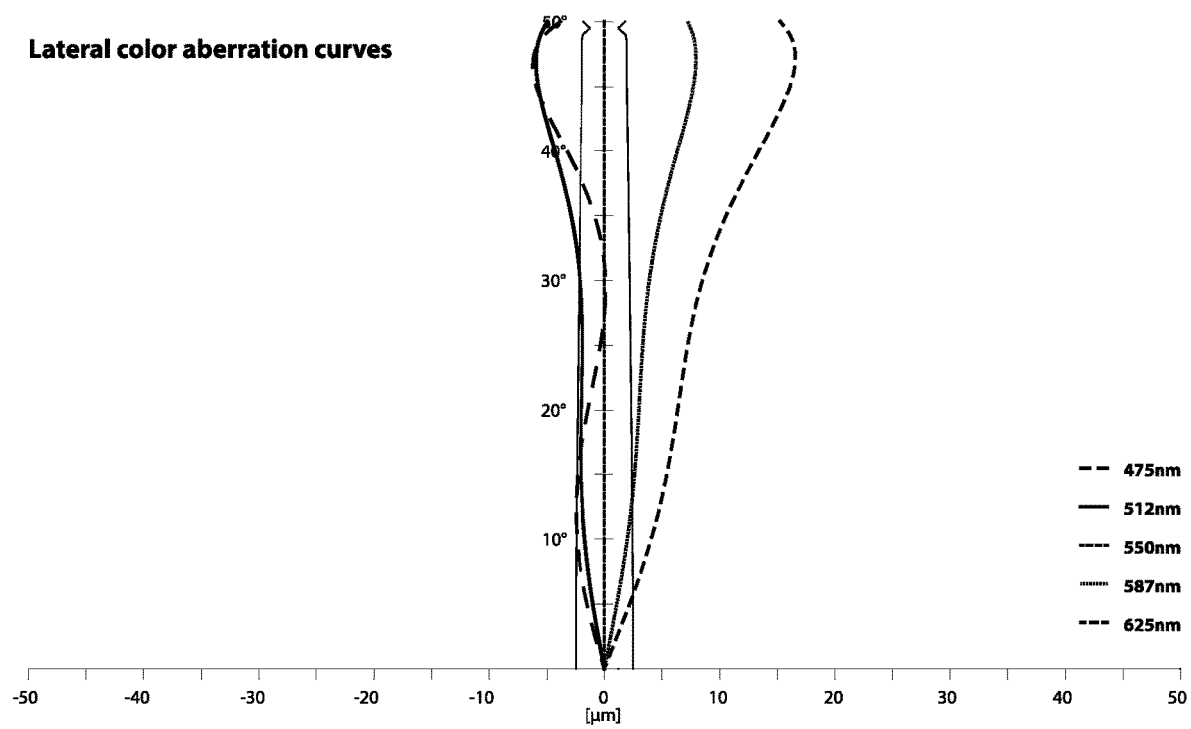
FIG. 1B illustrates lateral color aberration for the optical system of FIG. 1A on the screen (object) side in micrometers.
Figure 1C:
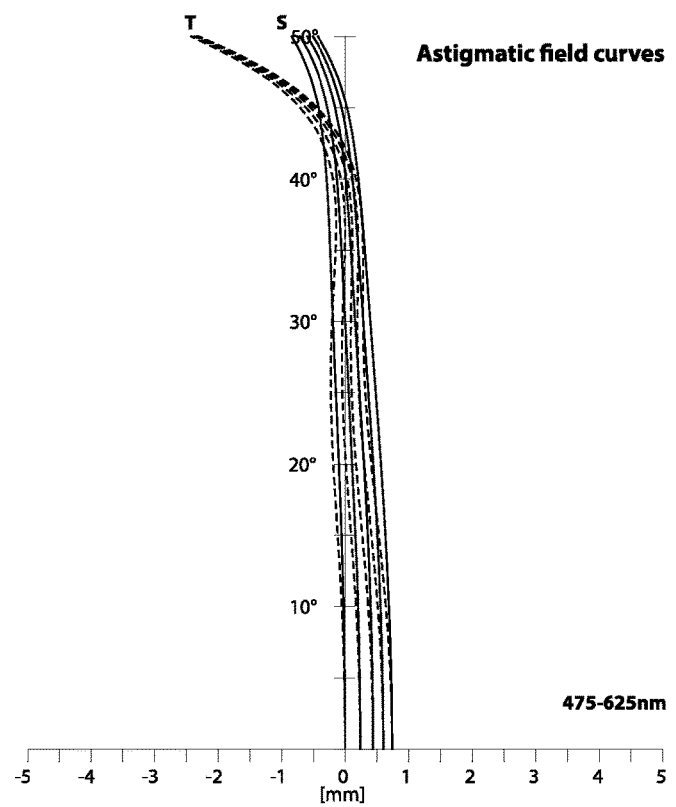
FIG. 1C illustrates field curvature and astigmatism aberrations for the optical system of FIG. 1A on the screen side in millimeters.
Figure 1D:
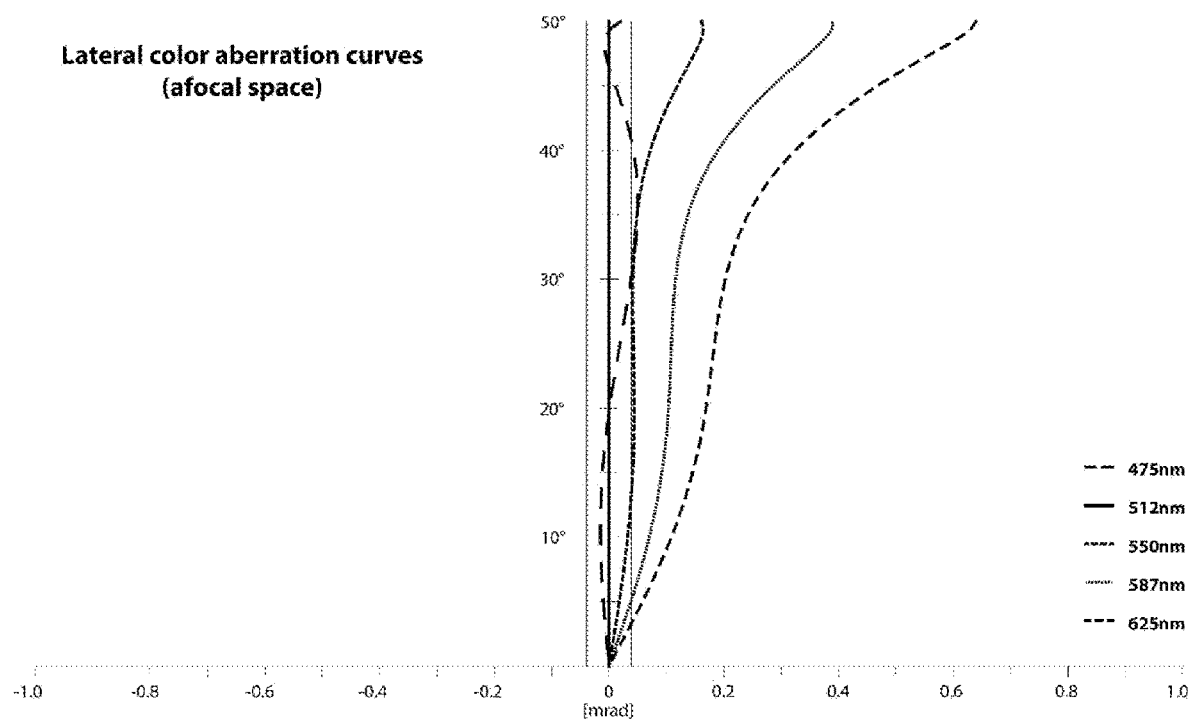
FIG. 1D illustrates lateral color aberration for the optical system of FIG. 1A on the user eye (image) side in milliradians (afocal space).
Figure 1E:
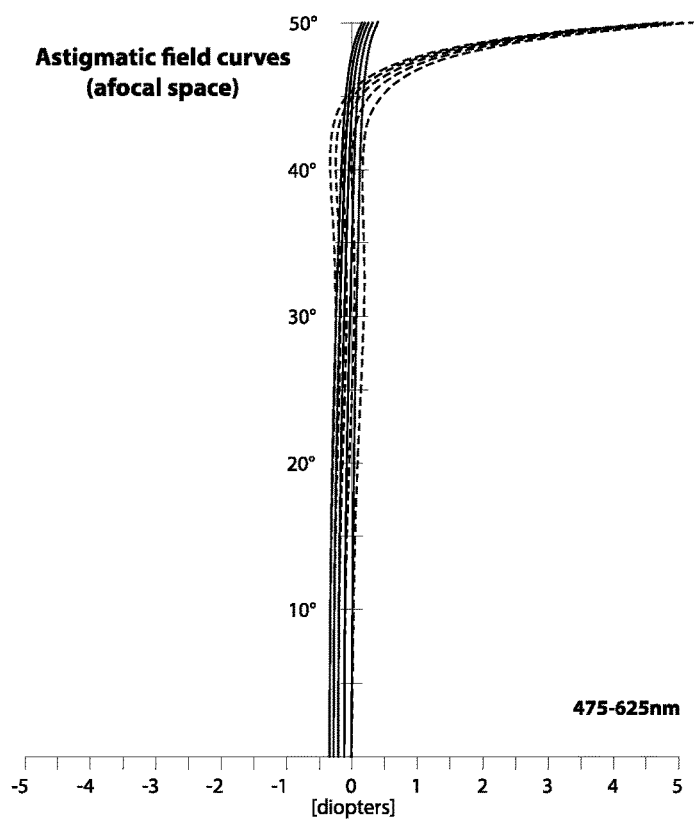
FIG. 1E illustrates field curvature and astigmatism for the optical system of FIG. 1A on the image side in diopter units (afocal space).

FIG. 1B illustrates lateral color aberration for optical system 100 of FIG. 1A on the screen side in micrometers. FIG. 1C illustrates field curvature and astigmatism aberrations for optical system 100 of FIG. 1A on the screen side in millimeters. FIG. 1D illustrates lateral color aberration for optical system 100 of FIG. 1A on the image side in milliradians (afocal space). FIG. 1E illustrates field curvature and astigmatism for optical system 100 of FIG. 1A on the image side in diopter units (afocal space).

Figure 2A:
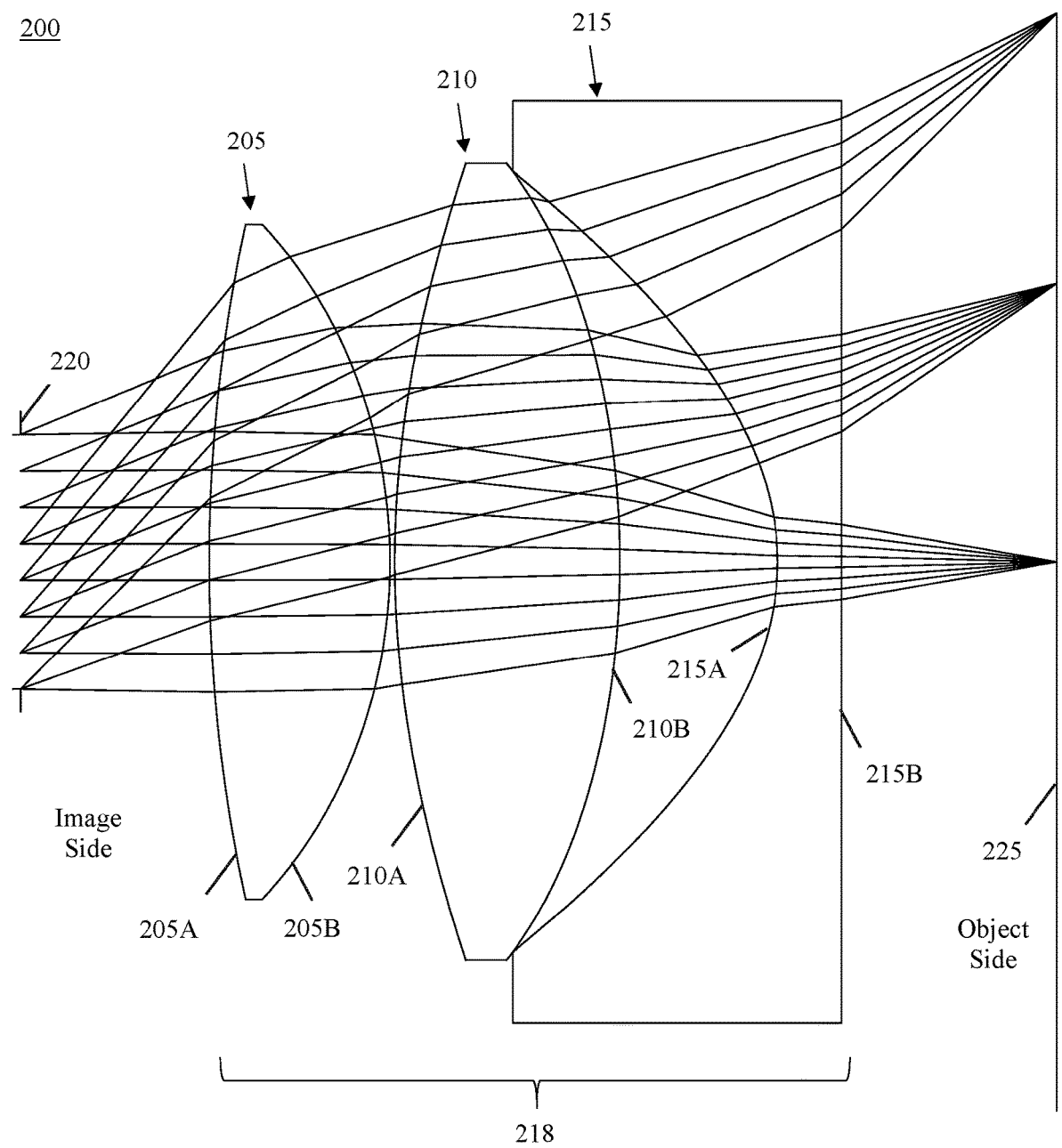
FIG. 2A illustrates another example optical system.

FIG. 2A illustrates another example optical system 200. Optical system 200 has a weight that is approximately 10% less than the weight of optical system 100. Optical system 200, however, provides less robust color correction than optical system 100. Optical system 200 includes a first lens 205, a second lens 210, and a third lens 215, which together can form a triplet lens 218. Each of lenses 205, 210, and 215 has an image side surface labeled "A" and an object side surface labeled "B." Surface 220 represents the location or position of the eye box. Surface 225 represents the surface of one or more screens. In this regard, the triplet lens 218 can include the first lens 205, the second lens 210 and the third lens 215, wherein the first lens 205, the second lens 210 and the third lens 215 form an optical path with the side 215B of the third lens 215 facing the surface 225 of one or more screens and adapted to provide an image from the screen to a user. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, the display device may include one or more screens. Optical system 200 provides an optical path formed by lenses 205, 210, and 215 of the triplet lens 218.

In the example of FIG. 2A, lens 205 is the lens that is the most proximal lens of optical system 200 to the placement of the user's eye. Lens 205 can be implemented as a positive lens. In an embodiment, lens 205 is implemented as a positive bi-convex lens. In another embodiment, lens 205 is implemented as a positive meniscus lens.

Lens 210 is disposed between lens 205 and lens 215 in the optical path. Lens 210 may be implemented as a positive lens. Lens 210 further may be implemented as a positive aspheric lens.

Lens 215 is the most distal lens from the placement of the user's eye. As such, lens 215 is on the object side of the optical path and is the most proximal lens of optical system 200 to the object side. Lens 215 is implemented as a negative lens.

Optical system 200 is capable of providing a DFOV of ±50.5° (101°) and ±35.2 mm (70.4 mm) maximum screen object size. In one or more embodiments, optical system 200 may be used within a VR headset that is adapted to include one or more screen(s) or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 200 may be scaled larger (or smaller) thereby resulting in a scaling of the screen image size larger (or smaller). Optical system 200 is capable of providing an eye relief of 11.8 mm and an eye box diameter of 16 mm for the user pupil. Eye relief of 11.8 mm allows a VR headset using optical system 200 for each eyepiece to be used with eyeglasses and/or spectacles.

Table 4 below provides an example of an optical prescription for optical system 200.

TABLE 4

| | Description | Surface Type | Radius [mm] | Thickness [mm] | Semi-Diameter [mm] | Conic |
|---|---|---|---|---|---|---|
| 0 | — | Standard | Infinity | Infinity | Infinity | 0.0000 |
| 1 | Eye pupil (surface 220) | Standard | Infinity | 11.8000 | 8.000 | 0.0000 |
| 2 | Lens 205, surface 205A | Standard | 100.0000 | 11.3400 | 21.2000 | 0.0000 |
| 3 | Lens 205, surface 205B | Standard | −33.5925 | 0.3000 | 21.2000 | 0.1081 |
| 4 | Lens 210, surface 210A | Standard | 64.2690 | 14.1100 | 25.0500 | −4.3349 |
| 5 | Lens 210, surface 210B | Standard | −57.0110 | 9.8900 | 25.0500 | 2.8585 |
| 6 | Lens 215, surface 215A | Standard | −16.1781 | 4.0000 | 24.5000 | −1.2114 |
| 7 | Lens 215, surface 215B | Standard | Infinity | 13.5000 | 29.0000 | 0.0000 |
| 8 | Screen (surface 225) | Standard | Infinity | — | 35.0000 | 0.0000 |

Table 5 illustrates a variety of additional characteristics of optical system 200. For example, Table 5 shows the overall focal length of optical system 200($f$); the focal length of each of lenses 205, 210, and 215 (f-205, f-210, f-215); the refractive index of each of lenses 205, 210, and 215 (n-205, n-210, and n-215); and the Abbe number of each of lenses 205, 210, and 215 (Vd-205, Vd-210, and Vd-215).

TABLE 5

| | |
|---|---|
| f | 46.1 mm |
| f-205 (corresponding to f1) | 49.1 mm |
| f-210 (corresponding to f2) | 59.7 mm |
| f-215 (corresponding to f3) | −27.2 mm |
| n-205 | 1.525 |
| n-210 | 1.525 |
| n-215 | 1.590 |
| Vd-205 (corresponding to Vd1) | 55.95 |
| Vd-210 (corresponding to Vd2) | 55.95 |
| Vd-215 (corresponding to Vd3) | 30.86 |

In another aspect, optical system 200 may use a variety of different lens materials to implement lenses 205, 210, and 215. In one example, each of lenses 205, 210, and 215 is implemented using a same material, e.g., optical plastic or optical glass. In another example, two of lenses 205, 210, and 215 are implemented using optical plastic (optical glass), while the other one of lenses 205, 210, and 215 is implemented using optical glass (optical plastic). It should be appreciated that the particular optical plastic and/or particular optical glass used may differ between lenses.

In one or more embodiments, one or more or all of lenses 205, 210, and 215 may be implemented using an optical plastic. In an example embodiment, lens 205 is implemented using 480R; lens 210 is implemented using 480R; and lens 215 is implemented using Polystyrene. In this example, the weight of optical system 200 is approximately 68 grams.

An optical system 200 as described in connection with FIG. 2A may be implemented to satisfy the expressions illustrated in Table 6 to provide improved optical performance.

TABLE 6

| Expressions | Value |
|---|---|
| OAL [mm] | 53.14 |
| BFL [mm] | 13.50 |
| D1 [mm] | 0.30 |
| D2 [mm] | 9.89 |
| f1/f | 1.06 |
| f2/f | 1.30 |
| f3/f | −0.59 |
| f1/f2 | 0.82 |
| f2/f3 | −2.20 |

TABLE 6-continued

| Expressions | Value |
|---|---|
| V2 − V3 | 25.09 |
| OAL/f | 1.15 |
| BFL/f | 0.29 |
| r2/f | −0.73 |
| r3/f | 1.39 |
| r4/f | −1.24 |
| r5/f | −0.35 |
| D1/f | 0.007 |
| D2/f | 0.214 |

Figure 2B:
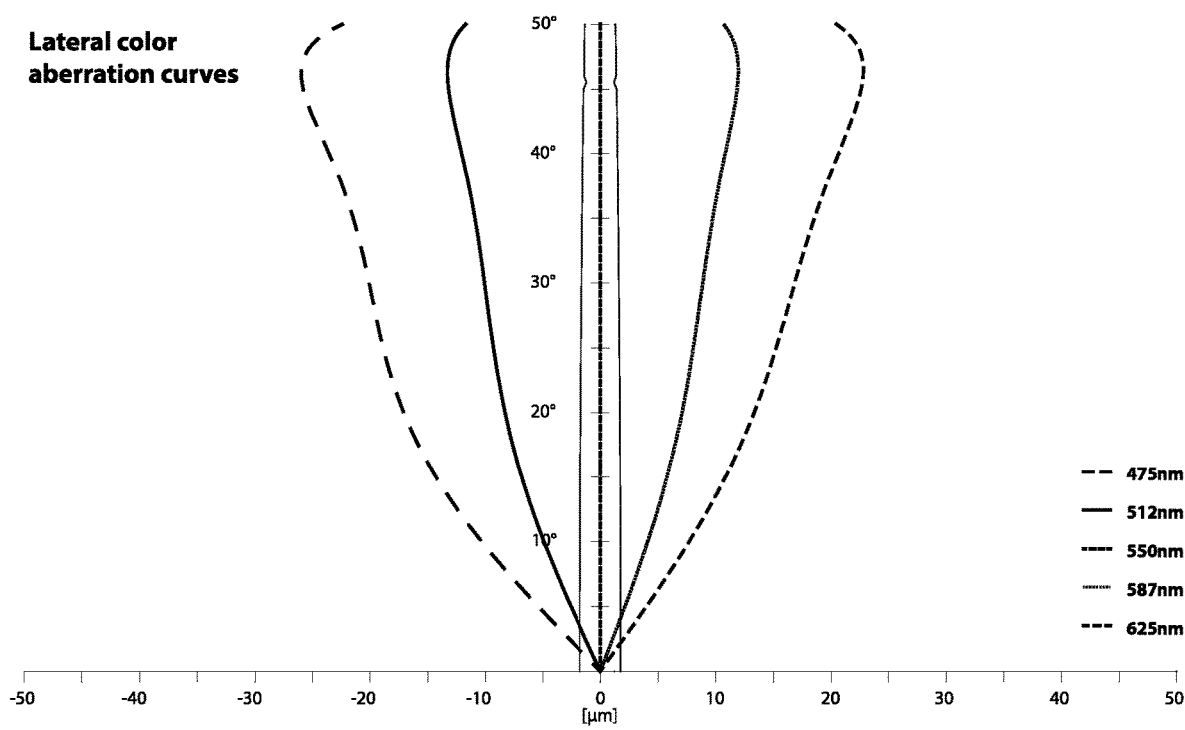
FIG. 2B illustrates lateral color aberration for the optical system of FIG. 2A on the screen side in micrometers.
Figure 2C:
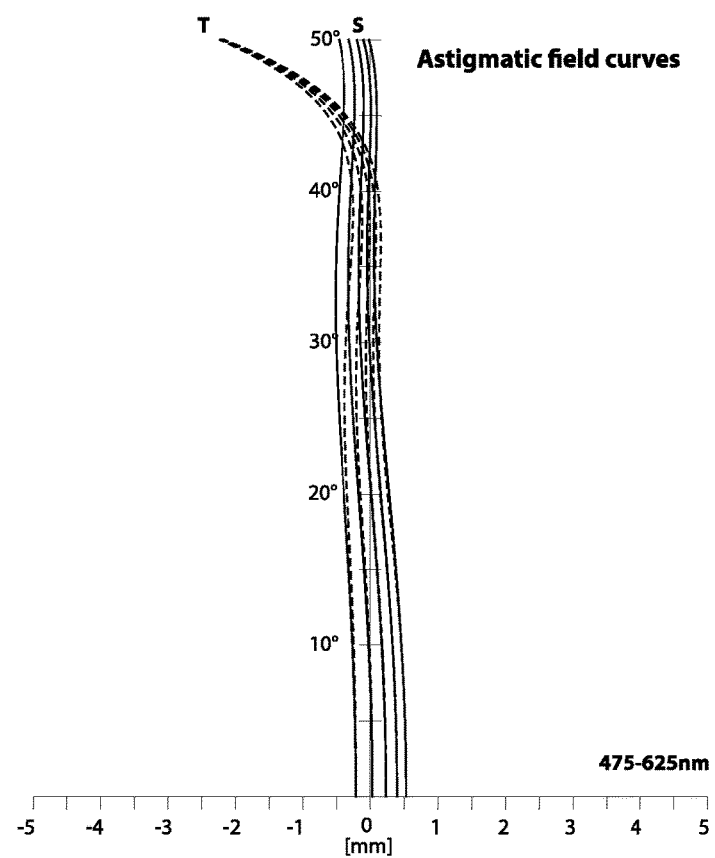
FIG. 2C illustrates field curvature and astigmatism aberrations for the optical system of FIG. 2A on the screen side in millimeters.
Figure 2D:
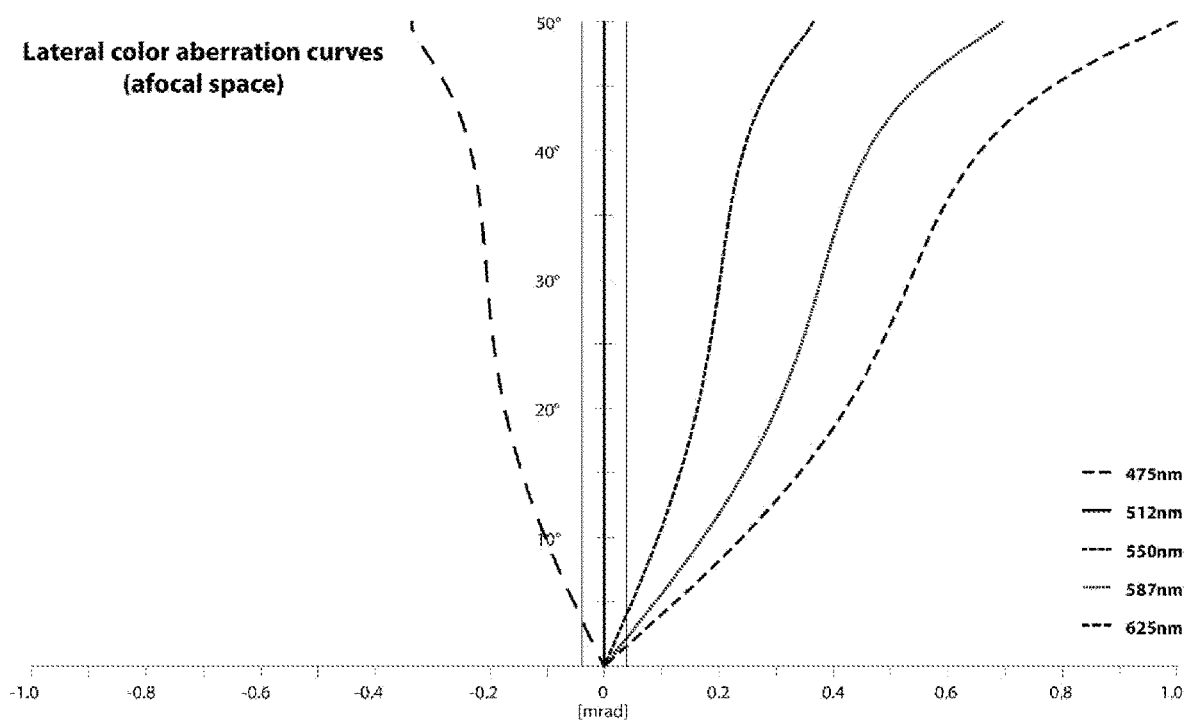
FIG. 2D illustrates lateral color aberration for the optical system of FIG. 2A on the image side in milliradians (afocal space).
Figure 2E:
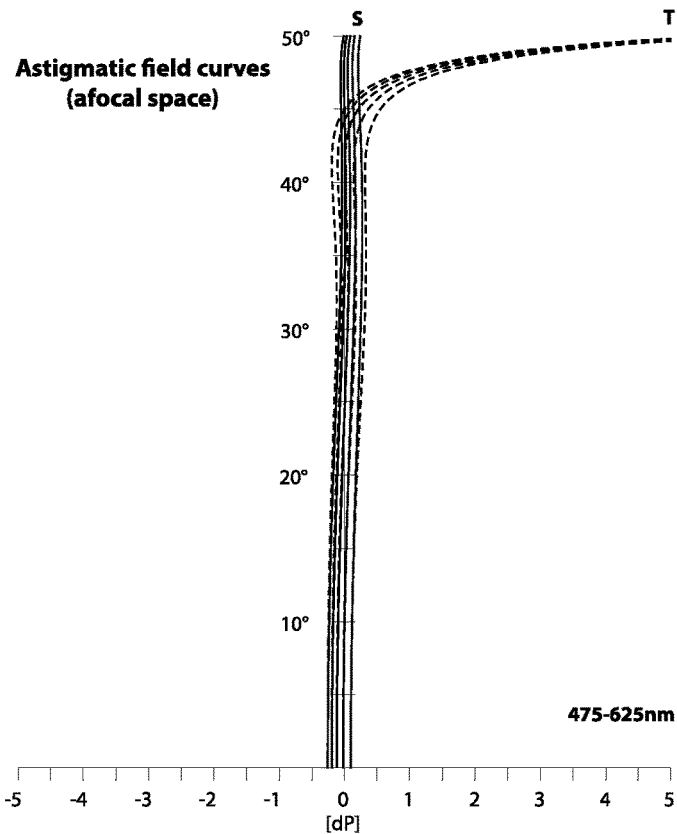
FIG. 2E illustrates field curvature and astigmatism for the optical system of FIG. 2A on the image side in diopter units (afocal space).

FIG. 2B illustrates lateral color aberration for optical system 200 of FIG. 2A on the screen side in micrometers. FIG. 2C illustrates field curvature and astigmatism aberrations for optical system 200 of FIG. 2A on the screen side in millimeters. FIG. 2D illustrates lateral color aberration for optical system 200 of FIG. 2A on the image side in milliradians (afocal space). FIG. 2E illustrates field curvature and astigmatism for optical system 200 of FIG. 2A on the image side in diopter units (afocal space).

Figure 3A:
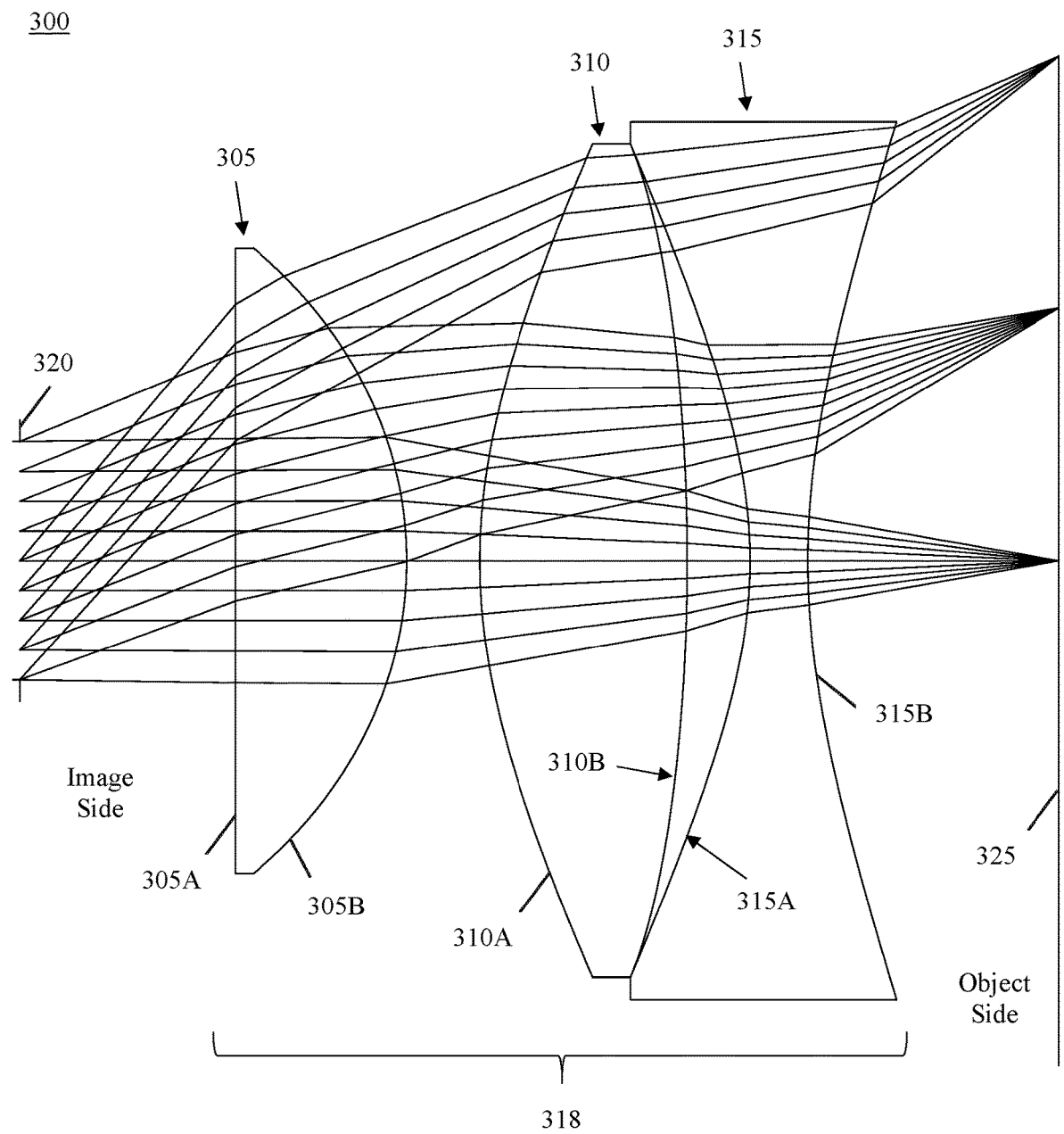
FIG. 3A illustrates another example optical system.

FIG. 3A illustrates another example optical system 300. The weight of optical system 300 is approximately 7% less than the weight of optical system 100. Optical system 300 provides increased eye relief compared to optical system 100, albeit with somewhat reduced performance as to field curvature. Optical system 300 also provides less robust color correction than optical system 100. Optical system 300 includes a first lens 305, a second lens 310, and a third lens 315, which together can form a triplet lens 318. Each of lenses 305, 310, and 315 has an image side surface labeled "A" and an object side surface labeled "B." Surface 320 represents the location or position of the eye box. Surface 325 represents the surface of one or more screens. In this regard, the triplet lens 318 can include the first lens 305, the second lens 310 and the third lens 315, wherein the first lens 305, the second lens 310 and the third lens 315 form an optical path with the side 315B of the third lens 315 facing the surface 325 of one or more screens and adapted to provide an image from the screen to a user. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, the display device may include one or more screens. Optical system 300 provides an optical path formed by lenses 305, 310, and 315 of the triplet lens 318.

In the example of FIG. 3A, lens 305 is the lens that is the most proximal lens of optical system 300 to the placement of the user's eye. Lens 305 can be implemented as a positive lens. In the example of FIG. 3A, lens 305 has a flat surface 305A and a convex surface 305B. In another embodiment, lens 305 is implemented as a positive meniscus lens.

Lens 310 is disposed between lens 305 and lens 315 in the optical path. Lens 310 may be implemented as a positive lens. Surface 305A and surface 305B are implemented as convex surfaces. Lens 310 further may be implemented as a positive aspheric lens.

Lens 315 is the most distal lens from the placement of the user's eye. As such, lens 315 is on the object side of the optical path and is the lens of optical system 300 that is most proximal to the object side. Lens 315 is implemented as a negative lens.

Optical system 300 is capable of providing a DFOV of ±50.5° (101°) and ±33.9 mm (67.8 mm) maximum screen object size. In one or more embodiments, optical system 300 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 300 may be scaled larger (or smaller) thereby resulting in a scaling of the screen image size larger (or smaller).

Optical system 300 is capable of providing an eye relief of 14.5 mm and an eye box diameter of 16 mm for the user pupil.

Table 7 below provides an example of an optical prescription for optical system 300.

TABLE 7

| | Description | Surface Type | Radius [mm] | Thickness [mm] | Semi-Diameter [mm] | Conic |
|---|---|---|---|---|---|---|
| 0 | — | Standard | Infinity | Infinity | Infinity | 0.0000 |
| 1 | Eye pupil (surface 320) | Standard | Infinity | 14.4503 | 8.0000 | 0.0000 |
| 2 | Lens 305, surface 305A | Standard | Infinity | 11.5000 | 19.5000 | 0.0000 |
| 3 | Lens 305, surface 305B | Standard | −25.3756 | 4.8917 | 21.0000 | −0.2356 |
| 4 | Lens 310, surface 310A | Standard | 38.1042 | 13.9292 | 28.0000 | −4.5456 |
| 5 | Lens 310, surface 310B | Standard | −139.2472 | 4.2182 | 28.0000 | 17.9815 |
| 6 | Lens 315, surface 315A | Standard | −31.2416 | 3.9000 | 28.0000 | −5.4046 |
| 7 | Lens 315, surface 315B | Standard | 48.7538 | 16.8420 | 29.5000 | −9.1969 |
| 8 | Screen (surface 325) | Standard | Infinity | — | 35.0000 | 0.0000 |

Table 8 illustrates a variety of additional characteristics of optical system 300. For example, Table 8 shows the overall focal length of optical system 300 (f); the focal length of each of lenses 305, 310, and 315 (f-305, f-310, f-315); the refractive index of each of lenses 305, 310, and 315 (n-305, n-310, and n-315); and the Abbe number of each of lenses 305, 310, and 315 (Vd-305, Vd-310, and Vd-315).

TABLE 8

| | |
|---|---|
| f | 45.7 mm |
| f-305 (corresponding to f1) | 47.4 mm |
| f-310 (corresponding to f2) | 57.4 mm |
| f-315 (corresponding to f3) | −28.8 mm |
| n-305 | 1.534 |
| n-310 | 1.534 |
| n-315 | 1.642 |
| Vd-305 (corresponding to Vd1) | 56.23 |
| Vd-310 (corresponding to Vd2) | 56.23 |
| Vd-315 (corresponding to Vd3) | 22.41 |

In another aspect, optical system 300 may use a variety of different lens materials to implement lenses 305, 310, and 315. In one example, each of lenses 305, 310, and 315 is implemented using a same material, e.g., optical plastic or optical glass. In another example, two of lenses 305, 310, and 315 are implemented using optical plastic (optical glass), while the other one of lenses 305, 310, and 315 is implemented using optical glass (optical plastic). It should be appreciated that the particular optical plastic and/or particular optical glass used may differ between lenses.

In one or more embodiments, one or more or all of lenses 305, 310, and 315 may be implemented using an optical plastic. In an example embodiment, lens 305 is implemented using COC; lens 310 is implemented using COC; and lens 315 is implemented using OKP-1. In this example, the weight of optical system 300 is approximately 70 grams.

An optical system 300 as described in connection with FIG. 3A may be implemented to satisfy the expressions illustrated in Table 9 to provide improved optical performance.

TABLE 9

| Expressions | Value |
|---|---|
| OAL [mm] | 55.28 |
| BFL [mm] | 16.84 |
| D1 [mm] | 4.89 |

TABLE 9-continued

| Expressions | Value |
| --- | --- |
| D2 [mm] | 4.22 |
| f1/f | 1.04 |
| f2/f | 1.26 |
| f3/f | −0.63 |
| f1/f2 | 0.82 |
| f2/f3 | −1.99 |
| V2 − V3 | 33.82 |
| OAL/f | 1.21 |
| BFL/f | 0.37 |
| r2/f | −0.56 |
| r3/f | 0.83 |
| r4/f | −3.05 |
| r5/f | −0.68 |
| D1/f | 0.11 |
| D2/f | 0.09 |

Figure 3B:
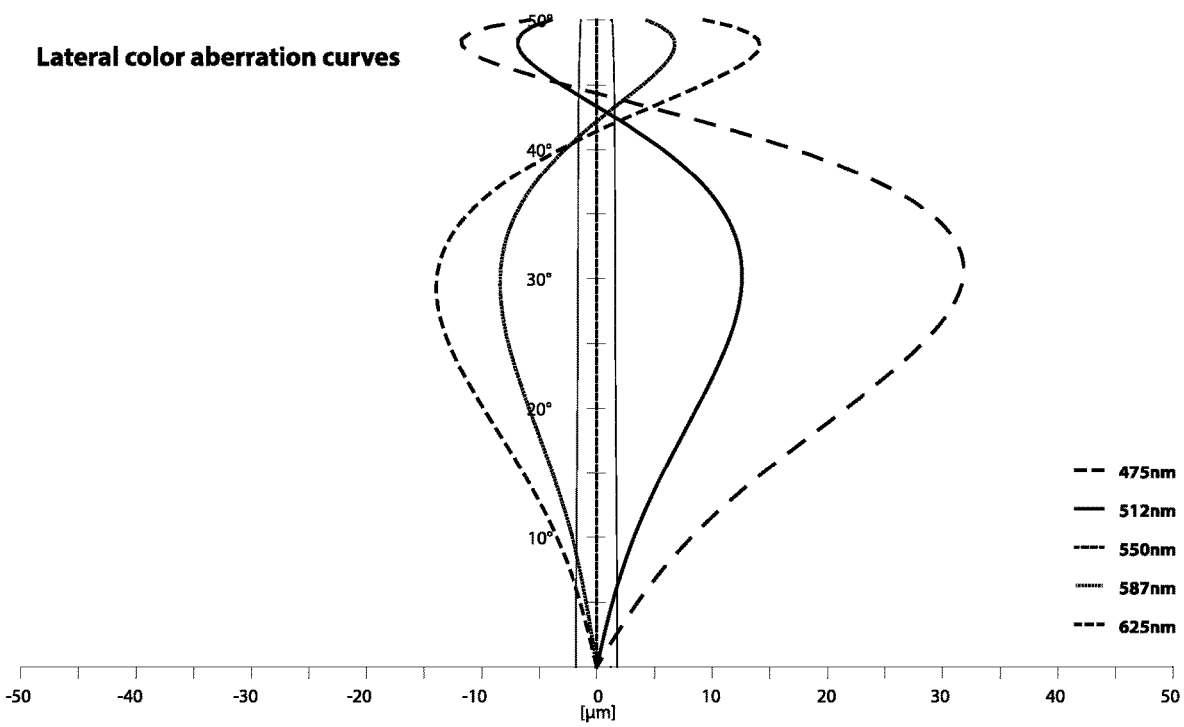
FIG. 3B illustrates lateral color aberration for the optical system of FIG. 3A on the screen side in micrometers.
Figure 3C:
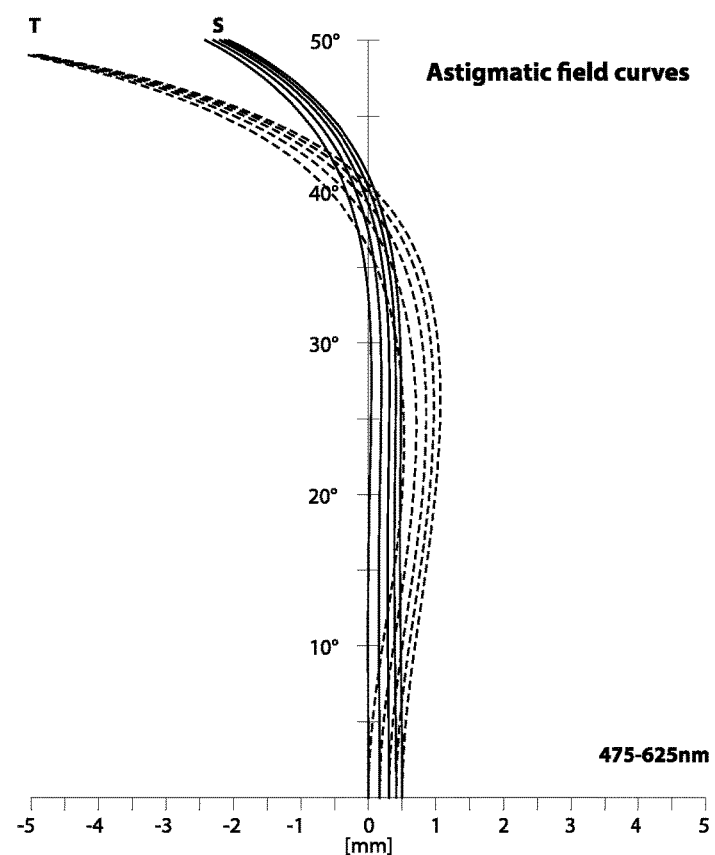
FIG. 3C illustrates field curvature and astigmatism aberrations for the optical system of FIG. 3A on the screen side in millimeters.
Figure 3D:
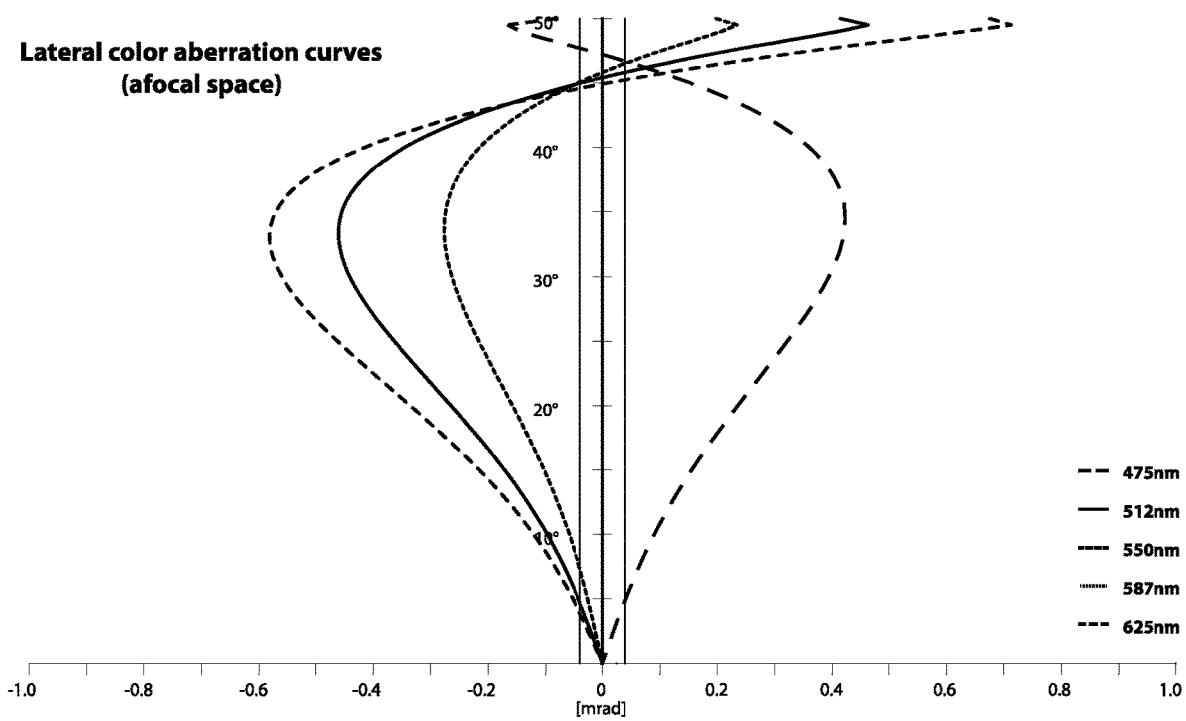
FIG. 3D illustrates lateral color aberration for the optical system of FIG. 3A on the image side in milliradians (afocal space).
Figure 3E:
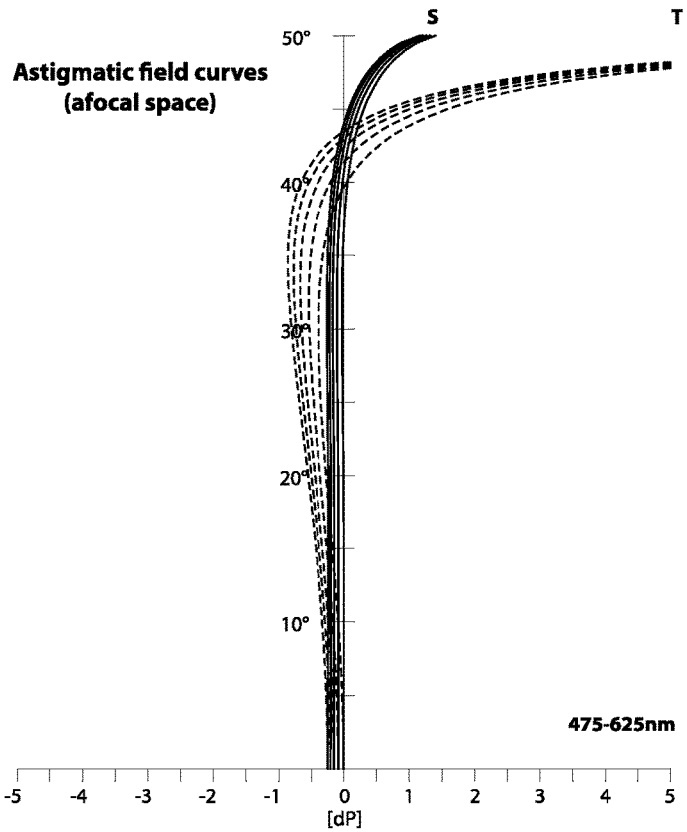
FIG. 3E illustrates field curvature and astigmatism for the optical system of FIG. 3A on the image side in diopter units (afocal space).

FIG. 3B illustrates lateral color aberration for optical system 300 of FIG. 3A on the screen side in micrometers. FIG. 3C illustrates field curvature and astigmatism aberrations for optical system 300 of FIG. 3A on the screen side in millimeters. FIG. 3D illustrates lateral color aberration for optical system 300 of FIG. 3A on the image side in milliradians (afocal space). FIG. 3E illustrates field curvature and astigmatism for optical system 300 of FIG. 3A on the image side in diopter units (afocal space).

Figure 4A:
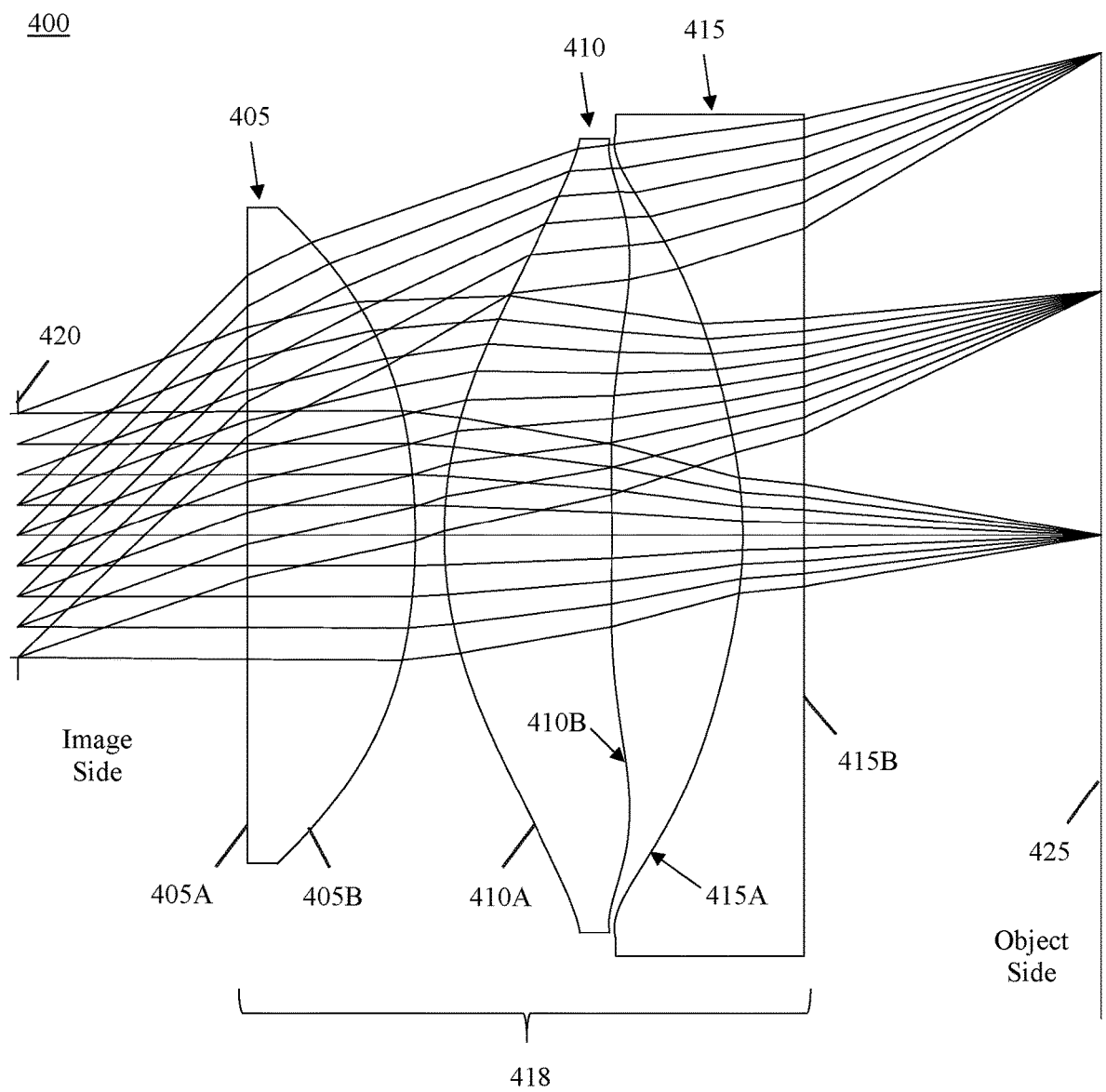
FIG. 4A illustrates another example optical system.

FIG. 4A illustrates another example optical system 400. Optical system 400 has a weight that is approximately 30% less than the weight of optical system 100. Optical system 400 also has a FOV that is approximately 10% narrower than the FOV of optical system 100. Optical system 400 provides somewhat reduced optical performance as to field curvature than optical system 100.

Optical system 400 includes a first lens 405, a second lens 410, and a third lens 415, which together can form a triplet lens 418. Each of lenses 405, 410, and 415 has an image side surface labeled "A" and an object side surface labeled "B." Surface 420 represents a location or position of the eye box. Surface 425 represents the surface of one or more screens. In this regard, the triplet lens 418 can include the first lens 405, the second lens 410 and the third lens 415, wherein the first lens 405, the second lens 410 and the third lens 415 form an optical path with the side 415B of the third lens 415 facing the surface 425 of one or more screens and adapted to provide an image from the screen to a user. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 400 provides an optical path formed by lenses 405, 410, and 415 of the triplet lens 418.

In the example of FIG. 4A, lens 405 is the lens that is the most proximal lens of optical system 400 to the placement of the user's eye. Lens 405 can be implemented as a positive lens. In the example of FIG. 4A, lens 405 has a flat surface 405A and a convex surface 405B. In another embodiment, lens 405 is implemented as a positive meniscus lens.

Lens 410 is disposed between lens 405 and lens 415 in the optical path. Lens 410 may be implemented as a positive lens. In an aspect, lens 410 may be implemented as a positive aspheric lens.

Lens 415 is the most distal lens from the placement of the user's eye. As such, lens 415 is on the object side of the optical path and is the lens of optical system 400 that is most proximal to the object side. Lens 415 can be implemented as a negative lens.

Optical system 400 is capable of providing a DFOV of ±45° (90°) and ±31.7 mm (63.4 mm) maximum screen object size. In one or more embodiments, optical system 400 may be used within a VR headset that is adapted to include one or more screens or receive a display device having a screen. In one example, the display device includes a screen implemented as an LCD/OLED screen used as a stereoscopic display. Examples of a display device may include, but are not limited to, a cell phone, a mobile phone, a portable computing device, a mobile device, etc. Optical system 400 may be scaled larger (or smaller) thereby resulting in a scaling of the screen image size larger (or smaller). Optical system 400 is capable of providing eye relief of 15 mm and an eye box diameter of 16 mm for the user pupil. Eye relief of 15 mm allows a VR headset using optical system 400 for each eyepiece to be used with eyeglasses and/or spectacles.

Table 10 below provides an example of an optical prescription for optical system 400.

TABLE 10

| | Description | Surface Type | Radius [mm] | Thickness [mm] | Semi-Diameter [mm] | Conic | 4th order |
| --- | --- | --- | --- | --- | --- | --- | --- |
| 0 | — | Standard | Infinity | Infinity | Infinity | 0.000 | — |
| 1 | Eye pupil (surface 420) | Standard | Infinity | 15.000 | 8.000 | 0.000 | — |
| 2 | Lens 405, surface 405A | Standard | Infinity | 11.0014 | 20.5865 | 0.000 | — |
| 3 | Lens 405, surface 405B | Even Asphere | −45.203 | 1.8997 | 21.5143 | 0.000 | −2.317 × 10⁻⁵ |
| 4 | Lens 410, surface 410A | Even Asphere | 28.295 | 11.0019 | 26.0298 | 0.000 | 1.634 × 10⁻⁶ |
| 5 | Lens 410, surface 410B | Even Asphere | −182.29 | 8.5425 | 26.3192 | 0.000 | 7.274 × 10⁻⁵ |
| 6 | Lens 415, surface 415A | Even Asphere | −28.359 | 3.9971 | 26.4703 | 0.000 | 4.716 × 10⁻⁵ |
| 7 | Lens 415, surface 415B | Standard | Infinity | 19.5000 | 27.6000 | 0.000 | — |
| 8 | Screen (surface 425) | Standard | Infinity | — | 33.0000 | 0.000 | — |

TABLE 10-continued

|   | 6th order | 8th order | 10th order | 12th order |
|---|---|---|---|---|
| 0 | — | — | — | — |
| 1 | — | — | — | — |
| 2 | — | — | — | — |
| 3 | $9.936 \times 10^{-9}$ | $-1.548 \times 10^{-11}$ | $1.173 \times 10^{-13}$ | $-1.372 \times 10^{-16}$ |
| 4 | $-3.179 \times 10^{-8}$ | $-6.217 \times 10^{-11}$ | $2.186 \times 10^{-13}$ | $-1.785 \times 10^{-16}$ |
| 5 | $-2.591 \times 10^{-7}$ | $3.815 \times 10^{-10}$ | $-3.269 \times 10^{-13}$ | $1.572 \times 10^{-16}$ |
| 6 | $-1.626 \times 10^{-7}$ | $3.415 \times 10^{-10}$ | $-4.062 \times 10^{-13}$ | $2.446 \times 10^{-16}$ |
| 7 | — | — | — | — |
| 8 | — | — | — | — |

Table 11 illustrates a variety of additional characteristics of optical system 400. For example, Table 11 shows the overall focal length of optical system 400 (f); the focal length of each of lenses 405, 410, and 415 (f-405, f-410, f-415); the refractive index of each of lenses 405, 410, and 415 (n-405, n-410, and n-415); and the Abbe number of each of lenses 405, 410, and 415 (Vd-405, Vd-410, and Vd-415).

TABLE 11

| f | 46.3 mm |
|---|---|
| f-405 (corresponding to f1) | 84.4 mm |
| f-410 (corresponding to f2) | 46.6 mm |
| f-415 (corresponding to f3) | -43.8 mm |
| n-405 | 1.534 |
| n-410 | 1.534 |
| n-415 | 1.642 |
| Vd-405 (corresponding to Vd1) | 56.23 |
| Vd-410 (corresponding to Vd2) | 56.23 |
| Vd-415 (corresponding to Vd3) | 22.41 |

Optical system 400 may use a variety of different lens materials to implement lenses 405, 410, and 415. In one example, each of lenses 405, 410, and 415 is implemented using a same material, e.g., optical plastic or optical glass. In another example, two of lenses 405, 410, and 415 are implemented using optical plastic (optical glass), while the other one of lenses 405, 410, and 415 is implemented using optical glass (optical plastic). It should be appreciated that the particular optical plastic and/or particular optical glass used may differ between lenses.

In one or more embodiments, one or more or all of lenses 405, 410, and 415 may be implemented using an optical plastic. In an example embodiment, lens 405 is implemented using COC; lens 410 is implemented using COC; and lens 415 is implemented using OKP-1. In this example, the weight of optical system 400 is approximately 50 grams.

An optical system 400 as described in connection with FIG. 4A may be implemented to satisfy the expressions illustrated in Table 12 to provide improved optical performance.

TABLE 12

| Expression | Value |
|---|---|
| OAL [mm] | 55.93 |
| BFL [mm] | 19.50 |
| D1 [mm] | 1.90 |
| D2 [mm] | 8.54 |
| f1/f | 1.82 |
| f2/f | 1.00 |
| f3/f | -0.95 |
| f1/f2 | 1.81 |
| f2/f3 | -1.06 |
| V2 − V3 | 33.82 |

TABLE 12-continued

| Expression | Value |
|---|---|
| OAL/f | 1.21 |
| BFL/f | 0.42 |
| r2/f | -0.98 |
| r3/f | 0.61 |
| r4/f | -3.94 |
| r5/f | -0.61 |
| D1/f | 0.04 |
| D2/f | 0.18 |

Figure 4B:
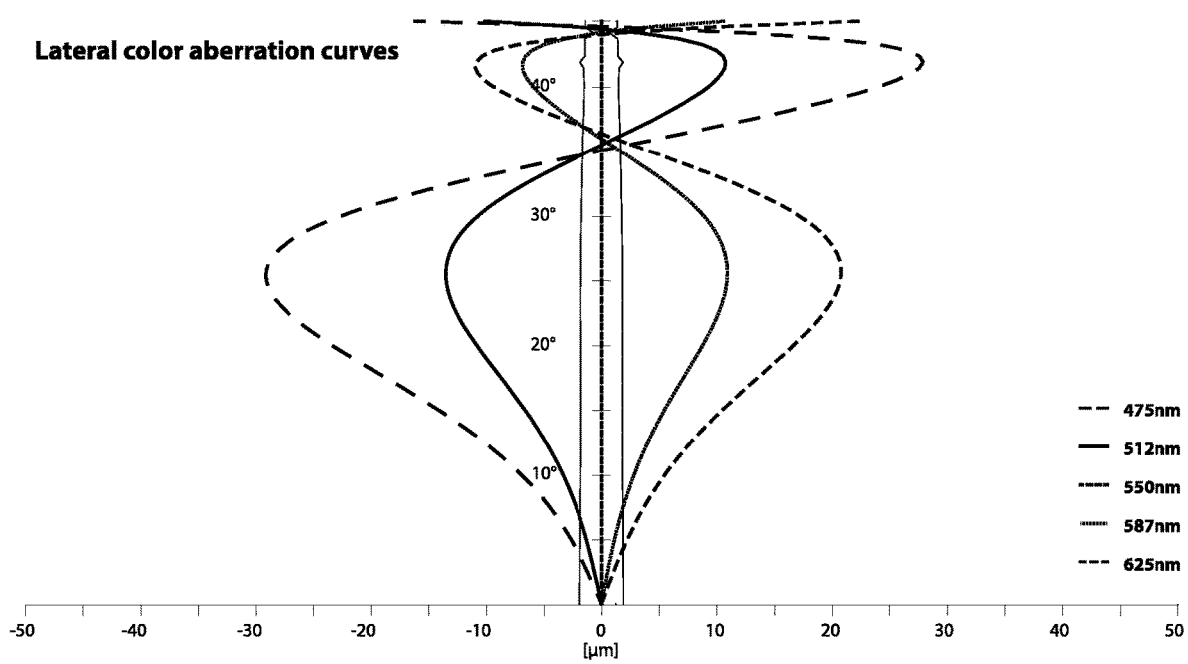
FIG. 4B illustrates lateral color aberration for the optical system of FIG. 4A on the screen side in micrometers.
Figure 4C:
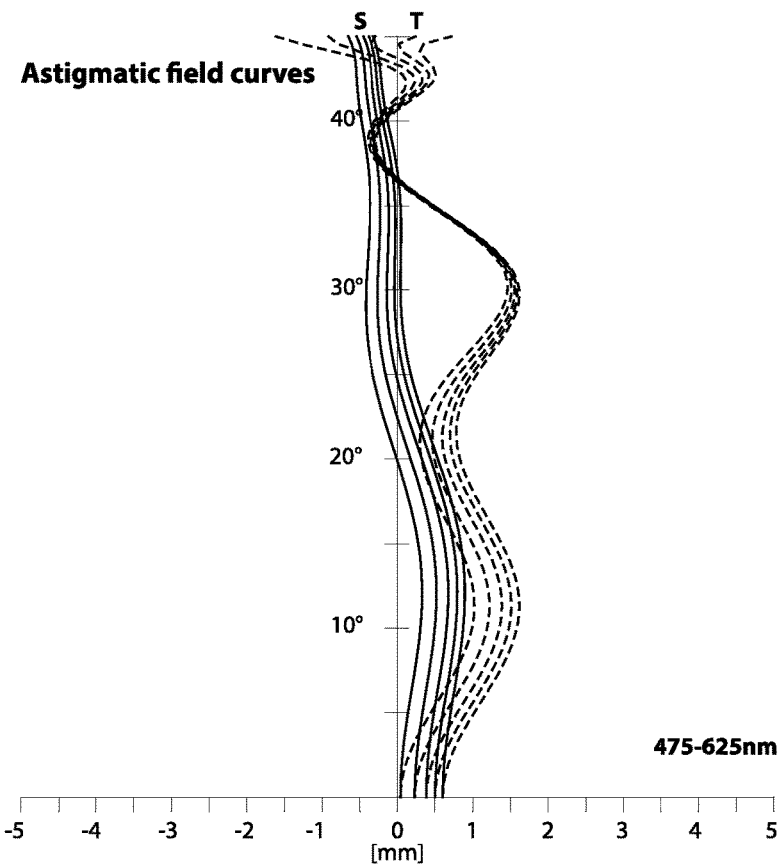
FIG. 4C illustrates field curvature and astigmatism aberrations for the optical system of FIG. 4A on the screen side in millimeters.
Figure 4D:
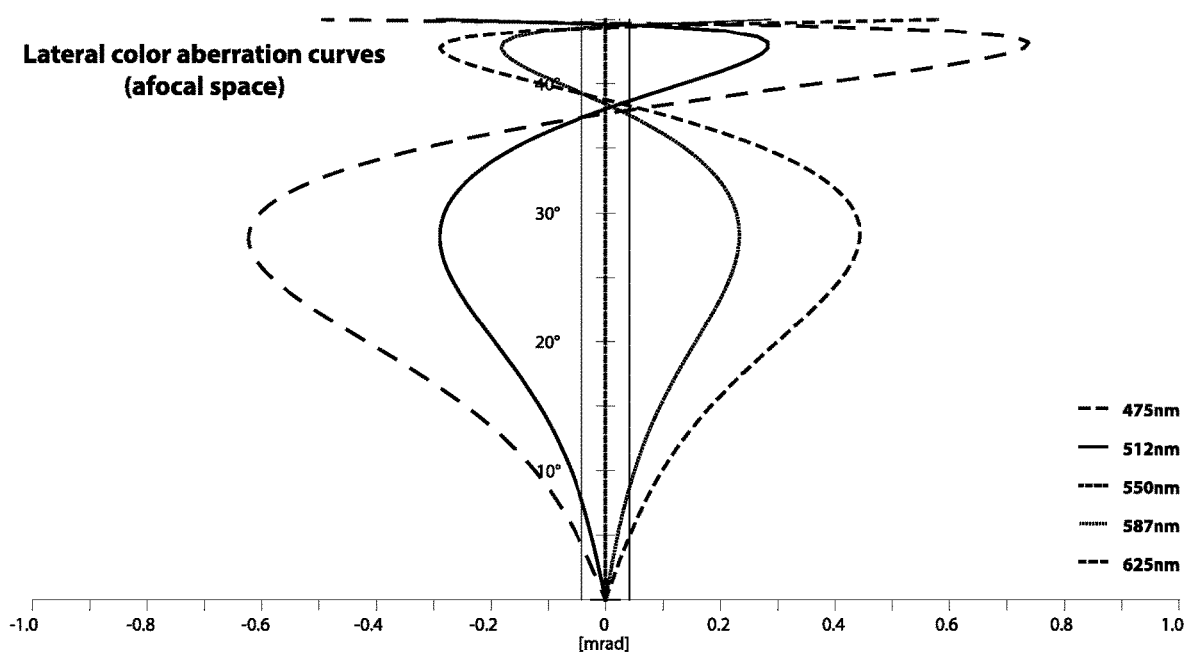
FIG. 4D illustrates lateral color aberration for the optical system of FIG. 4A on the image side in milliradians (afocal space).
Figure 4E:
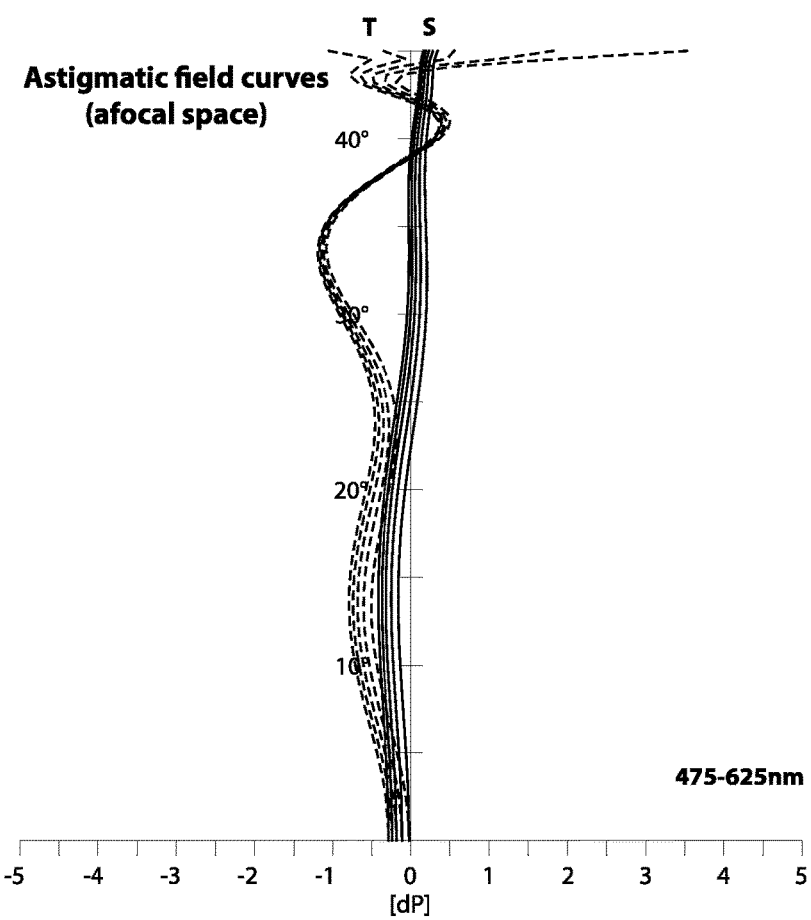
FIG. 4E illustrates field curvature and astigmatism for the optical system of FIG. 4A on the image side in diopter units (afocal space).

FIG. 4B illustrates lateral color aberration for optical system 400 of FIG. 4A on the screen side in micrometers. FIG. 4C illustrates field curvature and astigmatism aberrations for optical system 400 of FIG. 4A on the screen side in millimeters. FIG. 4D illustrates lateral color aberration for optical system 400 of FIG. 4A on the image side in milliradians (afocal space). FIG. 4E illustrates field curvature and astigmatism for optical system 400 of FIG. 4A on the image side in diopter units (afocal space).

Figure 5A:
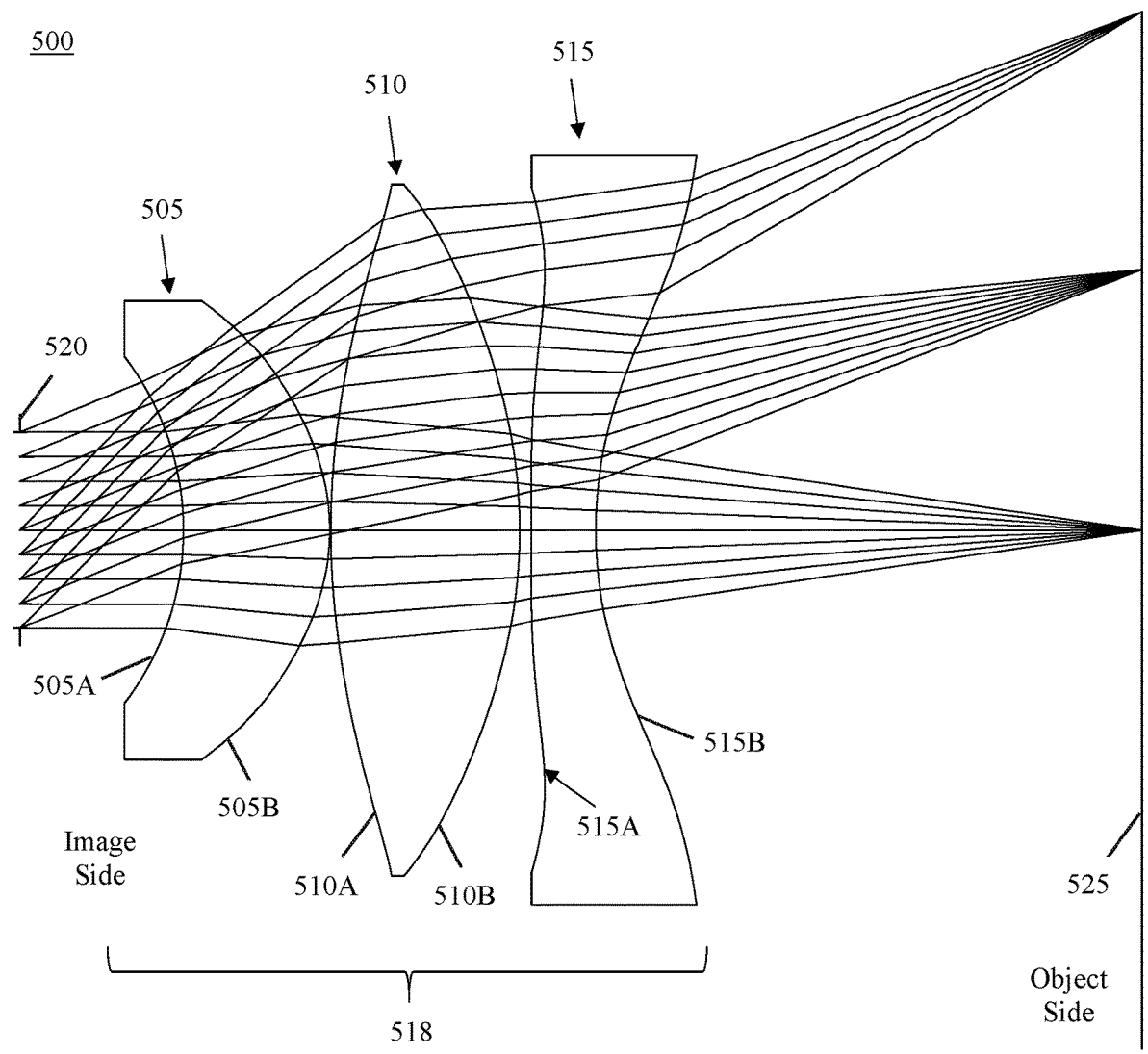
FIG. 5A illustrates another example optical system.

FIG. 5A illustrates an example optical system 500. Optical system 500 has a weight that is approximately 60% less than the weight of optical system 100. Optical system 500 also has a FOV that is approximately 10% narrower than the FOV of optical system 100. Optical system 500 has a 25% smaller eye box size than optical system 100. Further, optical system 500 provides reduced optical performance compared to optical system 100 of FIG. 1 as to field curvature with introduced zonal astigmatism.

Optical system 500 includes a first lens 505, a second lens 510, and a third lens 515, which together can form a triplet lens 518. Each of lenses 505, 510, and 515 has an image side surface labeled "A" and an object side surface labeled "B." Surface 520 represents a location or position of the eye box. Surface 525 represents a surface of one or more screens. In this regard, the triplet lens 518 an include the first lens 505, the second lens 510 and the third lens 515, wherein the first lens 505, the second lens 510 and the third lens 515 form an optical path with the side 515B of the third lens 515 facing the surface 525 of one or more screens and adapted to provide an image from the screen to a user. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 500 provides an optical path formed by lenses 505, 510, and 515 of the triplet lens 518.

In the example of FIG. 5A, lens 505 is the lens that is the most proximal lens of optical system 500 to the placement of the user's eye. Lens 505 can have positive refractive power. In an embodiment, lens 505 may be a positive meniscus lens.

Lens 510 is disposed between lens 505 and lens 515 in the optical path. Lens 510 may be implemented with positive refractive power. In an embodiment, lens 510 may be implemented as a positive biconvex lens.

Lens 515 is the most distal lens from the placement of the user's eye. As such, lens 515 is on the object side of the optical path and is the lens of optical system 500 that is most proximal to the object side. Lens 515 is implemented with negative refractive power. In an embodiment, lens 515 is implemented as a negative meniscus lens. Lens 515 can also have a center portion that has a negative meniscus shape and an outer portion that has a different shape.

Optical system 500 is capable of providing a DFOV of ±45° (90°) and ±31.3 mm (62.6 mm) maximum screen object size. In one or more embodiments, optical system 500 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 500 may be scaled larger (or smaller) thereby resulting in a scaling of the screen image size larger (or smaller). Optical system 500 is capable of providing an eye relief of 10 mm and an eye box diameter of 12 mm for the user pupil. Eye relief of 12 mm allows a VR headset using optical system 500 for each eyepiece to be used with eyeglasses and/or spectacles.

Table 13 provides an example of an optical prescription for optical system 500.

Table 14 illustrates a variety of additional characteristics of optical system 500. For example, Table 14 shows the overall focal length of optical system 500($f$); the focal length of each of lenses 505, 510, and 515 (f-505, f-510, f-515); the refractive index of each of lenses 505, 510, and 515 (n-505, n-510, and n-515); and the Abbe number of each of lenses 505, 510, and 515 (Vd-505, Vd-510, and Vd-515).

TABLE 14

| | |
|---|---|
| f | 41 mm |
| f-505 (corresponding to f1) | 62.0 mm |
| f-510 (corresponding to f2) | 37.2 mm |
| f-515 (corresponding to f3) | −38.5 mm |
| n-505 | 1.534 |
| n-510 | 1.534 |
| n-515 | 1.642 |
| Vd-505 (corresponding to Vd1) | 56.23 |
| Vd-510 (corresponding to Vd2) | 56.23 |
| Vd-515 (corresponding to Vd3) | 22.41 |

Optical system 500 may use a variety of different lens materials to implement lenses 505, 510, and 515. In one example, each of lenses 505, 510, and 515 may be implemented using a same material, e.g., optical plastic or optical glass. In another example, two of lenses 505, 510, and 515 are implemented using optical plastic (optical glass), while the other one of lenses 505, 510, and 515 is implemented using optical glass (optical plastic). It should be appreciated that the particular optical plastic and/or particular optical glass used may differ between lenses.

In one or more embodiments, one or more or all of lenses 505, 510, and 515 are implemented using an optical plastic. In an example embodiment, lens 505 is implemented using Cyclic olefin copolymer (COC); lens 510 is implemented

TABLE 13

| | Description | Surface Type | Radius [mm] | Thickness [mm] | Semi-Diameter [mm] | Conic | $4^{th}$ order |
|---|---|---|---|---|---|---|---|
| 0 | — | Standard | Infinity | Infinity | Infinity | 0.000 | — |
| 1 | Eye pupil (surface 520) | Standard | Infinity | 10.000 | 6.000 | 0.000 | — |
| 2 | Lens 505, surface 505A | Standard | −17.454 | 8.995 | 10.623 | 0.000 | — |
| 3 | Lens 505, surface 505B | Even Asphere | −13.499 | 0.066 | 14.087 | −0.867 | $-1.880 \times 10^{-5}$ |
| 4 | Lens 510, surface 510A | Even Asphere | 48.624 | 11.562 | 21.200 | 0.000 | $-7.322 \times 10^{-6}$ |
| 5 | Lens 510, surface 510B | Even Asphere | −30.989 | 0.709 | 21.200 | 0.000 | $8.203 \times 10^{-6}$ |
| 6 | Lens 515, surface 515A | Even Asphere | −590.05 | 3.978 | 21.000 | 0.000 | $6.309 \times 10^{-5}$ |
| 7 | Lens 515, surface 515B | Even Asphere | 26.117 | 33.5000 | 23.000 | 0.000 | $1.818 \times 10^{-5}$ |
| 8 | Screen (surface 525) | Standard | Infinity | — | 33.0000 | 0.000 | — |

| | $6^{th}$ order | $8^{th}$ order | $10^{th}$ order | $12^{th}$ order |
|---|---|---|---|---|
| 0 | — | — | — | — |
| 1 | — | — | — | — |
| 2 | — | — | — | — |
| 3 | $2.375 \times 10^{-8}$ | $-1.362 \times 10^{-9}$ | $2.965 \times 10^{-12}$ | — |
| 4 | $9.957 \times 10^{-9}$ | $6.896 \times 10^{-13}$ | $-3.276 \times 10^{-14}$ | — |
| 5 | $1.206 \times 10^{-8}$ | $-4.122 \times 10^{-11}$ | $1.221 \times 10^{-14}$ | — |
| 6 | $-2.679 \times 10^{-7}$ | $3.781 \times 10^{-10}$ | $-2.386 \times 10^{-13}$ | $1.046 \times 10^{-16}$ |
| 7 | $-1.995 \times 10^{-7}$ | $3.092 \times 10^{-10}$ | $-1.410 \times 10^{-13}$ | $-6.816 \times 10^{-17}$ |
| 8 | — | — | — | — | using COC; and lens 515 is implemented using OKP-1. In this example, the weight of optical system 500 is approximately 29 grams.

An optical system 500 as described in connection with FIG. 5 may be implemented to satisfy the expressions illustrated in Table 15 to provide improved optical performance.

TABLE 15

| Expression | Value |
|---|---|
| OAL [mm] | 58.81 |
| BFL [mm] | 33.50 |
| D1 [mm] | 0.07 |
| D2 [mm] | 0.71 |
| f1/f | 1.51 |
| f2/f | 0.91 |
| f3/f | −0.94 |
| f1/f2 | 1.67 |
| f2/f3 | −0.97 |
| V2 − V3 | 33.82 |
| OAL/f | 1.43 |
| BFL/f | 0.82 |
| r2/f | −0.33 |
| r3/f | 1.19 |
| r4/f | −0.76 |
| r5/f | −14.4 |
| D1/f | 0.00 |
| D2/f | 0.02 |

Figure 5B:
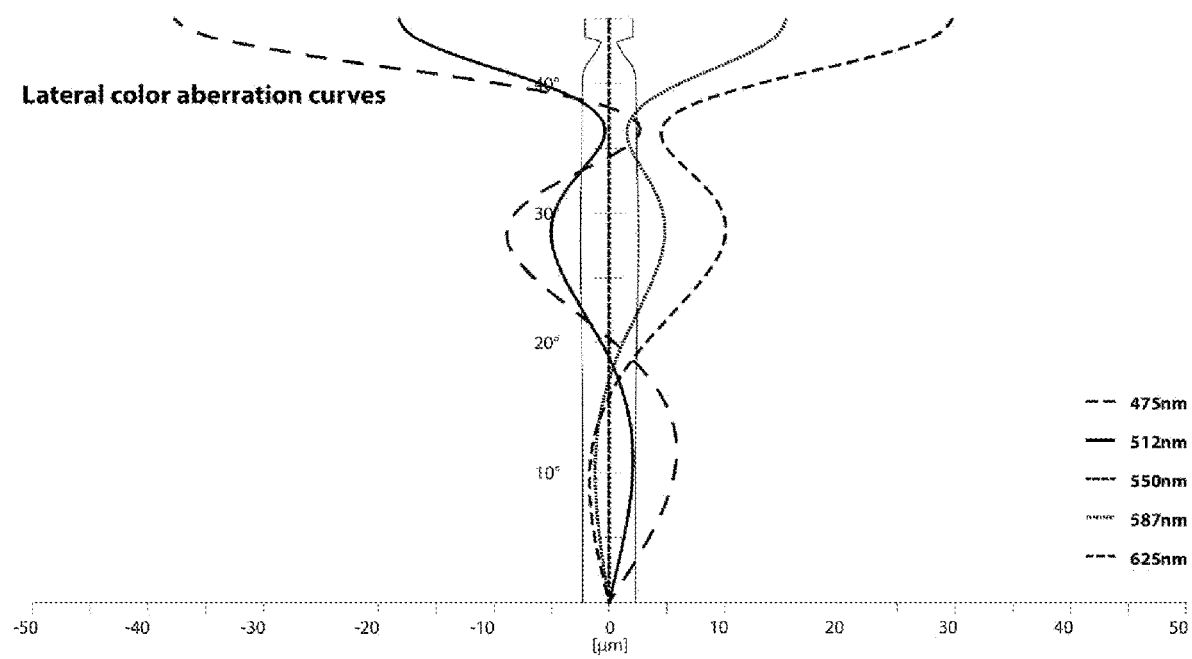
FIG. 5B illustrates lateral color aberration for the optical system of FIG. 5A on the screen side in micrometers.
Figure 5C:
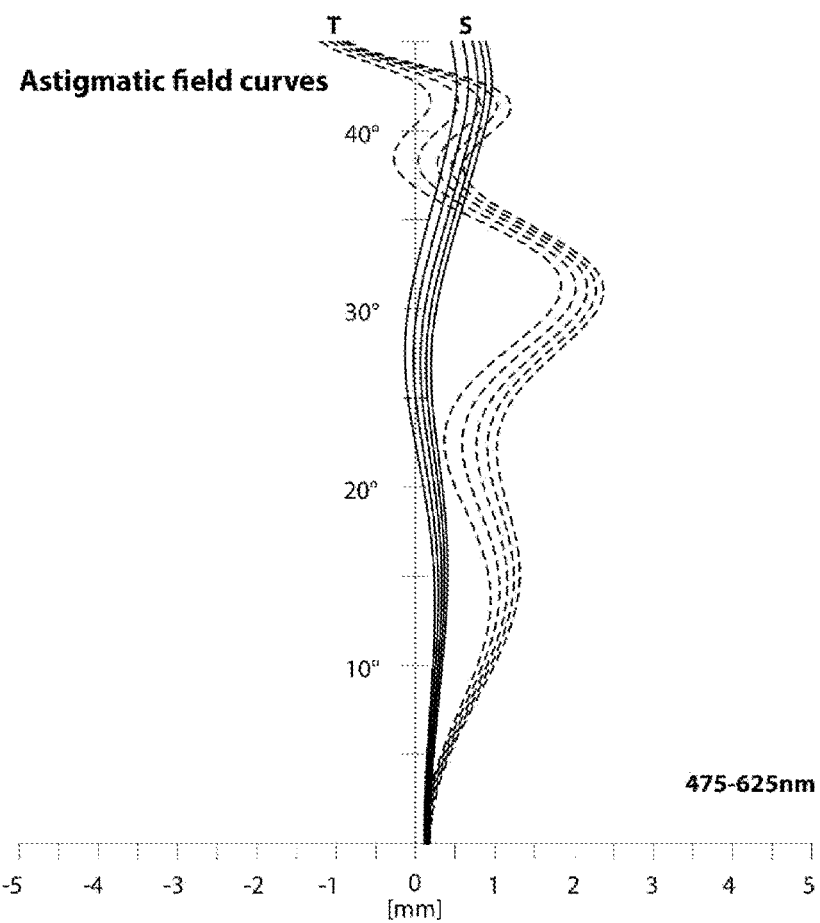
FIG. 5C illustrates field curvature and astigmatism aberrations for the optical system of FIG. 5A on the screen side in millimeters.
Figure 5D:
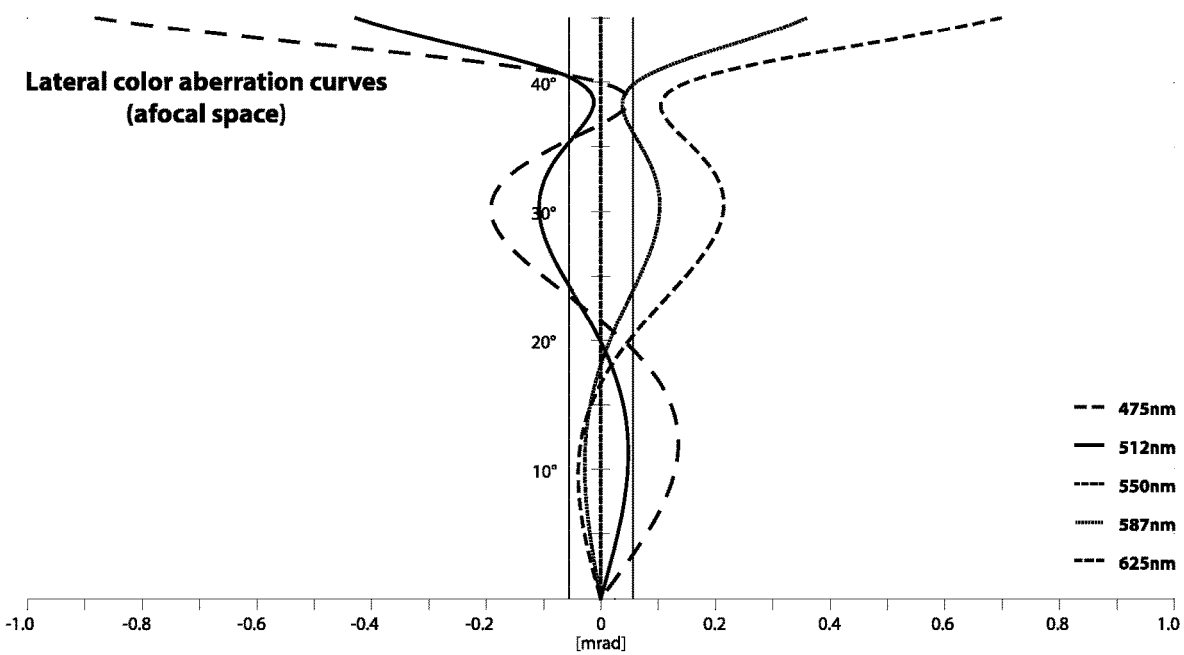
FIG. 5D illustrates lateral color aberration for the optical system of FIG. 5A on the image side in milliradians (afocal space).
Figure 5E:
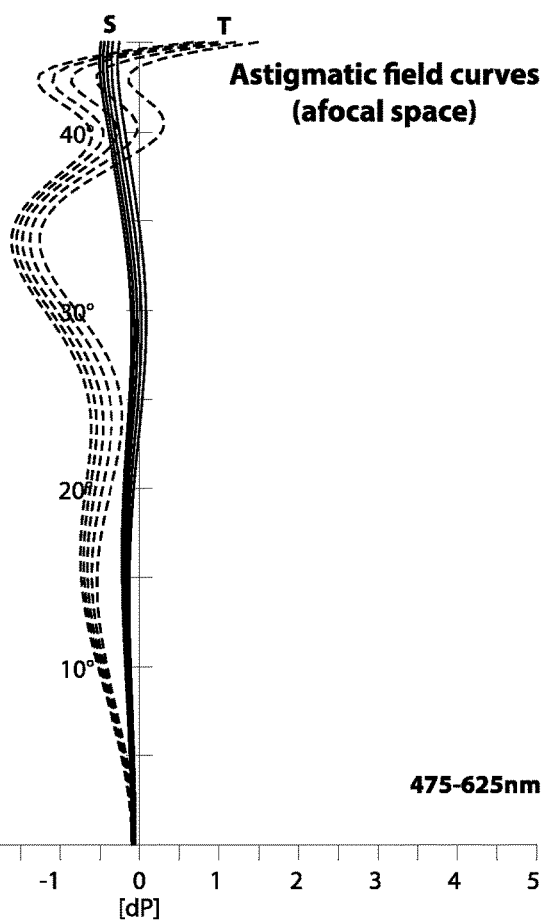
FIG. 5E illustrates field curvature and astigmatism for the optical system of FIG. 5A on the image side in diopter units (afocal space).

FIG. 5B illustrates lateral color aberration for optical system 500 of FIG. 5A on the screen side in micrometers. FIG. 5C illustrates field curvature and astigmatism aberrations for optical system 500 of FIG. 5A on the screen side in millimeters. FIG. 5D illustrates lateral color aberration for optical system 500 of FIG. 5A on the image side in milliradians (afocal space). FIG. 5E illustrates field curvature and astigmatism for optical system 500 of FIG. 5A on the image side in diopter units (afocal space).

Figure 6A:
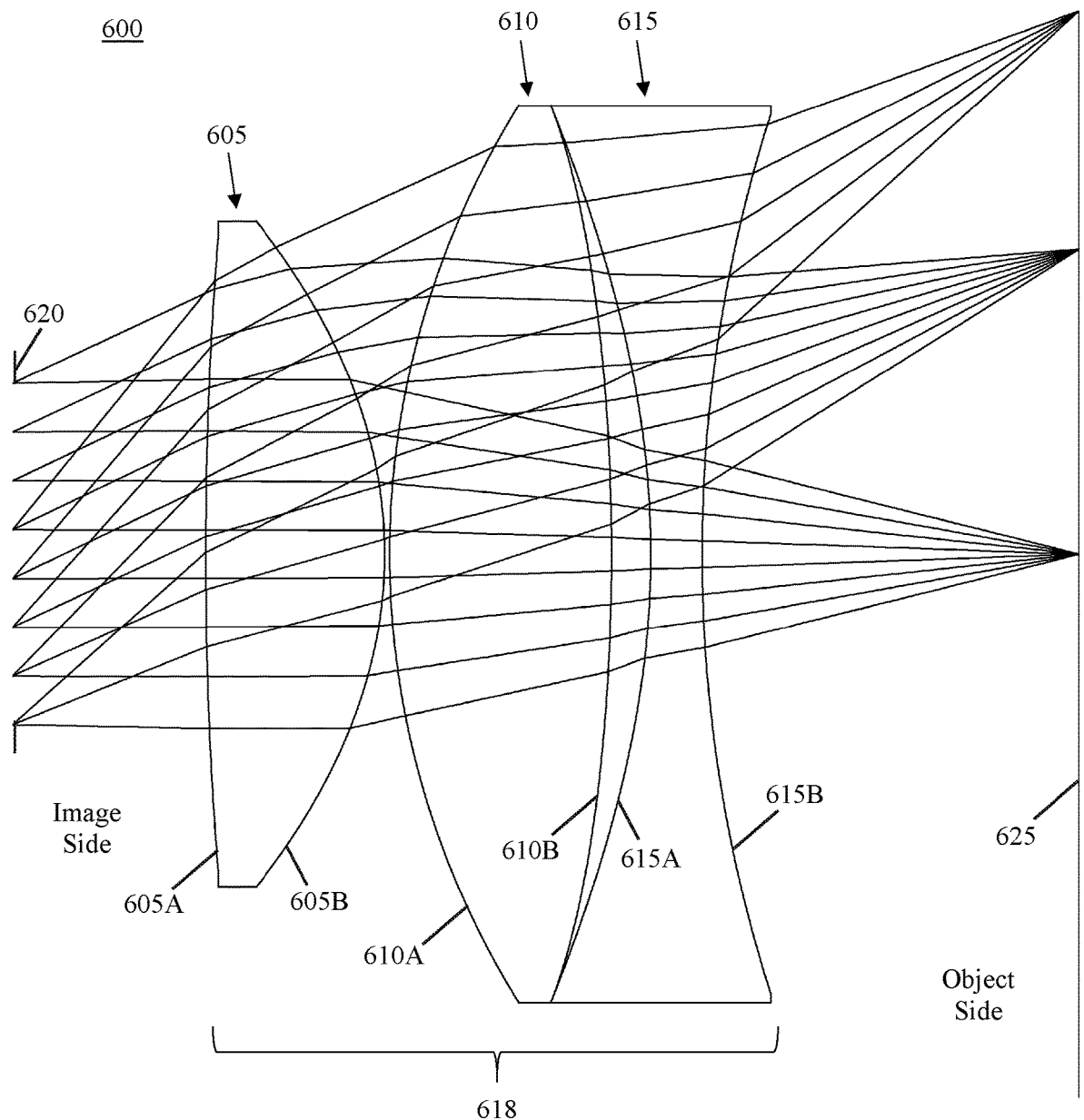
FIG. 6A illustrates another example optical system.

FIG. 6A illustrates an example optical system 600. Optical system 600 has a weight that is approximately 42% less than the weight of optical system 100. Optical system 600 also has a FOV that is approximately up to 4% wider (110°) than the FOV of optical system 100. Optical system 600 has up to 25% larger eye box size than optical system 100. Further, optical system 600 provides reduced optical performance compared to optical system 100 of FIG. 1 as to field curvature with introduced zonal astigmatism.

Optical system 600 includes a first lens 605, a second lens 610, and a third lens 615, which together can form a triplet lens 618. Each of lenses 605, 610, and 615 has an image side surface labeled "A" and an object side surface labeled "B." Surface 620 represents a location or position of the eye box. Surface 625 represents a surface of one or more screens. In this regard, the triplet lens 618 an include the first lens 605, the second lens 610 and the third lens 615, wherein the first lens 605, the second lens 610 and the third lens 615 form an optical path with the side 615B of the third lens 615 facing the surface 625 of one or more screens and adapted to provide an image from the screen to a user. In one aspect, one or more screens are integrated into a VR headset. In that case, for example, the screen(s) are not removable. In another aspect, the screen is part of a display device that may be used with the VR headset. In this latter example, the display device is removable from the VR headset. Appreciably, a display device may include one or more screens. Optical system 600 provides an optical path formed by lenses 605, 610, and 615 of the triplet lens 618.

In the example of FIG. 6A, lens 605 is the lens that is the most proximal lens of optical system 600 to the placement of the user's eye. Lens 605 can have positive refractive power. In this example, lens 605 has a surface 605A that is slightly convex and a surface 605B that is more sharply convex. In an embodiment, lens 605 may be a positive meniscus lens.

Lens 610 is disposed between lens 605 and lens 615 in the optical path. Lens 610 may be implemented with positive refractive power. Surface 605A and surface 605B are implemented as convex surfaces. Lens 610 further may be implemented as a positive aspheric lens.

Lens 615 is the most distal lens from the placement of the user's eye. As such, lens 615 is on the object side of the optical path and is the lens of optical system 600 that is most proximal to the object side. Lens 615 is implemented as a negative lens.

Optical system 600 is capable of providing a DFOV of ±55° (110°) and ±32.5 mm (65.0 mm) maximum screen object size. In one or more embodiments, optical system 600 may be used within a VR headset that is adapted to include one or more screens or receive a display device having a screen. In one example, the display device includes a single screen implemented as an LCD/OLED screen used as a stereoscopic display. Examples of a display device may include, but are not limited to, a cell phone, a mobile phone, a portable computing device, a mobile device, etc. Optical system 600 may be scaled larger (or smaller) thereby resulting in a scaling of the screen image size larger (or smaller). Optical system 600 is capable of providing an eye relief of 11.3 mm and an eye box diameter of 20 mm for the user pupil.

Table 16 provides an example of an optical prescription for optical system 600.

TABLE 16

| | Description | Surface Type | Radius [mm] | Thickness [mm] | Semi-Diameter [mm] | Conic |
|---|---|---|---|---|---|---|
| 0 | — | Standard | Infinity | Infinity | Infinity | 0.0000 |
| 1 | Eye pupil (surface 620) | Standard | Infinity | 11.2840 | 10.000 | 0.0000 |
| 2 | Lens 605, surface 605A | Standard | 237.5756 | 10.5000 | 19.0000 | 0.0000 |
| 3 | Lens 605, surface 605B | Standard | −25.9174 | 0.2901 | 19.5000 | −0.8215 |
| 4 | Lens 610, surface 610A | Standard | 49.2261 | 13.0000 | 25.2800 | −0.0900 |
| 5 | Lens 610, surface 610B | Standard | −128.3477 | 2.3025 | 26.2817 | 16.4113 |
| 6 | Lens 615, surface 615A | Standard | −51.9913 | 3.0000 | 26.2817 | −3.4315 |
| 7 | Lens 615, surface 615B | Standard | 84.8187 | 22.1000 | 25.7817 | 0.0000 |
| 8 | Screen (surface 625) | Standard | Infinity | — | 32.0000 | 0.0000 |

Table 17 illustrates a variety of additional characteristics of optical system 600. For example, Table 17 shows the overall focal length of optical system 600 (f); the focal length of each of lenses 605, 610, and 615 (f-605, f-610, f-615); the refractive index of each of lenses 605, 610, and 615 (n-605, n-610, and n-615); and the Abbe number of each of lenses 605, 610, and 615 (Vd-605, Vd-610, and Vd-615).

TABLE 17

| | |
|---|---|
| f | 40.1 mm |
| f-605 (corresponding to f1) | 44.9 mm |
| f-610 (corresponding to f2) | 69.2 mm |
| f-615 (corresponding to f3) | −53.8 mm |
| n-605 | 1.525 |
| n-610 | 1.525 |
| n-615 | 1.590 |
| Vd-605 (corresponding to Vd1) | 55.95 |
| Vd-610 (corresponding to Vd2) | 55.95 |
| Vd-615 (corresponding to Vd3) | 30.87 |

Optical system 600 may use a variety of different lens materials to implement lenses 605, 610, and 615. In one example, each of lenses 605, 610, and 615 may be implemented using a same material, e.g., optical plastic or optical glass. In another example, two of lenses 605, 610, and 615 are implemented using optical plastic (optical glass), while the other one of lenses 605, 610, and 615 is implemented using optical glass (optical plastic). It should be appreciated that the particular optical plastic and/or particular optical glass used may differ between lenses.

In one or more embodiments, one or more or all of lenses 605, 610, and 615 are implemented using an optical plastic. In an example embodiment, lens 605 is implemented using Zeonex 480R; lens 610 is implemented using Zeonex 480R; and lens 615 is implemented using Polystyrene. In this example, the weight of optical system 600 is approximately 43.8 grams.

An optical system 600 as described in connection with FIG. 6 may be implemented to satisfy the expressions illustrated in Table 18 to provide improved optical performance.

TABLE 18

| Expression | Value |
|---|---|
| OAL [mm] | 51.12 |
| BFL [mm] | 22.10 |
| D1 [mm] | 0.29 |
| D2 [mm] | 2.30 |
| f1/f | 1.12 |
| f2/f | 1.73 |
| f3/f | −1.34 |
| f1/f2 | 0.65 |
| f2/f3 | −1.29 |
| V2 − V3 | 25.08 |
| OAL/f | 1.27 |
| BFL/f | 0.55 |
| r2/f | −0.65 |
| r3/f | 1.29 |
| r4/f | −3.20 |
| r5/f | −1.30 |
| D1/f | 0.007 |
| D2/f | 0.057 |

Figure 6B:
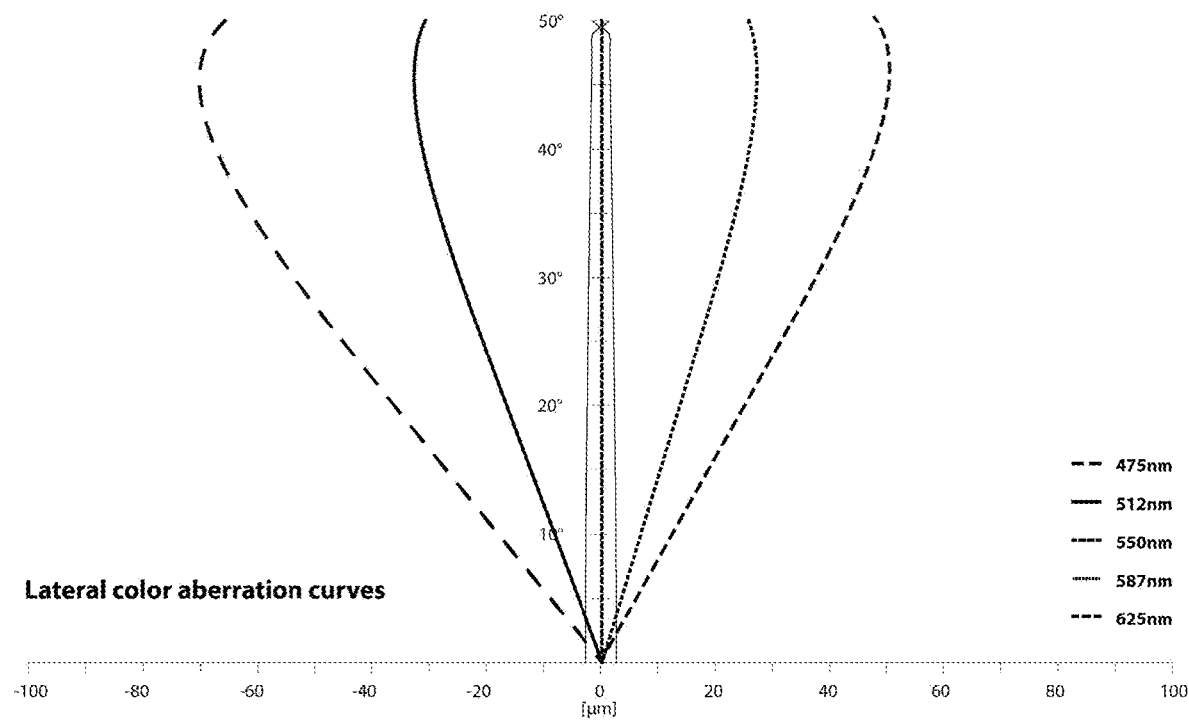
FIG. 6B illustrates lateral color aberration for the optical system of FIG. 6A on the screen side in micrometers.
Figure 6C:
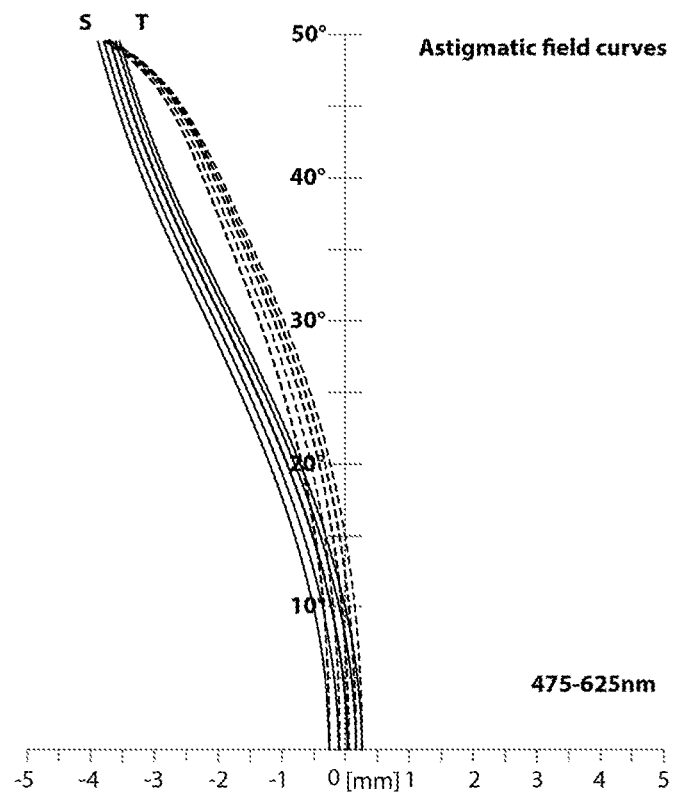
FIG. 6C illustrates field curvature and astigmatism aberrations for the optical system of FIG. 6A on the screen side in millimeters.
Figure 6D:
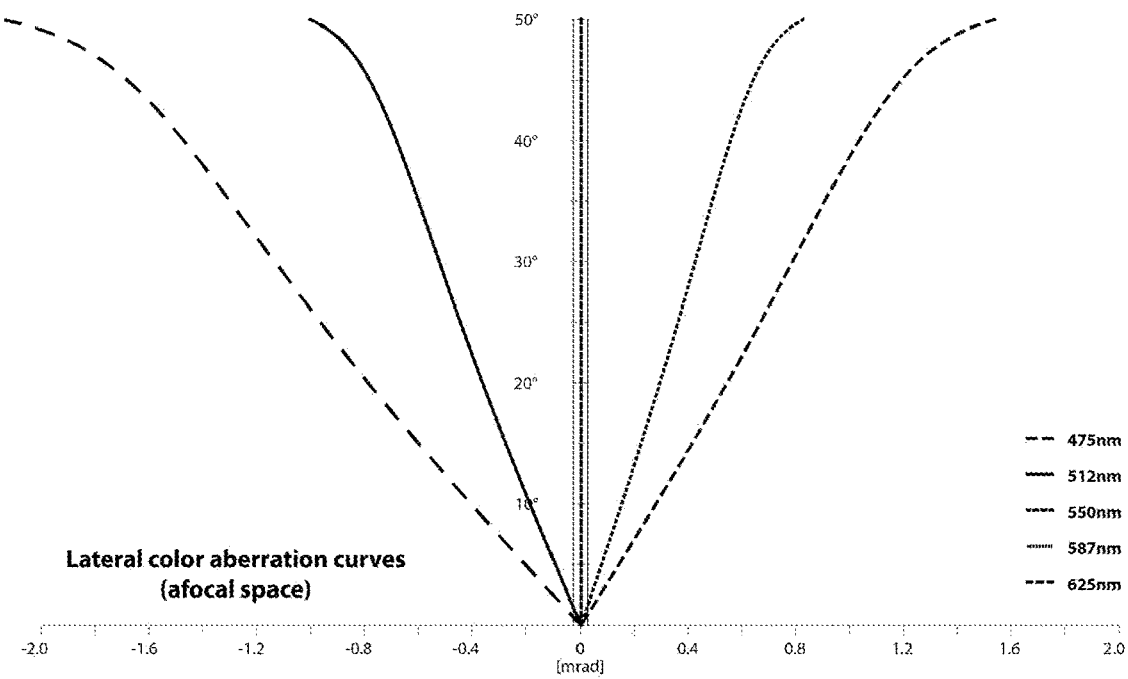
FIG. 6D illustrates lateral color aberration for the optical system of FIG. 6A on the image side in milliradians (afocal space).
Figure 6E:
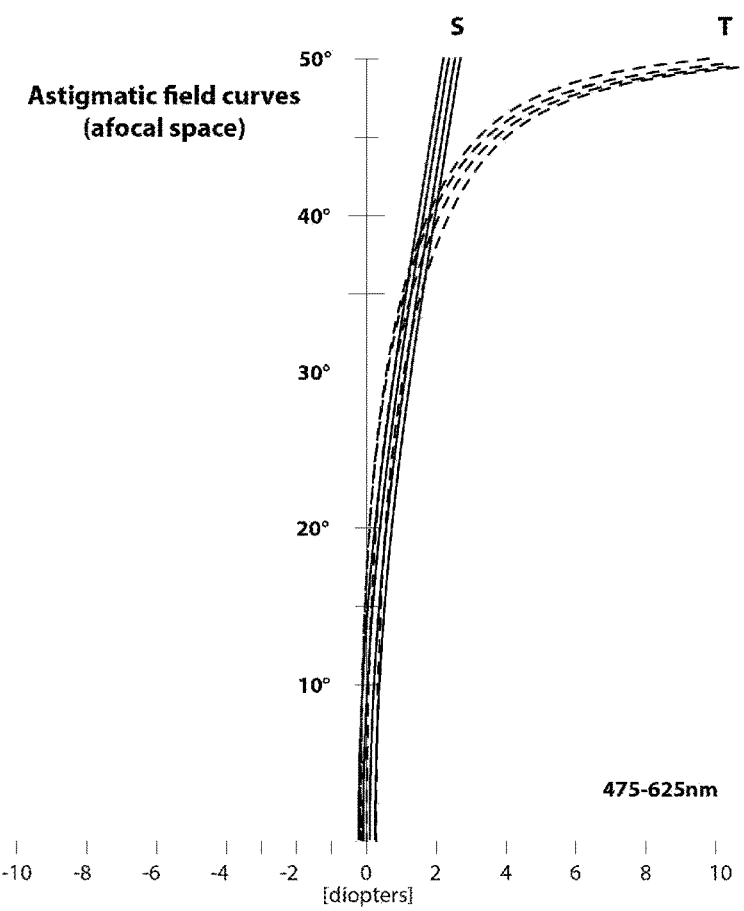
FIG. 6E illustrates field curvature and astigmatism for the optical system of FIG. 6A on the image side in diopter units (afocal space).

FIG. 6B illustrates lateral color aberration for optical system 600 of FIG. 6A on the screen side in micrometers. FIG. 6C illustrates field curvature and astigmatism aberrations for optical system 600 of FIG. 6A on the screen side in millimeters. FIG. 6D illustrates lateral color aberration for optical system 600 of FIG. 6A on the image side in milliradians (afocal space). FIG. 6E illustrates field curvature and astigmatism for optical system 600 of FIG. 6A on the image side in diopter units (afocal space).

The example optical systems disclosed herein are capable of providing correction of astigmatism and field curvature resulting in total field curvature within ±1 diopter (dP) range across 70% of the full field view. Distortion may remain at approximately 35-40% at the edge of the field, but may be corrected in software using a distortion transformation of the opposite sign. The example optical systems further are capable of providing improved longitudinal spherical aberration correction across the pupil with less color aberration. For example, lateral color of the example optical systems is corrected to less than one (1) milliradian (which can correspond to a single pixel on 518 ppi display observed through a 35 mm focal length VR set).

The focus of the example optical systems described herein may be adjusted to compensate for the optical prescription of an individual user eye (e.g., single vision SPHERE factor, to correct for myopia or hyperopia, while astigmatism/CYLINDER prescription may not be not corrected). Compensation for optical prescription of a user may be accomplished by moving the optical system, for each eye, away or toward the screen(s) to achieve the best focus for the user's eye while keeping optical aberrations under control. In one aspect, the optical system for each eye may be moved independently of the other.

The examples described herein exhibit variation in lens size/thickness, relative separation between lenses, and/or distance to the screen(s). Increased size of the lenses and movement of the lenses closer to the screen(s) usually provides better performance, but at the cost of increased weight. The example optical systems disclosed herein provide a balance with three optical lenses and a weight ranging from less than approximately 30 grams to an upper threshold of approximately 74.9 grams when using optical plastics as described.

It should be appreciated that the particular materials described herein for implementing lenses are provided for purposes of example only. Other suitable optical plastics may be used. For purposes of illustration, for the optical system embodiments described herein, example substitutes for OKP-1 may include, but are not limited to, OKP4, OKP4HT, Polystyrene, and Polycarbonate. Other suitable substitutes for OKP-1 may include flint type materials with a low Abbe number around 30. Example substitutes for COC within the optical system embodiments described herein can include, but are not limited to, polymethyl methacrylate (PMMA), acrylic, 330R, 480R, and Zeonex E48R. Other suitable substitutes for COC may include crown type materials having an index of refraction around 1.5 and an Abbe number close to 56. For example, in the various example optical systems described herein, the first two lenses are crowns, while the third lens is flint. Embodiments utilizing plastics as described may be manufactured using injection molding techniques.

In alternative example embodiments, one or more or each of the lenses may be implemented as an equivalent or substantially equivalent Fresnel lens.

In one or more embodiments, the lenses implemented within each of the example optical systems described herein may be implemented to include a flange. The flange, for example, may aid in mounting the lenses within a suitable housing.

In one or more embodiments, the lenses included in the optical systems described herein may be cropped. For example, the lenses may be cropped, e.g., trimmed, along the edge of each of the lenses that is close, or closest, to the user's nose when the optical systems are positioned within a VR headset. By cropping the lenses, additional room for the user's nose is provided when the optical systems are incorporated into the VR headset. The lenses also may be cropped along the edge of each lens that is placed next to another lens in a tiled fashion. Thus, the cropped lenses are no longer round or cylindrical across the perimeter. It should be appreciated that cropping the lenses as described to better accommodate the user's nose and/or placement in a tiled fashion does not have an effect upon the optical performance of the optical systems.

In one or more alternative embodiments, one or more optical windows may be added. For example, a flat window may be added at the image side, at the object side, or both of the optical systems described herein. The window(s) may be made of glass or plastic. For example, an optical window may be placed immediately to the left of the lens closest to the user's eye. An optical window may be placed immediately to the right of the lens closest to the screen(s). The optical windows provide protection for the optics. Further, optical windows may provide a surface that is easier to dust, wipe, or otherwise clean. The optical window(s) may be added without modifying the optical prescriptions and/or optical characteristics (e.g., the expressions) of the various example embodiments described.

In one or more embodiments, an optical window on the user eye side of the optical system may be added that does modify the optical characteristics of the example embodiments described herein. For example, the optical window may be fabricated to implement a user's eye prescription. The optical window, for example, may be configured to mount, e.g., snap, on or into the VR headset so that the optical window with the user's prescription is closer to the user's eye than the first lens of the optical system located on the image side. By incorporating the user's eye prescription into an optical window on the user eye side of the optical system, the user need not wear eye glasses when using the VR headset.

Figure 7A:
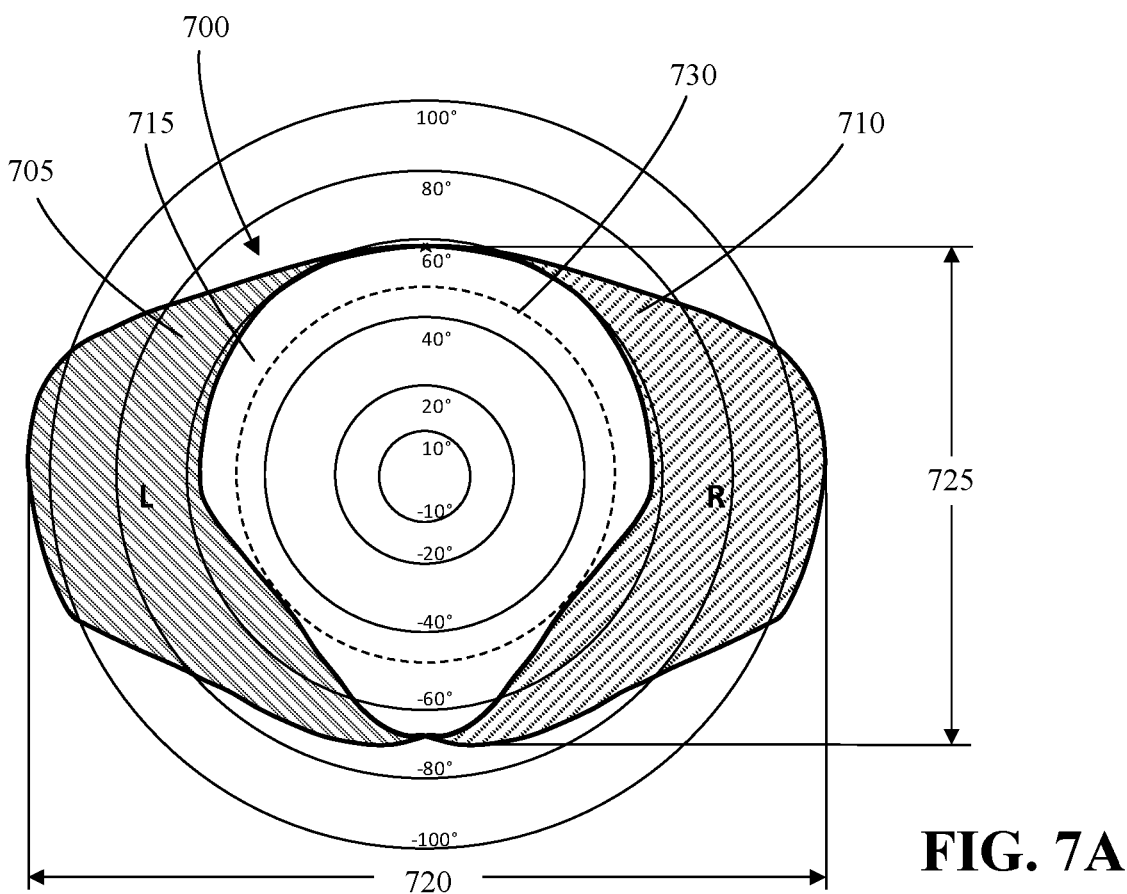
FIG. 7A illustrates a forward facing view of a typical human visual system field of view.

FIG. 7A illustrates a forward facing view of a typical human visual system field of view (FOV) 700, which includes a FOV 705 of a left eye and a FOV 710 of a right eye, the FOV 705 and FOV 710 overlapping in a central region 715 of the FOV 700. The typical human FOV 700 typically extends horizontally a range 720 of about 200°-220° and extends vertically a range 725 of about 120°. An ordinary VR headset typically presents to a user a substantially round FOV 730 having a diameter extending a range of about 90° to 100° within the central region 715 of the FOV 700.

Figure 7B:
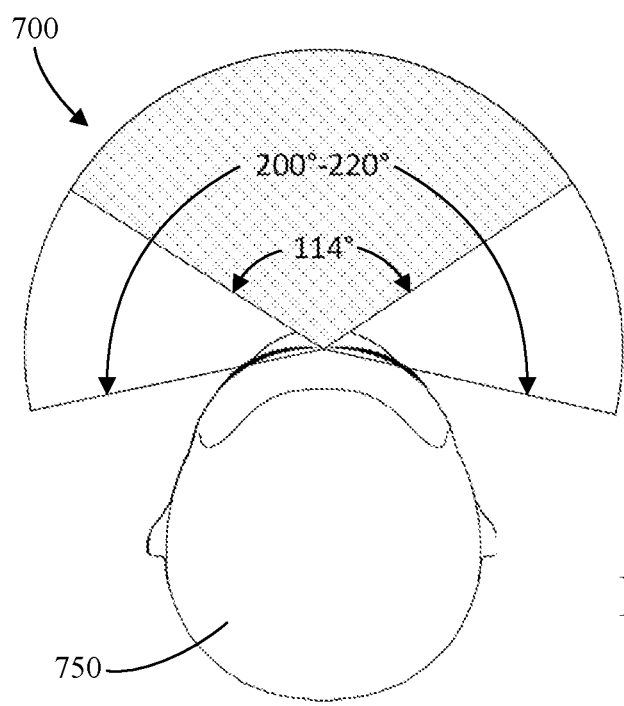
FIG. 7B illustrates a top view of a typical human visual system field of view.

FIG. 7B illustrates a top view of the typical human visual system FOV 700. A maximum amount of stereo vision for the typical user 750 can be about 114° whereas, using peripheral vision, the typical user 750 can see FOV up to a range of about 200°-220°.

Figure 8:
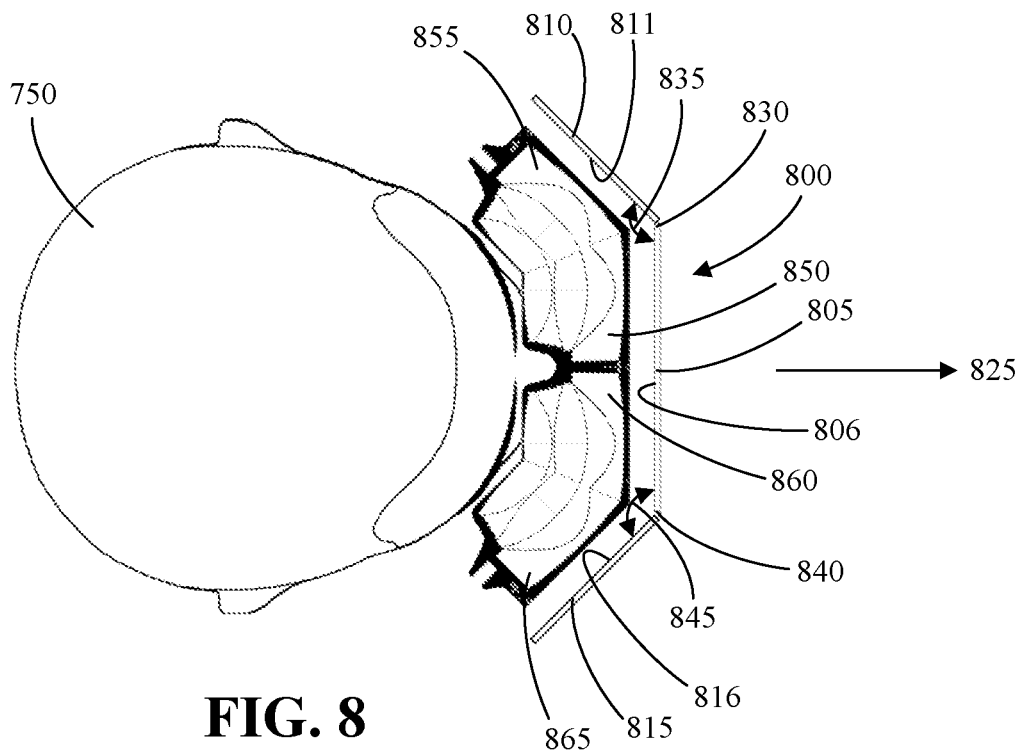
FIG. 8 illustrates an example of a near eye display system.

FIG. 8 illustrates an example of a near eye display system 800 in accordance with arrangements described herein. The near eye display system 800 can be, for example, part of a head mountable VR headset. The near eye display system 800 can include a plurality of displays, for example a display 805, a display 810 and a display 815. The displays 805, 810 can be configured to present images to a left eye of the user 750 and the displays 805, 815 can be configured to present images to a right eye of the user 750. For example, a viewing surface 806 (i.e., screen) of the display 805 via which images/video are presented can be normal to a direction 825 in which the user 750 is facing while wearing a VR headset including the near eye display system 800. A viewing surface 811 (i.e., screen) of the display 810 can extend outward from, or near, an edge 830 of the display 805 at a horizontal angle 835 opposite the direction 825. The angle 835 can be in a range of about 120° to about 140°. For example, the angle 845 can be approximately 120°, 130° or 140°. A viewing surface 816 (i.e., screen) of the display 815 can extend outward from, or near, an edge 840 of the display 805, which is opposite of edge 830, at a horizontal angle 845 opposite the direction 825. The angle 845 can be in a range of about 120° to about 140°. For example, the angle 845 can be approximately 120°, 130° or 140°.

The near eye display system 800 also can include a plurality of triplet lenses, for example a triplet lens 850, a triplet lens 855, a triplet lens 860 and a triplet lens 865. The triplet lenses 850-865 can be arranged in a tile fashion where they are tiled with respect to one another, extending horizontally in front of the displays 805-815. The triplet lenses 850, 855 can be associated with a left eye of the user 750, and the triplet lenses 860, 865 can be associated with a right eye of the user 750. In one non-limiting arrangement, the triplet lenses 850-865 can be implemented in accordance with the triplet lens 118 of FIG. 1 and/or in accordance with the triplet lens 218 of FIG. 2.

The triplet lenses 850, 860 can be paired with the display 805. In this regard, the triplet lens 850 can be positioned between the user's left eye and the display 805, and can be configured to face the display 805. The focal characteristics of the triplet lens 850 can be selected based on its positions relative the user's left eye and the display 805. The triplet lens 860 can be positioned between the user's right eye and the display 805, and can be configured to face the display 805. The focal characteristics of the triplet lens 860 can be selected based on its positions relative the user's right eye and the display 805. The triplet lens 855 can be paired with the display 810, positioned between the user's left eye and the display 810, and can be configured to face the display 810. The focal characteristics of the triplet lens 855 can be selected based on its positions relative the user's left eye and the display 810. The triplet lens 865 can be paired with the display 815, positioned between the user's right eye and the display 815, and can be configured to face the display 815. The focal characteristics of the triplet lens 865 can be selected based on its positions relative the user's right eye and the display 815.

The triplet lens 850 and the triplet lens 855 can be tiled with respect to one another, forming a tile angle between their respective optical paths. Similarly, the triplet lens 860 and the triplet lens 865 can be tiled with respect to one another, forming a tile angle between their respective optical paths. The tile angle between the triplet lens 850 and the triplet lens 855 can be the same, or substantially the same, as the angle 835. The tile angle between the triplet lens 860 and the triplet lens 865 can be the same, or substantially the same, as the angle 845.

In one non-limiting arrangement, the near eye display system 800 can use a single lens, or two lenses, in place of the triplet lens 855 and/or can use a single lens, or two lenses, in place of the triplet lens 865. In another non-limiting arrangement, the near eye display system 800 can use a single lens, or two lenses, in place of the triplet lens 850 and/or can use a single lens, or two lenses, in place of the triplet lens 860. In yet another non-limiting arrangement, the near eye display system 800 can use a single lens, or two lenses, in place of the triplet lens 850, can use a single lens, or two lenses, in place of the triplet lens 855, can use a single lens, or two lenses, in place of the triplet lens 860 and/or can use a single lens, or two lenses, in place of the triplet lens 865. Still, the near eye display system 800 can use any number of lenses in place of the triplet lenses 850-865, and the present arrangements are not limited in this regard.

Figure 9:
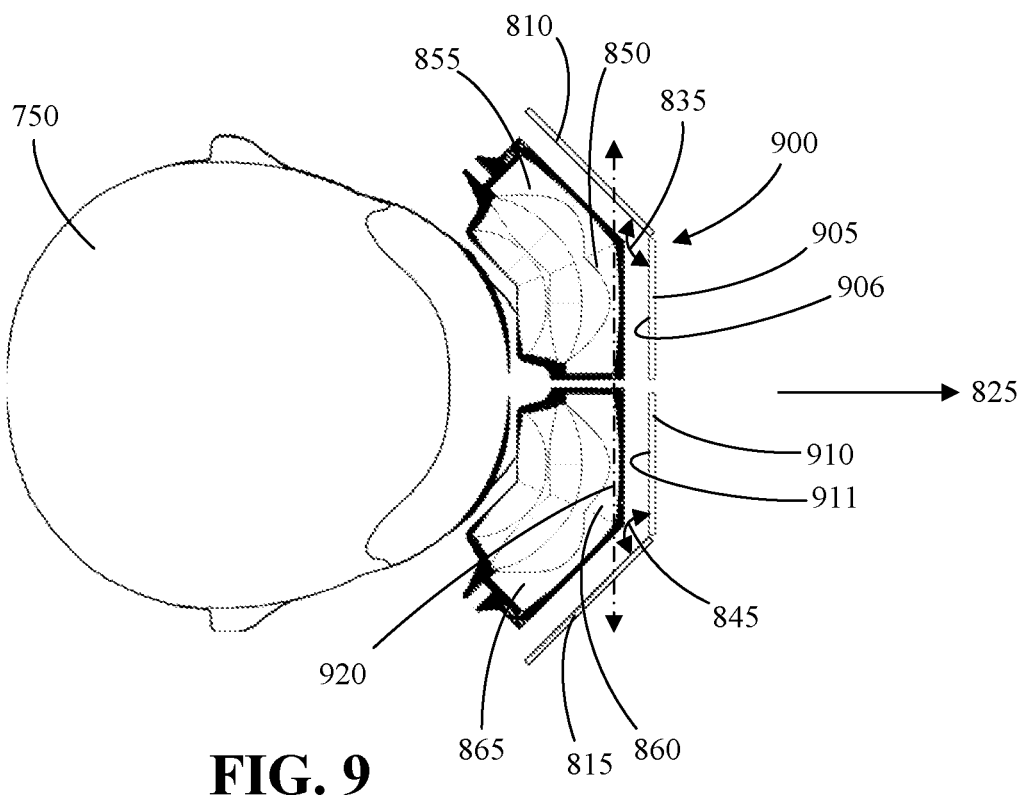
FIG. 9 illustrates another example of a near eye display system.

FIG. 9 illustrates another example of a near eye display system 900. The near eye display system 900 is substantially similar to near eye display system 800 of FIG. 8, except that two displays 905, 910 are used in lieu of the display 805. In this arrangement, the displays 905, 910 can be configured to present images to the left eye of the user 750, and the displays 910, 815 can be configured to present images to the right eye of the user 750. Respective viewing surfaces (i.e., screens) 906, 911 of the displays 905, 910 can be normal to the direction 825. Further, the angle 835 between the display 905 and the display 810, and the angle 845 between the display 910 and the display 815, can be in ranges of about 120° to about 140°. For example, the angles 835, 845 each can be approximately 120°, 130° or 140°.

In this arrangement, the triplet lens 850 can be paired with the display 905, positioned between the user's left eye and the display 905, and can be configured to face the display 905. The focal characteristics of the triplet lens 850 can be selected based on its positions relative the user's left eye and the display 905. The triplet lens 860 can be paired with the display 910, positioned between the user's right eye and the display 910, and can be configured to face the display 910. The focal characteristics of the triplet lens 860 can be selected based on its positions relative the user's right eye and the display 910. The triplet lens 855 can be paired with the display 810, positioned between the user's left eye and the display 810, and can be configured to face the display 810. The focal characteristics of the triplet lens 855 can be selected based on its positions relative the user's left eye and the display 810. The triplet lens 865 can be paired with the display 815, positioned between the user's right eye and the display 815, and can be configured to face the display 815. The focal characteristics of the triplet lens 865 can be selected based on its positions relative the user's right eye and the display 815.

In one non-limiting arrangement, the displays 810, 815, 905, 910 and triplet lenses 850, 855, 860, 865 can be configured to move horizontally, along line 920 parallel to the displays 905, 910. Such configuration can allow for adjustability of displays 810, 815, 905, 910 and triplet lenses 850, 855, 860, 865 to accommodate different pupillary distances of users, and adjust to different pupillary distances of users using the near eye display system 900. In illustration, horizontal positioning of the and triplet lenses 850, 855, 860, 865 can be adjusted for the pupillary distance of the user 750 to place the focal points of the triplet lenses 850, 855 at the appropriate position for the user's left eye and to place the focal points of the triplet lenses 860, 865 at the appropriate position for the user's right eye. In this arrangement, the triplet lenses 850, 855 can be fixed relative to the displays 810, 905, and the triplet lenses 860, 865 can be fixed relative to the displays 815, 910. Thus, the triplet lenses 850, 855 and displays 810, 905 can be moved together horizontally along the line 920, and the triplet lenses 860, 865 and displays 815, 910 can be moved together horizontally along the line 920. The near eye display system 900 can include one or more structures, such as sliding mechanisms, to which the displays 810, 815, 905, 910 and triplet lenses 850, 855, 860, 865 are attached to facilitate the adjustability.

Figure 10:
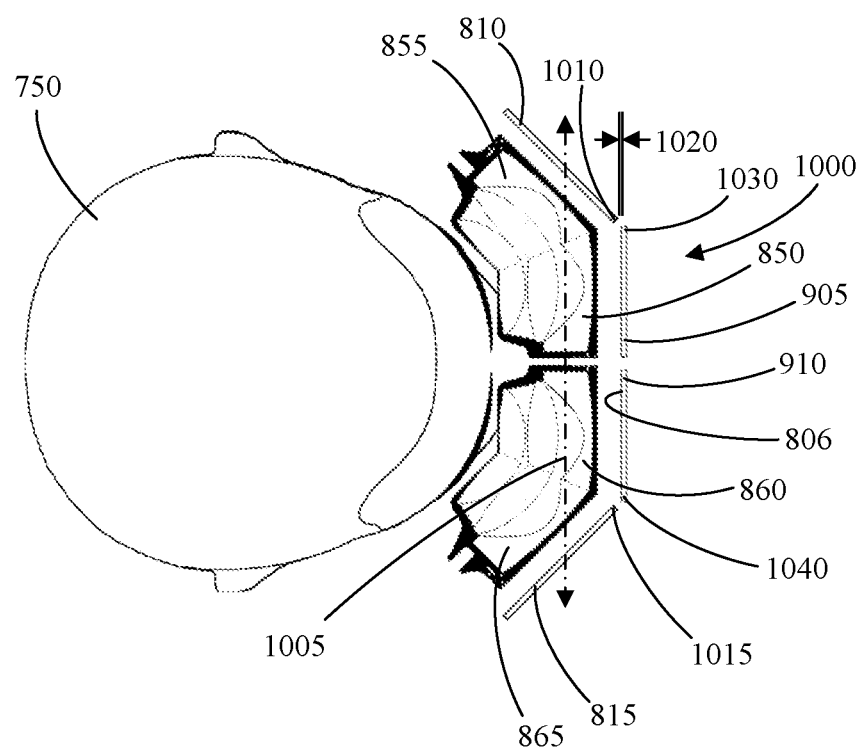
FIG. 10 illustrates another example of a near eye display system.

FIG. 10 illustrates another example of a near eye display system 1000. The near eye display system 1000 is substantially similar to the near eye system 900 of FIG. 9 (or the near eye display system 800 of FIG. 8), except that the displays 810, 815 and triplet lenses 850, 855, 860, 865 can be configured to move horizontally, along line 1005 parallel to the displays 905, 910 (or the display 805 of FIG. 8), while the displays 905, 910 (or the display 805 of FIG. 8) can remain in a fixed position. Such configuration can allow for adjustability of displays 810, 815 and triplet lenses 850, 855, 860, 865 to accommodate different pupillary distances of users, and adjust for different pupillary distances of users using the near eye display system 1000. In illustration, horizontal positioning of the and triplet lenses 850, 855, 860, 865 can be adjusted for the pupillary distance of the user 750 to place the focal points of the triplet lenses 850, 855 at the appropriate position for the user's left eye and to place the focal points of the triplet lenses 860, 865 at the appropriate position for the user's right eye.

The displays 810, 815 can be inset with respect to the displays 905, 910 (or the display 805 of FIG. 8), allowing the displays 810, 815 to be adjusted horizontally without interference from the displays 905, 910 (or the display 805 of FIG. 8). In illustration, inner edges 1010, 1015 of the respective displays 810, 815 can be inset (e.g., in the direction of the user 750) at least a threshold distance 1020 with respect to edges 1030, 1040 of the displays 905, 910 (or the display 805 of FIG. 8). The threshold distance 1020 is a distance that will allow the displays 810, 815 to move horizontally without the displays 905, 910 (or the display 805 of FIG. 8) interfering with such movement, thus allowing the displays 810, 815 to at least partially overlap the displays 905, 910 (or the display 805 of FIG. 8). The threshold distance can be, for example, 0.5 mm, 1.0 mm, 1.5 mm, etc.

The position of the triplet lenses 850, 855 can be fixed relative to the display 905 and move with the display 905. Similarly, the position of triplet lenses 860, 865 can be fixed relative to the display 910 and move with the display 910. Thus, the triplet lenses 850, 855 and 810 can be moved together horizontally along the line 920, and the triplet lenses 860, 865 and display 815 can be moved together horizontally along the line 920. The near eye display system 1000 can include one or more structures, such as sliding mechanisms, to which the displays 810, 815 and triplet lenses 850, 855, 860, 865 are attached to facilitate the adjustability.

The near eye display system 1000 also can include one or more sensors (not shown) that detect the position of the triplet lenses 850, 860 relative to the viewing surfaces 906, 911 (i.e., screens) of the displays 905, 910 (or the viewing surface of the display 805 of FIG. 8). The near eye display system 1000 also can include computer program code, executable by a processor of the near eye display system 1000, that receives sensor data from the sensors and, based on the sensor data, adjusts images/video presented on the viewing surface 806 for the position of the triplet lenses 850, 860. In illustration, the processor can locate images/video, which are presented by the display 905 to the user's left eye, to be presented at a location on the display 905 in front of the triplet lens 850 given the current position of the triplet lens 850. Similarly, the processor can locate images/video, which are presented by the display 910 to the user's right eye, to be presented at a location on the display 910 in front of the triplet lens 860 given the current position of the triplet lens 850.

Figure 11:
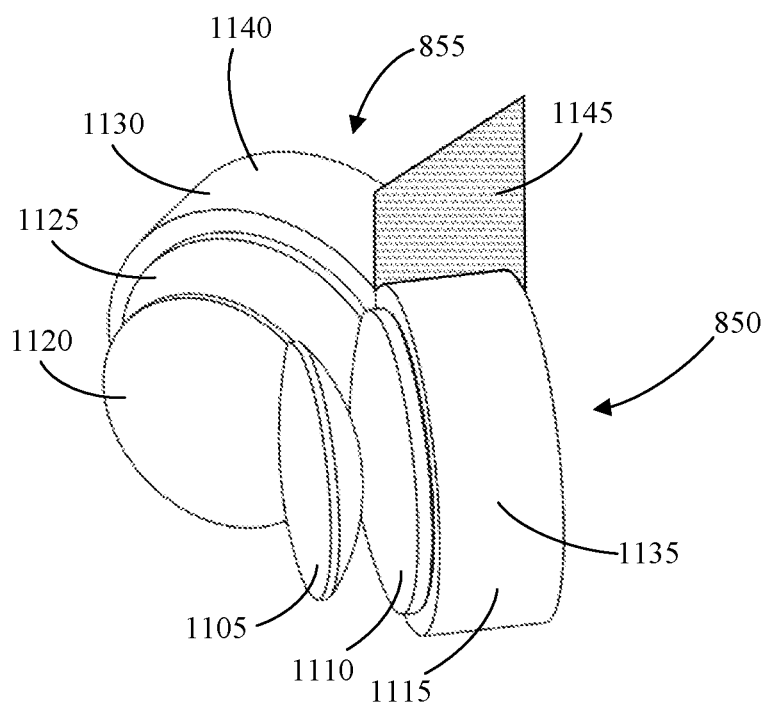
FIG. 11 is a perspective view illustrating an example of the tiled triplet lenses of the near eye display system of FIG. 8.

FIG. 11 is a perspective view illustrating an example of the tiled triplet lenses 850, 855 of the near eye display system 800 of FIG. 8. The triplet lens 850 can be configured as previously described with reference any of FIGS. 1-5, and can include a lens 1105, a lens 1110 and a lens 1115. The triplet lens 855 can be configured as previously described with reference to any of FIGS. 1-5, and can include a lens 1120, a lens 1125 and a lens 1130.

In one non-limiting arrangement, the lens 1115 and the lens 1130 each can be blackened around their respective perimeters 1135, 1140. For example, a dark (e.g., black) paint or other suitable light absorbing material can be applied to the respective perimeters. The paint or other suitable light absorbing material can serve to prevent ghost reflections and stray light around portions of the field of view provided by the respective triplet lenses 850, 855 by mitigating total internal reflection (TIR) of light by the respective perimeters 1135, 1140.

Further, a baffle 1145 can be positioned between the lens 1115 and the lens 1130. The baffle 1145 be made of, for example, a material such as plastic or metal with non-reflecting roughened surface. The material can be dark (e.g., black) or coated with a dark paint or other suitable coating. The baffle 1145 can control stray light and prevent crosstalk between light signals emanated by the screens 805 (or 905) and 810 through respective triplet lenses 850, 855.

The triplet lenses 860, 865 can be configured in a manner similar to that described above for the triplet lenses 850, 855.

Figure 12:
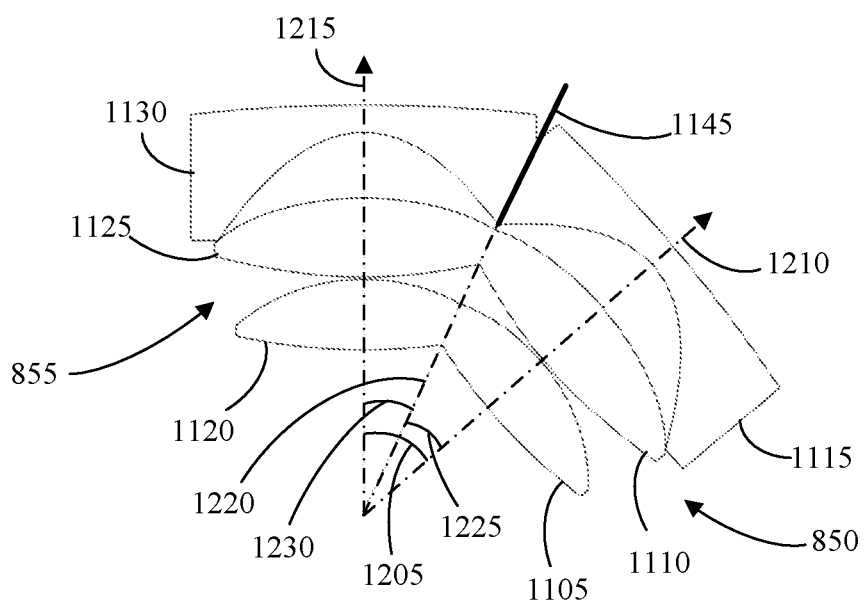
FIG. 12 is a top cross-section view illustrating an example of the tiled triplet lenses of FIG. 11.

FIG. 12 is a top cross-section view illustrating an example of the tiled triplet lenses 850, 855. In this example, the triplet lenses 850, 855 can be configured as described for the optical system 600 of FIG. 6. The triplet lenses 860, 865 of FIG. 8 can be configured in a similar manner. The triplet lenses 850, 855 can be positioned to form a horizontal tile angle 1205 between their respective optical path centerlines 1210, 1215. The optical path centerline 1210 can be an imaginary line extending through the centers of curvature of the lenses 1105-1115, and the optical path centerline 1215 can be an imaginary line extending through the centers of curvature of the lenses 1120-1130. Further, the optical path centerline 1210 can be normal to the viewing surface 806 of the display 805 (or the viewing surface 906 of the display 905) and the optical path centerline 1215 can be normal to the viewing surface 811 of the display 810. The tile angle 1205 can be complementary to the horizontal angle 835 of FIG. 8, wherein the sum of the tile angle 1205 and the horizontal angle 835 approximately equal 180°. In this regard, the angle 1205 can be in a range of about 30° to about 75°. For example, the angle 1205 can be approximately 50°, 55° or 60°.

In one non-limiting arrangement, the lenses 1105-1130 can be individually molded and/or ground to shape, and attached together to form the triplet lenses 850, 855. In illustration, after the lenses 1105-1130 are molded and/or ground to shape, the lenses can be cut or cropped (e.g., trimmed) along a line defined by imaginary line 1220. An angle 1225 of the cut/trim of the lenses 1105-1115, and an angle 1230 of the cut/trim of the lenses 1120-1130, each can be one-half of the tile angle 1205. For example, if the tile angle 1205 is 50°, the angles 1225, 1230 each can be 25°. Thus, when the lenses 1105-1130 are attached together, the tile angle 1205 between the respective optical path centerlines 1210, 1215 will result. The lenses 1105-1130 can be attached a suitable adhesive or attached using a physical structure within the near eye display system 800, 900, 1000 that holds the respective lenses 1105-1130 in appropriate positions.

In another non-limiting arrangement, the lenses 1105, 1120 can be molded as a single element, and the lenses 1110, 1125 can be molded as a single element. Further, the lenses 1115, 1130 can be molded as a single element. In such an arrangement, the baffle 1145, if used, can be inserted in the mold between the lenses 1115, 1130 during the molding process.

As noted, the lenses 1105-1125 can be implemented using optical plastic and/or optical glass. Further, the combined total weight of the triplet lenses 850, 855 can be equal to or less than 130 g, 100 g, 75 g or 50 g, depending on the types of lenses used in the triplet lenses 850, 855 and the material from which the lenses are made. Thus, the near eye display system 800 can be relatively light weight, benefiting comfort of wearing an apparatus (e.g., a VR headset) that incorporates the near eye display system 800.

Figure 13:
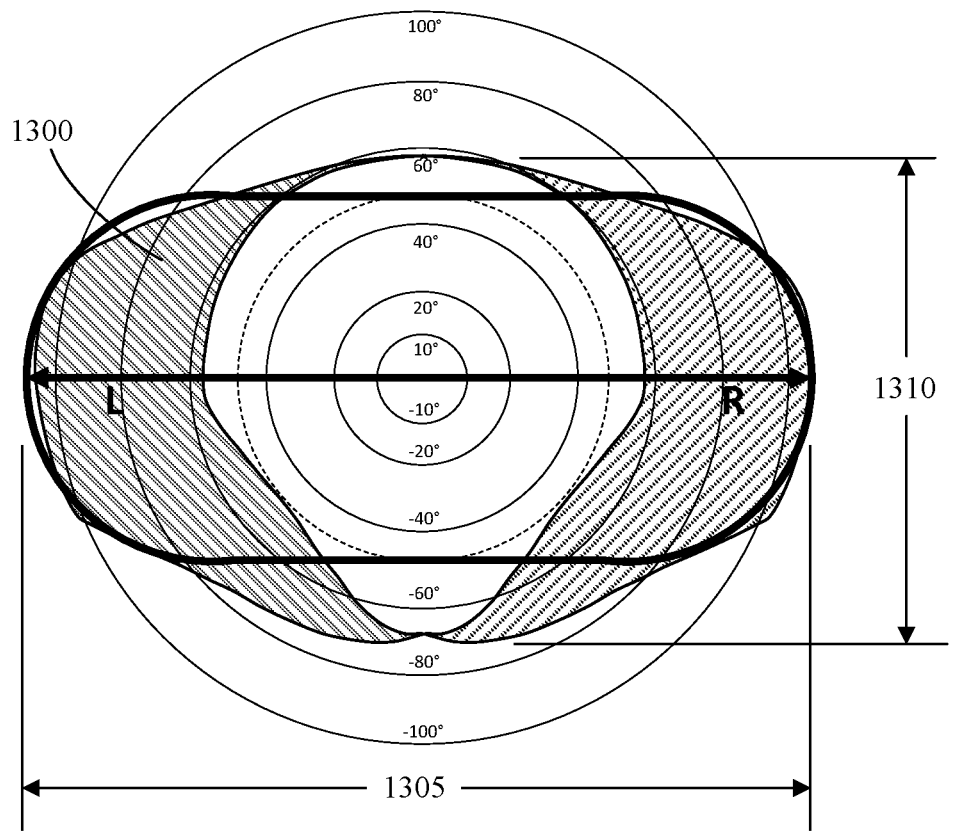
FIG. 13 illustrates an example of a field of view provided by the near eye display system of FIG. 8 using tiled lens triplets.

FIG. 13 illustrates an example of a field of view (FOV) 1300 provided by the near eye display system 800, 900, 1000 of FIGS. 8-12 using tiled triplet lenses 850-865. The FOV 1300 can be accomplished using tiled triplet lenses 850-865 designed in accordance with the triplet lenses 118, 218, 318, 418, 518 and/or 618 of FIGS. 1-6. Due to use of a plurality of displays 805-815 (or 810, 815, 905, 910) and a plurality of triplet lenses 850-865, the FOV 1300 can extend horizontally a range 1305 and extend vertically a range 1310. The horizontal range 1305 can be greater than 180°, greater than 190°, greater than 200°, or greater than 210°. The vertical range 1310 can be greater than 80°, greater than 90°, greater than 100° or greater than 110°. Thus, in comparison to display systems used in conventional VR headsets, the near eye display system 800 can provide a much greater FOV. Moreover, the near eye display system 800, 900, 1000 can do so without significant field curvature aberrations, and provide high image quality across the entire FOV 1300. In this regard, the use of multiple displays 805-815 (or 810, 815, 905, 910) can overcome the FOV-resolution invariant exhibited by single display VR headsets.

FIGS. 14A-14F illustrate example light ray traces for light provided by the near eye display system 800, 900, 1000 to an eye of a user at various FOV angles using tiled triplet lenses 850, 855. In these examples, the triplet lenses 850, 855 can be implemented in accordance with the design of the triplet lens 118 of FIG. 1, and the eye of the user is the left eye. The near eye display system 800, 900, 1000 can present a similar FOV for the right eye using tiled lens triplets 860, 865.

Figures 14A, 14B, 14C, 14D, 14E, 14F, 14G:
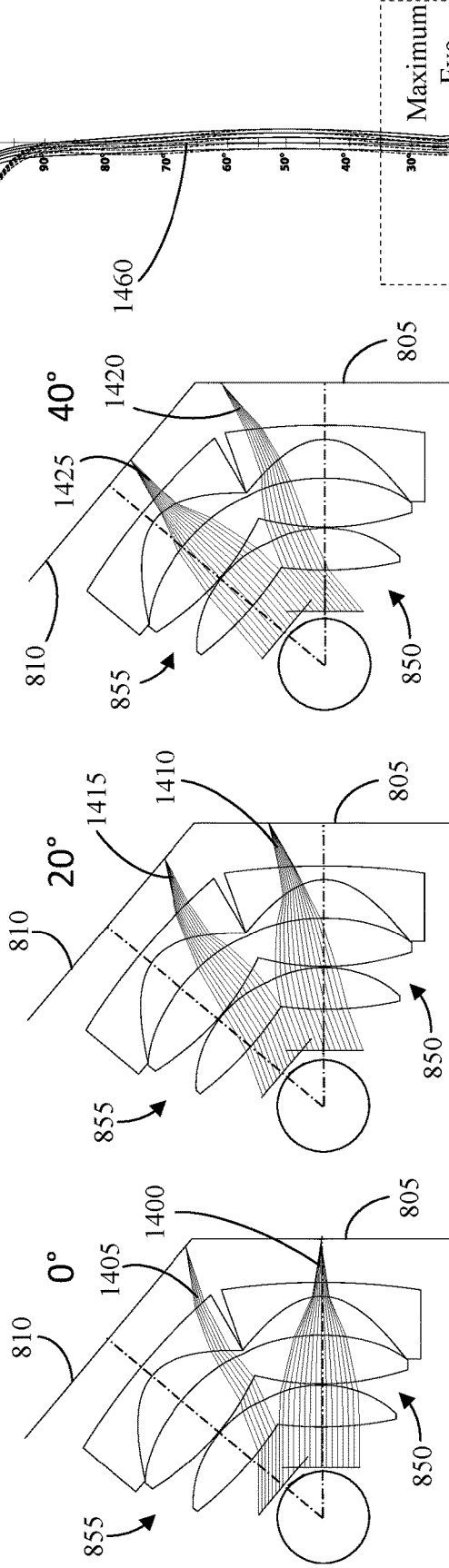
FIG. 14A illustrates examples light ray traces provided by the near eye display system to an eye of a user at a field of view angle of 0° using tiled lens triplets.
FIG. 14B illustrates examples light ray traces provided by the near eye display system to an eye of a user at a field of view angle of 20° using tiled lens triplets.
FIG. 14C illustrates examples light ray traces provided by the near eye display system to an eye of a user at a field of view angle of 40° using tiled lens triplets.
FIG. 14D illustrates examples light ray traces provided by the near eye display system to an eye of a user at a field of view angle of 60° using tiled lens triplets.
FIG. 14E illustrates examples light ray traces provided by the near eye display system to an eye of a user at a field of view angle of 80° using tiled lens triplets.
FIG. 14F illustrates examples light ray traces for light provided by the near eye display system to an eye of a user at a field of view angle of 100° using tiled lens triplets.
FIG. 14G illustrates field curvature aberration for the total field of view of FIGS. 14A-14F.

Specifically, FIG. 14A illustrates examples light ray traces 1400, 1405 provided by the near eye display system 800, 900, 1000 to the left eye of a user via the triplet lenses 850, 855 at a FOV angle of 0°. The light ray traces 1400 correspond to light emanating from the display 805 (or 905), and the light ray traces 1405 correspond to light emanating from the display 810.

FIG. 14B illustrates examples light ray traces 1410, 1415 provided by the near eye display system 800, 900, 1000 to the left eye of the user via the triplet lenses 850, 855 at a FOV angle of 20°. The light ray traces 1410 correspond to light emanating from the display 805 (or 905), and the light ray traces 1415 correspond to light emanating from the display 810.

FIG. 14C illustrates examples light ray traces 1420, 1425 provided by the near eye display system 800, 900, 1000 to the user via the triplet lenses 850, 855 at a FOV angle of 40°. The light ray traces 1420 correspond to light emanating from the display 805 (or 905), and the light ray traces 1425 correspond to light emanating from the display 810.

FIG. 14D illustrates examples light ray traces 1430 provided by the near eye display system 800, 900, 1000 to the left eye of the user via the triplet lenses 850, 855 at a FOV angle of 60°. The light ray traces 1430 correspond to light emanating from the display 810. The display 805 (or 905) need not contribute light for images/video provided at the 60° FOV angle.

FIG. 14E illustrates examples light ray traces 1440 provided by the near eye display system 800, 900, 1000 to the left eye of the user via the triplet lenses 850, 855 at a FOV angle of 80°. The light ray traces 1440 correspond to light emanating from the display 810. The display 805 (or 905) need not contribute light for images/video provided at the 80° FOV angle.

FIG. 14F illustrates examples light ray traces 1450 provided by the near eye display system 800, 900, 1000 to the left eye of the user via the triplet lenses 850, 855 at a FOV angle of 100°. The light ray traces 1450 correspond to light emanating from the display 810. The display 805 (or 905) need not contribute light for images/video provided at the 100° FOV angle.

FIG. 14G illustrates field curvature 1460 for the FOV of FIGS. 14A-14F. The field curvature 1460 is for the FOV as presented to the left eye of the user, which can have a maximum eye rotation of about −35° to about 35°. As can be seen in the field curvature 1460, the field curvature is low for FOV angles from about −50° to about 100°. The left eye can detect the FOV over this range using peripheral vision. A field curvature for the FOV as presented to the right eye will be similar, extending from about −100° to about 50°. Collectively, using both eyes, the user can have a FOV that extends at least 200° with a very small amount of field curvature. The field curvature 1460 can be accomplished using triplet lenses 850, 855 implemented in accordance with the design of the triplet lens 118 of FIG. 1.

Figure 15:
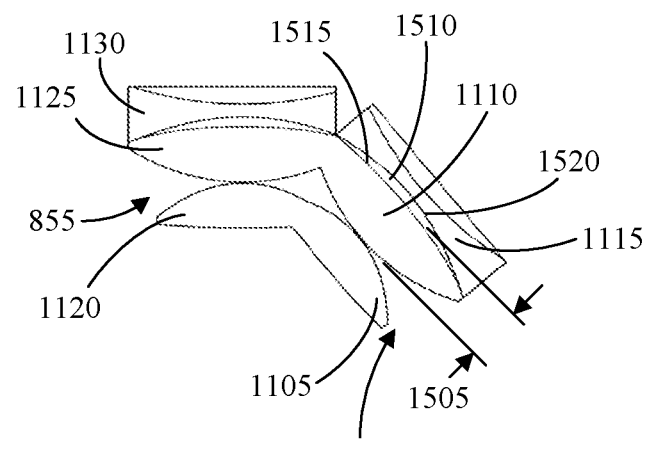
FIG. 15 illustrates a top cross-section view of another example of the tiled triplet lenses.

FIG. 15 illustrates a top cross-section view of another example of the tiled triplet lenses 850, 855. In this example, the triplet lenses 850, 855 can be configured as described for the optical system 600 of FIG. 6. In this arrangement, the lenses 1105, 1110 and/or 1115, and the lenses 1120, 1125 and/or 1130 can have a reduced depth in comparison to the tiled triplet lenses 850, 855 previously described, for example as represented by depth 1505 of lens 1110. For example, a space 1510 between a surface 1515 of the lens 1110 and a surface 1520 of the lens 1115 may be provided. If the depth of one or more of the lenses 1105, 1110 and/or 1115, and/or of the lenses 1120, 1125 and/or 1130, is reduced, the optical prescription of the lenses 1105-1115 and/or 1120-1130 can be changed accordingly to minimize the field curvature in the FOV using those lenses 1105-1130. This can result in less material being provided to make the lenses 1105-1130, and thus less weight for the triplet lenses 850-855. The weight of the triplet lenses 860-865 can be reduced in a similar manner.

Figure 16A:
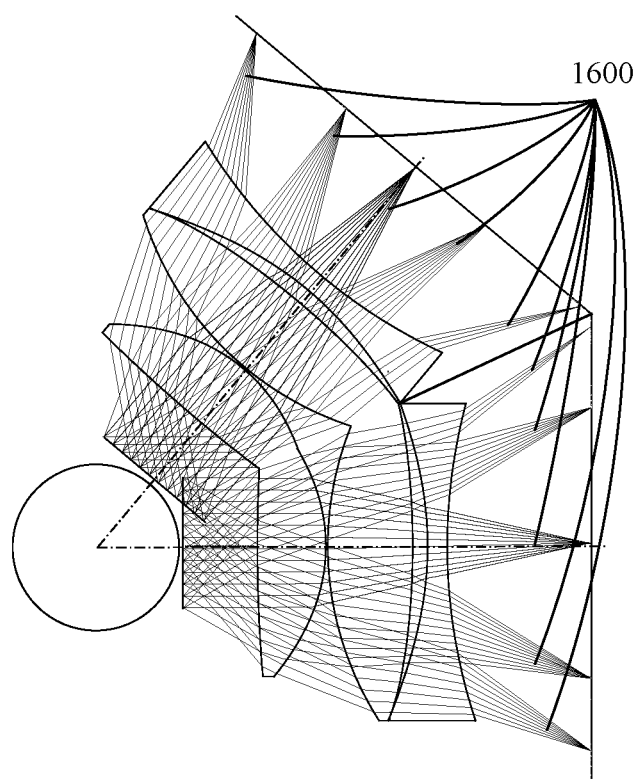
FIG. 16A illustrates examples light ray traces provided by the near eye display system to an eye of a user using reduced weight tiled lens triplets.

FIG. 16A illustrates examples light ray traces 1600 provided by the near eye display system to an eye (e.g., a left eye) of a user using reduced weight tiled triplet lenses 850, 855 over FOV angles of −50° to 100°. In this example, the triplet lenses 850, 855 can be implemented in accordance with the design of the triplet lens 618 of FIG. 6, which is lighter in weight than the triplet lenses implemented in accordance with the design of the triplet lenses 118, 218 of FIGS. 1 and 2.

Figure 16B:
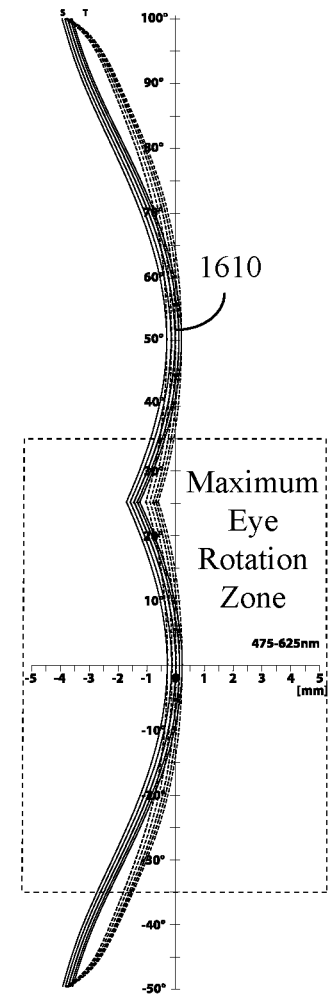
FIG. 16B illustrates field curvature aberration for the total field of view of FIG. 16A.

FIG. 16B illustrates field curvature for the FOV of FIG. 16A. The field curvature 1610 is for the FOV as presented to the left eye of the user, which can have a maximum eye rotation of about −35° to about 35°. As can be seen in the field curvature 1610, the field curvature can vary over FOV angles from about −50° to about 100°. The left eye can detect the FOV over this range using peripheral vision. A field curvature for the FOV as presented to the right eye will be similar, extending from about −100° to about 50°. Collectively, using both eyes, the user can have a FOV that extends at least 200° in accordance with the field curvature 1610. The field curvature 1610 may not be as smooth as the field curvature 1460 of FIG. 14G, but may be acceptable given the weight savings provided by this particular arrangement.

Figure 17:
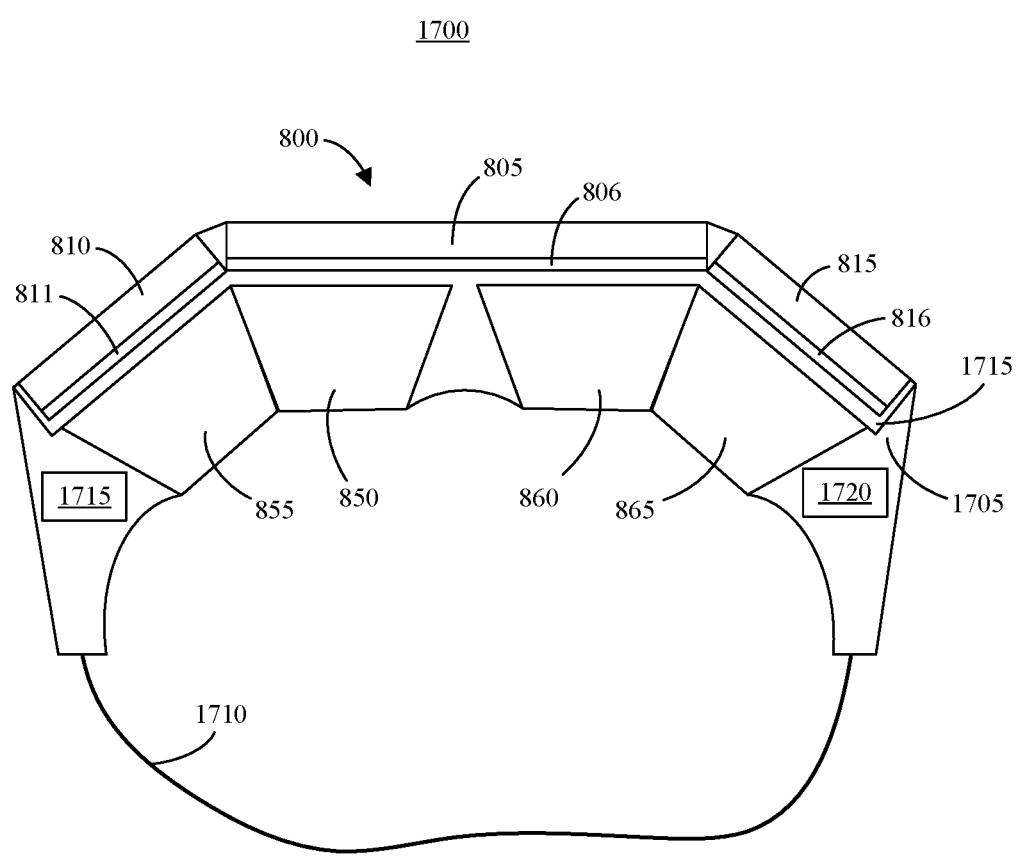
FIG. 17 is an example VR headset.

FIG. 17 is an example VR headset 1700. The VR headset 1700 can include the near eye display system 800 of FIG. 8. A VR headset including the near eye display system 900 of FIG. 9, or a VR headset including the near eye display system 1000 of FIG. 10, can be configured in a similar manner.

The VR Headset 1700 is adapted to be worn by a user and is an example of a head-mountable assembly. The VR Headset 1700 may include a frame 1705. A strap 1710 may be coupled to frame 1705. A user may wear the VR Headset 1700 so that the user's eyes gaze through triplet lenses 850, 860 toward the display 805, in particular the viewing surface 806 (i.e., screen) of the display 805, gaze through the triplet lens 855 toward the display 810, in particular the viewing surface 811 (i.e., screen) of the display 810, and gaze through the triplet lens 865 toward the display 815, in particular the viewing surface 816 (i.e., screen) of the display 815.

In one aspect, the frame 1705 can be adapted to include a display mount 1715. The display mount 1715 can be configured to receive the displays 805-815. The display mount 1715 may be shaped to cooperatively engage the displays 805-815. Further, the display mount 1715 may include one or more fastening or locking mechanisms adapted to secure the displays 805-815 in place. For example, the display mount 1715 may include latches, straps, etc. Though not shown, the frame 1705 may include one or more doors or hatches that may be closed to cover the exterior surface (back side opposite the screen sides) of displays 805-815 so that displays 805-815 are secured inside of the frame 1705 once mounted in the display mount 1715. Each display 805-815 can be a component of respective display device, for example a smart phone, a smart phone accessory, or a VR component.

In another aspect, each display 805-815 may be implemented as any of a variety of display devices that include a screen. Example implementations of a display device include, but are not limited to, a cell phone, a mobile phone, a portable computing and/or communication device, stand-alone screens, etc. The screens 806, 811, 816 can be capable of stereoscopic operation. In one example, one or more of the screens 806, 811, 816 may be implemented as an LCD screen. In another example, one or more of the screens 806, 811, 816 may be implemented as an OLED screen. Further, in another example, the screens 806, 811, 816 may be configured to display images up to and including various sizes described herein depending upon the particular optical system utilized and/or any scaling of such system that may be implemented. The screen 806 can face the triplet lenses 850, 860 so that a user looking through triplet lenses 850, 860 may view images displayed upon screen 806. The screen 811 can face the triplet lens 855 so that a user looking through triplet lens 855 may view images displayed upon screen 811. The screen 816 can face the triplet lens 865 so that a user looking through triplet lens 865 may view images displayed upon screen 816.

In another embodiment, the VR Headset 1700 may include screens that are integrated therein and capable of stereoscopic operation. In that case, for example, the screens may not be removable or part of another removable device.

Appreciably, where the VR Headset 1700 includes integrated, non-removable screens, the VR Headset 1700 can be adapted to include the necessary mounting structures, fasteners, and/or adhesives to secure the screens. The screens may be implemented substantially as described within this disclosure. The screens may be implemented using any of a variety of different technologies including, but not limited to, those noted herein.

Each of triplet lenses 855-865 may be implemented as a module or assembly capable of receiving and securely holding any of the optical systems described herein. It should be appreciated that triplet lenses 855-865 can be, but need not be, matched. In other words, the same optical system implementation used for the triplet lens 850 may be used for the triplet lens 860 and, optionally, may also be used for the triplet lenses 855, 865. The position of triplet lenses 850-865 may be moved closer or farther from the user's eye and/or displays 805-815. In one arrangement, in lieu of the triplet lens 855, the VR headset 1700 can include a single lens or two lenses in a double lens configuration. Further, in lieu of the triplet lens 865, the VR headset 1700 can include a single lens or two lenses in a double lens configuration.

The frame 1705 may also include processing and control circuitry 1715. Examples of the processing and control circuitry 1715 may include, but are not limited to, motion detection systems, control systems, input devices, interface circuitry capable of coupling (e.g., physically and/or electrically) with the displays 810-815 (or other screen or screens), audio circuitry and/or audio interface(s), wireless transceivers, interface circuitry for coupling to other systems external to the VR headset 1700, and so forth. For example, the processing and control circuitry 1715 may include audio jacks, communication ports, and so forth. The frame 1705 may further include a power source 1720 such as a battery or batteries. The batter(ies) may be rechargeable. In another example, the power source 1720 may be a power adapter interface, a receptacle, etc. to couple an external power source such as a power adapter to the VR Headset 1700 and/or a rechargeable battery included therein.

FIG. 18 illustrates an example method 1800 of implementing an optical system in accordance with the example embodiments described herein, for example to form a triplet lens. In one or more embodiments, method 1800 may be implemented by locating the various lenses as described within a lens mounting assembly adapted to secure the lenses positioned as described. In one or more other embodiments, aspects of method 1800 may be implemented using an injection molding process. For example, using an injection molding process, each of the three lenses may be fabricated and positioned as described within a mounting assembly or module. In another example, conditioned upon the ability of 3D printing technology to generate a surface finish of sufficient optical quality, the optical system may be fabricated using a 3D printing technology. In any case, lenses of the optical system may be provided as described below.

In block 1805, a first lens having a positive refractive power is located at a position at an image side of an optical path. For example, the first lens may be most proximal to the image side of the optical path. In block 1810, a second lens having a positive refractive power is provided. The second lens is positioned relative to the first lens. For example, the second lens may be located in a position that is adjacent to the first lens. In block 1815, a third lens having a negative refractive power is located at a position at an object side of the optical path. For example, the third lens may be most proximal to the object side of the optical path. In an aspect, the second lens is located between the first lens and the third lens. Further, the first lens, the second lens, and the third lens form the optical path with the object side facing a screen and the image side adapted to provide an image from the screen to a user.

In an aspect, the lenses of the optical system may be cropped so as to better accommodate the user's nose and/or to accommodate being placed immediately next to other lenses in a tiled fashion when the optical system(s) are incorporated into a VR headset. In one aspect, the lenses may be cropped after fabrication. In another aspect, the lenses may be fabricated in the cropped shape so that post processing of the lenses, e.g., cropping of the lenses, need not be performed.

In an aspect, the optical system is configured to satisfy the expression $0.8<f1/f<2.2$ and the expression $0.8<f2/f<1.89$.

In another aspect, the optical system is configured to satisfy the expression $-1.0<f3/f<-0.4$ and the expression $0.4<f1/f2<2.0$.

In another aspect, the optical system is configured to satisfy the expression $-3.0<f2/f3<-0.8$ and the expression $|Vd2-Vd3|>24$.

In another aspect, the optical system is configured to satisfy the expression $1.0<OAL/f<1.8$ and the expression $0.0<D1/f<0.2$.

In another aspect, the optical system is configured to satisfy the expression $0.2<BFL/f<0.9$ and the expression $0.0<D2/f<0.4$.

In another aspect, the optical system is configured to satisfy the expression $-1.0<r2/f<-0.2$ and the expression $0.5<r3/f<2.5$.

In another aspect, the optical system is configured to satisfy the expression $-5.0<r4/f<-0.5$ and the expression $-20<r5/f<-0.5$.

The foregoing expressions relating to method 1800 are obtained from expressions of Tables 1-18 described herein. It should be appreciated that while the examples provided herein combine certain ones of the expressions, the example embodiments described herein are provided for purposes of illustration. Optical systems as described herein may satisfy any combination of one or more (e.g., any subset of expressions of Tables 1-18) or all of expressions of Tables 1-18.

In another aspect, the optical system corrects astigmatism, field curvature, and/or lateral color. In another aspect, the optical system corrects at least one of a group of aberrations including astigmatism and field curvature; or lateral color.

In still another aspect, the optical system may be provided as an eyepiece included in a VR head-mountable assembly, wherein the head-mountable assembly includes one or more screens or is adapted to receive a display device having one or more screens. The eyepiece may be integrated, e.g., not removable, with the VR head-mount assembly. In another aspect, the eyepiece(s) may be provided as part of a removable lens module. As discussed, the display device may be a mobile phone.

FIG. 19 illustrates an example method 1900 of implementing a near eye display system in accordance with the example embodiments described herein. At step 1905, a first triplet lens 850 can be configured in a tile fashion to be associated with a left eye. At step 1910, a second triplet lens 860 can be configured in the tile fashion to be associated with a right eye. At step 1915, a third triplet lens 855 (or a third lens), can be configured in the tile fashion to be associated with the left eye. At step 1920, a fourth triplet lens 865 (or a fourth lens) can be configured in the tile fashion to be associated with the right eye.

At step 1925, a multiple display system 800 can be paired with the lenses. The multiple display system can include, for example, a first display 805, a second display 810 and a third display 815. The first and second triplet lenses 850, 860 can be configured to face the first display 805. The third triplet lens 855 can be configured to face the second display 810, and the fourth triplet lens 865 can be configured to face the third display 815. In another example, the multiple display system can include a first display 905, a second display 910, a third display 810 and a fourth display 815. The first triplet lens 850 can be configured to face the first display 905, the second triplet lens 860 can be configured to face the second display 910, the third triplet lens 855 can be configured to face the third display 810, and the fourth triplet lens 965 can be configured to face the fourth display 815. The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "one or more embodiments," and similar language throughout this disclosure may, but do not necessarily, all refer to the same embodiment. The terms "embodiment" and "arrangement" are used interchangeably within this disclosure.

The terms first, second, etc. may be used herein to describe various elements. These terms should not be limited by these terms, as these terms are only used to distinguish one element from another unless stated otherwise or the context clearly indicates otherwise.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the embodiments provided herein. Accordingly, reference should be made to the following claims, rather than to the foregoing disclosure, as indicating the scope of such features and implementations.

What is claimed is:

1. A near eye display system comprising:
   a first triplet lens configured to be associated with a left eye;
   a second triplet lens configured to be associated with a right eye;
   a third lens configured to be associated with the left eye;
   a fourth lens configured to be associated with the right eye; and
   a multiple display system paired with the first triplet lens, the second triplet lens, the third lens and the fourth lens, the multiple display system comprising a first display, a second display and a third display;
   wherein:
   the first display is configured to present images to the left eye and to the right eye;
   the second display is configured to present images to the left eye;
   the third display is configured to present images to the right eye;
   the first triplet lens, the second triplet lens, the third lens and the fourth lens are arranged in a tile fashion, extending horizontally in front of the multiple display system;
   the first triplet lens is configured to face the first display;
   the second triplet lens is configured to face the first display;
   the third lens is configured to face the second display;
   the fourth lens is configured to face the third display;
   the first triplet lens and the third lens are tiled with respect to one another forming an angle of at least 30° between their respective optical path centerlines; and
   the second triplet lens and the fourth lens are tiled with respect to one another forming an angle of at least 30° between their respective optical path centerlines.

2. The near eye display system of claim 1, wherein the third lens is a third triplet lens and the fourth lens is a fourth triplet lens.

3. The near eye display system of claim 1, wherein:
   the first triplet lens and the third lens are fixed relative to the second display, and the first triplet lens, the third lens and the second display are configured to move horizontally parallel to the first display.

4. The near eye display system of claim 3, wherein:
   the second triplet lens and the fourth lens are fixed relative to the third display, and the second triplet lens, the fourth lens and the third display are configured to move horizontally parallel to the first display.

5. The near eye display system of claim 4, wherein:
   wherein movement of the first triplet lens, third lens and the second display, and movement of the second triplet lens, the fourth lens and the third display, is configured to adjust for a pupillary distance of a user using the near eye display system.

6. The near eye display system of claim 1, wherein the near eye display system is configured to provide a combined total horizontal field of view of at least 200°.

7. The near eye display system of claim 1, wherein:
   at least one lens selected from a group consisting of the first triplet lens and the second triplet lens is configured to satisfy at least one of:
   a first pair of expressions comprising a first expression $1.0 < OAL/f < 1.8$ and a second expression $0.0 < D1/f < 0.2$, where OAL is distance from an image side of the first lens to a surface of the screen on the object side, D1 is air space thickness between the first lens and the second lens, and f is overall focal length of the optical systems;

a second pair of expressions comprising a first expression $0.2<BFL/f<0.9$ and a second expression $0.0<D2/f<0.4$, where BFL is a distance from an object side of the third lens to a surface of the screen on the object side, D2 is air space thickness between the second lens and the third lens, and f is overall focal length of the optical system;

a third pair of expressions comprising a first expression $-1.0<r2/f<-0.2$ and a second expression $0.5<r3/f<2.5$, where r2 is a radius of curvature of a surface of the first lens facing the object side, f is overall focal length of the optical system, and r3 is a radius of curvature of a surface of the second lens facing the image side; or a fourth pair of expressions comprising a first expression $-5.0<r4/f<-0.5$ and a second expression $-20<r5/f<-0.5$, where r4 is a radius of curvature of a surface of the second lens facing the object side, f is overall focal length of the optical system, and r5 is a radius of curvature of a surface of the third lens facing the image side.

8. A near eye display system, comprising:
a first triplet lens configured to be associated with a left eye;
a second triplet lens configured to be associated with a right eye;
a third lens configured to be associated with the left eye;
a fourth lens configured to be associated with the right eye; and
a multiple display system paired with the first triplet lens, the second triplet lens, the third lens and the fourth lens, the multiple display system comprising a first display, a second display, a third display and a fourth display;
wherein:
the first triplet lens, the second triplet lens, the third lens and the fourth lens are arranged in a tile fashion, extending horizontally in front of the multiple display system;
the first triplet lens is configured to face the first display;
the second triplet lens is configured to face the second display;
the third lens is configured to face the third display;
the fourth lens is configured to face the fourth display;
the first triplet lens and the third lens are tiled with respect to one another forming an angle of at least 30° between their respective optical path centerlines;
the second triplet lens and the fourth lens are tiled with respect to one another forming an angle of at least 30° between their respective optical path centerlines; and
the first triplet lens and the third lens are fixed relative to the first display and the third display, and the first triplet lens, the third lens, the first display and the third display are configured to move together horizontally.

9. The near eye display system of claim 8, wherein:
the second triplet lens and the fourth lens are fixed relative to the second display and the fourth display, and the second triplet lens, the fourth lens, the second display and the fourth display are configured to move together horizontally.

10. The near eye display system of claim 9, wherein:
wherein movement of the first triplet lens, the third lens, the first display and the third display, and movement of the second triplet lens, the fourth lens, the second display and the fourth display, is configured to adjust for a pupillary distance of a user using the near eye display system.

11. The near eye display system of claim 8, wherein the third lens is a third triplet lens the fourth lens is a fourth triplet lens.

12. A virtual reality headset comprising:
a near eye display system, the near eye display system comprising:
a first triplet lens configured to be associated with a left eye;
a second triplet lens configured to be associated with a right eye;
a third lens configured to be associated with the left eye;
a fourth lens configured to be associated with the right eye; and
a multiple display system paired with the first triplet lens, the second triplet lens the third lens and the fourth lens, the multiple display system comprising a first display, a second display and a third display;
wherein:
the first display is configured to present images to the left eye and to the right eye;
the second display is configured to present images to the left eye;
the third display is configured to present images to the right eye;
the first triplet lens, the second triplet lens, the third lens and the fourth lens are arranged in a tile fashion, extending horizontally in front of the multiple display system;
the first triplet lens is configured to face the first display;
the second triplet lens is configured to face the first display;
the third lens is configured to face the second display;
the fourth lens is configured to face the third display;
the first triplet lens and the third lens are tiled with respect to one another forming an angle of at least 30° between their respective optical path centerlines; and
the second triplet lens and the fourth lens are tiled with respect to one another forming an angle of at least 30° between their respective optical path centerlines.

13. The virtual reality headset of claim 12, wherein the third lens is a third triplet lens and the fourth lens is a fourth triplet lens.

14. The virtual reality headset of claim 12, wherein:
the first triplet lens and the third lens are fixed relative to the second display, and the first triplet lens, the third lens and the second display are configured to move horizontally parallel to the first display.

15. The virtual reality headset of claim 14, wherein:
the second triplet lens and the fourth lens are fixed relative to the third display, and the second triplet lens, the fourth lens and the third display are configured to move horizontally parallel to the first display.

16. The virtual reality headset of claim 15, wherein:
wherein movement of the first triplet lens, third lens and the second display, and movement of the second triplet lens, the fourth lens and the third display, is configured to adjust for a pupillary distance of a user using the near eye display system.

17. A method of providing a near eye display system, comprising:
configuring, in the near eye display system, a first triplet lens to be associated with a left eye;
configuring, in the near eye display system, a second triplet lens to be associated with a right eye;

configuring, in the near eye display system, a third lens to be associated with the left eye;

configuring, in the near eye display system, a fourth lens to be associated with the right eye;

paring a multiple display system with the first triplet lens, the second triplet lens, the third lens and the fourth lens, the multiple display system comprising a first display configured to present images to the left eye and to the right eye, a second display configured to present images to the left eye and a third display configured to present images to the right eye, wherein the first triplet lens, the second triplet lens, the third lens and the fourth lens are arranged in a tile fashion, extending horizontally in front of the multiple display system;

configuring the first triplet lens to face the first display;
configuring the second triplet lens to face the first display;
configuring the third lens to face the second display;
configuring the fourth lens to face the third display;
tiling the first triplet lens and the third lens with respect to one another to form an angle of at least 30° between their respective optical path centerlines; and
tiling the second triplet lens and the fourth lens with respect to one another to form an angle of at least 30° between their respective optical path centerlines.

18. The method of claim 17, further comprising:
configuring the near eye display system to adjust for a pupillary distance of a user using the near eye display system by providing for movement of the first triplet lens, the third lens and the second display horizontally parallel to the first display, and by providing for movement of the second triplet lens, the fourth lens and the third display horizontally parallel to the first display;
wherein the first triplet lens and the third lens are fixed relative to the second display, and the second triplet lens and the fourth lens are fixed relative to the third display.

19. The method of claim 17, wherein the third lens is a third triplet lens and the fourth lens is a fourth triplet lens.

20. The method of claim 17, further comprising:
configuring at least one lens selected from a group consisting of the first triplet lens and the second triplet lens to satisfy at least one of:
a first pair of expressions comprising a first expression $1.0<OAL/f<1.8$ and a second expression $0.0<D1/f<0.2$, where OAL is distance from an image side of the first lens to a surface of the screen on the object side, D1 is air space thickness between the first lens and the second lens, and f is overall focal length of the optical systems;
a second pair of expressions comprising a first expression $0.2<BFL/f<0.9$ and a second expression $0.0<D2/f<0.4$, where BFL is a distance from an object side of the third lens to a surface of the screen on the object side, D2 is air space thickness between the second lens and the third lens, and f is overall focal length of the optical system;
a third pair of expressions comprising a first expression $-1.0<r2/f<-0.2$ and a second expression $0.5<r3/f<2.5$, where r2 is a radius of curvature of a surface of the first lens facing the object side, f is overall focal length of the optical system, and r3 is a radius of curvature of a surface of the second lens facing the image side; or
a fourth pair of expressions comprising a first expression $-5.0<r4/f<-0.5$ and a second expression $-20<r5/f<-0.5$, where r4 is a radius of curvature of a surface of the second lens facing the object side, f is overall focal length of the optical system, and r5 is a radius of curvature of a surface of the third lens facing the image side.

21. A virtual reality headset comprising:
a near eye display system, the near eye display system comprising:
a first triplet lens configured to be associated with a left eye;
a second triplet lens configured to be associated with a right eye;
a third lens configured to be associated with the left eye;
a fourth lens configured to be associated with the right eye; and
a multiple display system paired with the first triplet lens, the second triplet lens the third lens and the fourth lens, the multiple display system comprising a first display, a second display, a third display and a fourth display;
wherein:
the first triplet lens, the second triplet lens, the third lens and the fourth lens are arranged in a tile fashion, extending horizontally in front of the multiple display system;
the first triplet lens is configured to face the first display;
the second triplet lens is configured to face the second display;
the third lens is configured to face the third display;
the fourth lens is configured to face the fourth display;
the first triplet lens and the third lens are tiled with respect to one another forming an angle of at least 30° between their respective optical path centerlines;
the second triplet lens and the fourth lens are tiled with respect to one another forming an angle of at least 30° between their respective optical path centerlines; and
the first triplet lens and the third lens are fixed relative to the first display and the third display, and the first triplet lens, the third lens, the first display and the third display are configured to move together horizontally.

22. The virtual reality headset of claim 21, wherein the third lens is a third triplet lens the fourth lens is a fourth triplet lens.

23. The virtual reality headset of claim 21, wherein:
the second triplet lens and the fourth lens are fixed relative to the second display and the fourth display, and the second triplet lens, the fourth lens, the second display and the fourth display are configured to move together horizontally.

24. The virtual reality headset of claim 23, wherein:
wherein movement of the first triplet lens, the third lens, the first display and the third display, and movement of the second triplet lens, the fourth lens, the second display and the fourth display, is configured to adjust for a pupillary distance of a user using the near eye display system.

25. A method of providing a near eye display system, comprising:
configuring, in the near eye display system, a first triplet lens to be associated with a left eye;
configuring, in the near eye display system, a second triplet lens to be associated with a right eye;
configuring, in the near eye display system, a third lens to be associated with the left eye;

configuring, in the near eye display system, a fourth lens to be associated with the right eye;

paring a multiple display system with the first triplet lens, the second triplet lens, the third lens and the fourth lens, the multiple display system comprising a first display, a second display, a third display and a fourth display, wherein the first triplet lens, the second triplet lens, the third lens and the fourth lens are arranged in a tile fashion, extending horizontally in front of the multiple display system;

configuring the first triplet lens to face the first display;

configuring the second triplet lens to face the second display;

configuring the third lens to face the third display;

configuring the fourth lens to face the fourth display;

tiling the first triplet lens and the third lens with respect to one another to form an angle of at least 30° between their respective optical path centerlines;

tiling the second triplet lens and the fourth lens with respect to one another to form an angle of at least 30° between their respective optical path centerlines; and configuring the first triplet lens and the third lens to be fixed relative to the first display and the third display, and configuring the first triplet lens, the third lens, the first display and the third display to move together horizontally.

26. The method of claim 25, wherein the third lens is a third triplet lens the fourth lens is a fourth triplet lens.

* * * * *